US011668685B2

(12) United States Patent
Arigo et al.

(10) Patent No.: US 11,668,685 B2
(45) Date of Patent: *Jun. 6, 2023

(54) MODIFIED RESINS AND USES THEREOF

(71) Applicant: Synthomer Adhesive Technologies LLC, Beachwood, OH (US)

(72) Inventors: Mark Arigo, Hudson, OH (US); Terri Roxanne Carvagno, Church Hill, TN (US); Jacobus Gillis De Hullu, Wolphartsdijk (NL); Sebastian Finger, Hannover (DE); Hubert Hirschlag, Laatzen (DE); Janine Klomp, Middelburg (NL); Fabian Peters, Hannover (DE); Carla Recker, Hannover (DE); Christopher George Robertson, Parma, OH (US); Peter Versluijs, Biggekerke (NL)

(73) Assignee: Synthomer Adhesive Technologies LLC, Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,012

(22) Filed: May 27, 2022

(65) Prior Publication Data

US 2022/0283133 A1 Sep. 8, 2022

Related U.S. Application Data

(63) Continuation of application No. 17/074,302, filed on Oct. 19, 2020, now Pat. No. 11,397,169, which is a (Continued)

(51) Int. Cl.
*G01N 30/88* (2006.01)
*C09J 7/38* (2018.01)
(Continued)

(52) U.S. Cl.
CPC ............. *G01N 30/88* (2013.01); *B60C 1/00* (2013.01); *B60C 1/0016* (2013.01); *C08F 10/14* (2013.01);
(Continued)

(58) Field of Classification Search
CPC .............. C08F 10/14; C08G 61/08; C08G 2261/228; C08G 2261/724; C08G 2261/3325; C08G 2261/72
See application file for complete search history.

(56) References Cited

U.S. PATENT DOCUMENTS 3,515,647 A 6/1970 Van Tassell et al.
4,160,692 A 7/1979 Mitchell et al.
(Continued)

FOREIGN PATENT DOCUMENTS

CN 101636284 A 1/2010
CN 108026206 A 5/2018
(Continued)

OTHER PUBLICATIONS

International preliminary report on patentability dated Oct. 8, 2019 of corresponding international application PCT/US2018/025763.
(Continued)

*Primary Examiner* — Shane Fang
(74) *Attorney, Agent, or Firm* — Walter Ottesen, P.A.

(57) ABSTRACT

Modified thermoplastic hydrocarbon thermoplastic resins are provided, as well as methods of their manufacture and uses thereof in rubber compositions. The modified thermoplastic resins are modified by decreasing the relative quantity of the dimer, trimer, tetramer, and pentamer oligomers as compared to the corresponding unmodified thermoplastic resin polymers, resulting in a product that exhibits a greater shift in the glass transition temperature of the elastomer(s) used in tire formulations. This translates to better viscoelas- (Continued)

US 11,668,685 B2

Page 2 tic predictors of tire tread performance, such as wet grip and rolling resistance. The modified thermoplastic resins impart remarkable properties on various rubber compositions, such as tires, belts, hoses, brakes, and the like. Automobile tires incorporating the modified thermoplastic resins are shown to possess excellent results in balancing the properties of rolling resistance, tire wear, snow performance, and wet braking performance.

19 Claims, 11 Drawing Sheets

Related U.S. Application Data continuation of application No. 15/944,502, filed on Apr. 3, 2018, now abandoned, which is a continuation of application No. PCT/US2018/025755, filed on Apr. 2, 2018.

(60) Provisional application No. 62/480,894, filed on Apr. 3, 2017.

(51) Int. Cl.
| | |
|---|---|
| C09J 7/25 | (2018.01) |
| B60C 1/00 | (2006.01) |
| C08F 10/14 | (2006.01) |
| C08F 32/00 | (2006.01) |
| C08G 61/08 | (2006.01) |
| C08J 11/02 | (2006.01) |
| C09J 123/08 | (2006.01) |
| C09J 123/26 | (2006.01) |
| C09J 131/04 | (2006.01) |
| C09J 153/02 | (2006.01) |
| C09J 191/00 | (2006.01) |
| G01N 25/48 | (2006.01) |
| G01N 5/04 | (2006.01) |

(52) U.S. Cl.
CPC .............. *C08F 32/00* (2013.01); *C08G 61/08* (2013.01); *C08J 11/02* (2013.01); *C09J 7/255* (2018.01); *C09J 7/381* (2018.01); *C09J 7/387* (2018.01); *C09J 123/08* (2013.01); *C09J 123/0853* (2013.01); *C09J 123/26* (2013.01); *C09J 131/04* (2013.01); *C09J 153/02* (2013.01); *C09J 191/00* (2013.01); *G01N 25/4866* (2013.01); *C08G 2261/228* (2013.01); *C08G 2261/3325* (2013.01); *C08G 2261/72* (2013.01); *C08G 2261/724* (2013.01); *C08J 2300/22* (2013.01); *C09J 2423/00* (2013.01); *C09J 2431/00* (2013.01); *C09J 2453/00* (2013.01); *C09J 2467/006* (2013.01); *G01N 5/04* (2013.01); *G01N 2030/885* (2013.01); *G01N 2030/8854* (2013.01); *Y02T 10/86* (2013.01)

(56) References Cited

U.S. PATENT DOCUMENTS

| | | | |
|---|---|---|---|
| 5,512,625 | A | 4/1996 | Butterbach et al. |
| 6,214,935 | B1 | 4/2001 | Sasaki et al. |
| 6,310,514 | B1 | 10/2001 | Johnson |
| 6,649,716 | B2 | 11/2003 | Andrekanic et al. |
| 7,262,251 | B2 | 8/2007 | Kanderski et al. |
| 7,411,018 | B2 | 8/2008 | Appel et al. |
| 7,671,132 | B1 | 3/2010 | Thielen et al. |
| 7,968,633 | B2 | 6/2011 | York et al. |
| 7,968,634 | B2 | 6/2011 | York et al. |
| 7,968,635 | B2 | 6/2011 | York et al. |
| 7,968,636 | B2 | 6/2011 | York et al. |
| 8,227,538 | B2 | 7/2012 | York et al. |
| 8,252,863 | B2 | 8/2012 | Hasse et al. |
| 8,689,381 | B2 | 4/2014 | Shiue |
| 8,815,995 | B2 | 8/2014 | Vest et al. |
| 9,790,353 | B2 | 10/2017 | Takahashi et al. |
| 2003/0176636 | A1 | 9/2003 | Liesenfelder et al. |
| 2004/0019247 | A1 | 1/2004 | Mitulla et al. |
| 2004/0092648 | A1 | 5/2004 | Jones et al. |
| 2008/0161452 | A1 | 7/2008 | York et al. |
| 2008/0161462 | A1 | 7/2008 | York et al. |
| 2008/0161486 | A1 | 7/2008 | York et al. |
| 2009/0076214 | A1 | 3/2009 | Kiss et al. |
| 2011/0252671 | A1 | 10/2011 | Maron et al. |
| 2012/0101231 | A1 | 4/2012 | Gelles et al. |
| 2012/0276353 | A1 | 11/2012 | Nakatsugawa |
| 2013/0150484 | A1 | 6/2013 | Basu et al. |
| 2013/0167965 | A1 | 7/2013 | Cheney et al. |
| 2013/0171367 | A1 | 7/2013 | Kusinski et al. |
| 2013/0211027 | A1 | 8/2013 | Barbee et al. |
| 2013/0225751 | A1 | 8/2013 | Cheng et al. |
| 2013/0237659 | A1 | 9/2013 | Recker et al. |
| 2013/0291409 | A1 | 11/2013 | Reinhardt et al. |
| 2014/0078646 | A1 | 3/2014 | Chacko et al. |
| 2016/0222197 | A1 | 8/2016 | Peters et al. |
| 2017/0037225 | A1 | 2/2017 | Isitman et al. |
| 2017/0313861 | A1 | 11/2017 | Winston et al. |
| 2017/0313910 | A1 | 11/2017 | Bieber et al. |
| 2018/0105683 | A1 | 4/2018 | Miyazaki |
| 2018/0282588 | A1 | 10/2018 | Arigo et al. |
| 2018/0284085 | A1 | 10/2018 | Arigo et al. |
| 2020/0056018 | A1 | 2/2020 | Arigo et al. |
| 2020/0399404 | A1 | 12/2020 | Yokota et al. |

FOREIGN PATENT DOCUMENTS

| | | |
|---|---|---|
| DE | 10 2013 110 719 A1 | 4/2015 |
| DE | 10 2013 110 720 A1 | 4/2015 |
| JP | 2001-323018 A | 11/2001 |
| JP | 2009-197105 A | 9/2009 |
| JP | 2016-204504 A | 12/2016 |
| KR | 1020160074729 A | 6/2016 |
| WO | 9909036 A1 | 2/1999 |
| WO | 2005044909 A1 | 5/2005 |
| WO | 2007033720 A1 | 3/2007 |
| WO | 2008083242 A1 | 7/2008 |
| WO | 2010059402 A1 | 5/2010 |
| WO | 2012129489 A2 | 9/2012 |
| WO | 2014172179 A1 | 10/2014 |
| WO | 2015/114998 A1 | 8/2015 |
| WO | 2015161039 A1 | 10/2015 |
| WO | 2015164016 A1 | 10/2015 |
| WO | 2016/069012 A1 | 5/2016 |
| WO | 2016135242 A1 | 9/2016 |
| WO | 2018187249 A1 | 10/2018 |
| WO | 2018187250 A1 | 10/2018 |

OTHER PUBLICATIONS

International preliminary report on patentability dated Oct. 8, 2019 of corresponding international application PCT/US2018/025762.
International preliminary report on patentability dated Oct. 17, 2019 of international application PCT/US2018/025755 on which this application is based.
D395-18, Standard Test Methods for Rubber Property-Compression Set, ASTM Int'l, Sep. 2018, pp. 1 to 8.
D624-00 (Reapproved 2012), Standard Test Method for Tear Strength of Conventional Vulcanized Rubber and Thermoplastic Elastomers, ASTM Int'l, Mar. 2012, pp. 1 to 9.
D638-14, Standard Test Method for Tensile Properties of Plastics, ASTM Int'l, Mar. 2015, pp. 1 to 17.
D1510-19a, Standard Test Method for Carbon Black-Iodine Adsorption Number, ASTM Int'l, Sep. 2019, pp. 1 to 10.
D2414-19, Standard Test Method for Carbon Black-Oil Absorption Number (OAN), ASTM Int'l, Aug. 2019, pp. 1 to 9.

(56) References Cited

OTHER PUBLICATIONS

D2240-15e1, Standard Test Method for Rubber Property-Durometer Hardness, ASTM Int'l, Jan. 2016, pp. 1 to 13. Replaces D2240-05 (pp. 1 to 13).
D3236-15, Standard Test Method for Apparent Viscosity of Hot Melt Adhesives and Coating Materials, ASTM Int'l, May 2015, pp. 1 to 6.
D3765-04, Standard Test Method for Carbon Black-CTAB (Cetyltrimethylammonium Bromide) Surface Area, ASTM Int'l, Jun. 2004, pp. 1 to 6. Superseded or withdrawn.
D6493-11 (Reapproved 2015), Standard Test Methods for Softening Point of Hydrocarbon Resins and Rosin Based Resins by Automated Ring-and-Ball Apparatus, ASTM Int'l, Dec. 2015, pp. 1 to 5.
E756-05 (Reapproved 2017), Standard Test Method for Measuring Vibration-Damping Properties of Materials, ASTM Int'l, Dec. 2017, pp. 1 to 14.
F88/F88M-15, Standard Test Method for Seal Strength of Flexible Barrier Materials, ASTM Int'l, Dec. 2015, pp. 1 to 11.
PSTC 101, "Peel Adhesion of Pressure Sensitive Tape", Harmonized International Standard, Oct. 2000, revised Oct. 2003 and May 2007, pp. 101-1-101-10.
Biedermann, M. et al., "On-line coupled high performance liquid chromatography-gas chromatography for the analysis of contamination by mineral oil. Part 1: Method of analysis", Journal of Chromatography A, 1255 (2012), pp. 56 to 75.
Bowen, R. et al., "Characterization and Prediction of Nanofiltration Membrane Performance—A General Assessment", TranslChemE, vol. 76, Part A, Nov. 1998, copyright Institution of Chemical Engineers, pp. 885 to 893.
Lesec, J., "Preparative Gel Permeation Chromatography", Journal of Liquid Chromatography, 1985, 8:5, pp. 875 to 923.
Mulder, J.L. et al., "A System for Preparative Separation of a Wide Range of Small Molecules by Gel Permeation Chromatography in Organic Liquids", Chrom. 4863, J. Chromatog., 51 (1970), pp. 459 to 477.
Wikipedia, "Oligomer", from third party observation downloaded Aug. 2, 2019, http://en.wikipedia.org/wiki/Oligomer, pp. 1 to 3.
Third Party Observation dated Aug. 1, 2019 of international application PCT/US2018/025755 on which this application is based.
Third Party Observation dated Aug. 2, 2019 of corresponding international application PCT/US2018/025762.
Third Party Observation dated Aug. 6, 2019 of corresponding international application PCT/US2018/025763.
English translation and first Office action of the Chinese Patent Office dated Jun. 30, 2021 in corresponding Chinese patent application No. 201880036900.8.
Written Opinion and International Search Report dated Jul. 23, 2018 of corresponding international application PCT/US2018/025763.
Written Opinion and International Search Report dated Jul. 23, 2018 of corresponding international application PCT/US2018/025762.
Written Opinion and International Search Report dated Jul. 30, 2018 of international application PCT/US2018/025755 on which this application is based.
DIN53504, Oct. 2009, DIN Deutsches Institut fuer Normung e.V., Berlin, Beuth Verlag GmbH, Germany, p. 1 to 19.
DIN ISO 7619-1, Feb. 2012, DIN Deutsches Institut fuer Normung e.V., Berlin, Beuth Verlag GmbH, Germany, pp. 1 to 15 (English) and 1 to 19 (German) replaces DIN 53505:2000-08.
DIN53512:2000-04, Apr. 2000, DIN Deutsches Institutfuer Normung e.V., Berlin, Beuth Verlag GmbH, Germany, pp. 1 to 5.

ISO 28580, "Passenger car, truck and bus tyres—Methods of measuring rolling resistance—Single point test and correlation of measurement results", ISO reference No. 28580:2009(E), 2009, pp. 1 to 26.
European Food Safety Authority (EFSA), "Scientific Opinion on Mineral Oil Hydrocarbons in Food", EFSA Panel on Contaminants in the Food Chain (CONTAM), EFSA Journal 2012: 10(6):2704, 85 pages, Aug. 28, 2013 version replacing Jun. 6, 2012 version.
Llosa Tanco, M.A. et al., "Recent Advances on Carbon Molecular Sieve Membranes (CMSMs) and Reactors", Processes 2016, 4, 29, pp. 1 to 21.
"Low Profile Additives Market Size, Share & Trends Analysis Report by Product (PVA, PMMA, PS, HDPE), by Application (SMC/BMC, Pultrusion, Resin Transfer Molding), and Segment Forecasts, 2019-2025", LPA Industry Report, Apr. 2019, pp. 1 to 6, https://www.grandviewresearch.com/industry-analysis/low-profile-additives-lpa-market.
O'Brien, E. P. et al, "Fundamentals of hot-melt pressure-sensitive adhesive tapes: the effect of tackifier aromaticity", J. Adhesion Sci. Technol., vol. 21, No. 7, 2007, pp. 637 to 661.
Salin, I. M. et al., "Kinetic Analysis of High-Resolution TGA Variable Heating Rate Data", Journal of Applied Polymer Science, vol. 47, 1993, John Wiley & Sons, Inc., pp. 847 to 855.
"Thermal Solutions Characterization of Polyurethane by TGA and Hi-ResTM TGA", TA Instruments Thermal Analysis & Rheology, http://www.tainst.com, downloaded on Nov. 14, 2018, one page.
Vavasour, E. et al., "Mineral Oils (Medium- and Low-Viscosity) and Paraffin Waxes", who Food Additives Series: 50, ICPS INCHEM, downloaded on May 7, 2019, 21 pages, http://www.inchem.org/documents/iecfa/jecmono/v50je04.htm.
VDA 278, "Thermal Desorption Analysis of Organic Emissions for the Characterization of Non-Metallic Materials for Automobiles", Verband der Automobilindustrie e.V., Berlin, Oct. 2011, 47 pages.
English translation and first Office action of the Chinese Patent Office dated Jul. 27, 2021 in corresponding Chinese patent application No. 201880036855.6.
D882-18, Standard Test Method for Tensile Properties of Thin Plastic Sheeting, ASTM Int'l, Aug. 2018, pp. 1 to 12.
D1003-13, Standard Test Method for Haze and Luminous Transmittance of Transparent Plastics, ASTM Int'l, Nov. 2013, pp. 1 to 7.
D1894-14, Standard Test Method for Static and Kinetic Coefficients of Friction of Plastic Film and Sheeting, ASTM Int'l, Mar. 2014, pp. 1 to 7.
D3039/3039M-17, Standard Test Method for Tensile Properties of Polymer Matrix Composite Materials, ASTM Int'l, Nov. 2017, pp. 1 to 13.
D4762-16, Standard Guide for Testing Polymer Matrix Composite Materials, ASTM Int'l, Aug. 2016, pp. 1 to 22.
D7028-07 (Reapproved 2015), Standard Test Method for Glass Transition Temperature (DMA Tg) of Polymer Matrix Composites by Dynamic Mechanical Analysis (DMA)^1, ASTM Int'l, Aug. 2015, pp. 1 to 13.
E967-18, Standard Test Method for Temperature Calibration of Differential Scanning Calorimeters and Differential Thermal Analyzers, ASTM Int'l, Mar. 2018, pp. 1 to 5.
E1582-17, Standard Test Method for Temperature Calibration of Thermogravimetric Analyzers, ASTM Int'l, Oct. 2017, pp. 1 to 6.
F1249-13, Standard Test Method for Water Vapor Transmission Rate Through Plastic Film and Sheeting Using a Modulated Infrared Sensor, ASTM Int'l, Nov. 2013, pp. 1 to 6.
PSTC 107, "Shear Adhesion of Pressure Sensitive Tape", Harmonized International Standard, Oct. 2000, revised Oct. 2003 and May 2007, pp. 107-1-107-11.

MODIFIED RESINS AND USES THEREOF

CROSS-REFERENCE TO RELATED APPLICATIONS

This application is a continuation application of U.S. patent application Ser. No. 17/074,302, filed Oct. 19, 2020 (published as US2021/0033578A1), which, in turn, is a continuation application of U.S. patent application Ser. No. 15/944,502, filed Apr. 3, 2018 (published as US2018/0282444A1, now abandoned) which, in turn, is a continuation application of international patent application PCT/US2018/025755, filed Apr. 2, 2018 which designates the United States and claims priority from U.S. Provisional Application No. 62/480,894, filed Apr. 3, 2017. The present continuation application claims priority to each of the above applications and incorporates herein the entire contents thereof by reference.

PARTIES TO A JOINT RESEARCH AGREEMENT

This disclosure was created pursuant to a joint development agreement between Eastman Chemical Company, a Delaware corporation, and Continental Reifen Deutschland GmbH, a German corporation, that in effect on or before the date the claimed invention was made, and the claimed invention was made as a result of activities undertaken within the scope of the joint development agreement.

FIELD

Modified thermoplastic resins are disclosed in which the fraction of oligomer is reduced, where oligomers are defined as dimer, trimer, tetramer, and/or pentamer species of monomers used to produce the modified thermoplastic resin. The low oligomer content of the modified thermoplastic resins provides a higher glass transition temperature (Tg) to z-average molecular weight (Mz) ratio (Tg/Mz) than is currently available with corresponding unmodified commercial thermoplastic resins. The modified thermoplastic resins can improve the performance properties of the rubber and elastomer compositions and cured rubber and elastomer compounds. Further, methods of preparing the modified thermoplastic resins are disclosed. Various uses and end products that impart excellent performance due to the unexpected properties of these modified thermoplastic resins are also disclosed.

BACKGROUND

Hydrocarbon and natural thermoplastic resins can be used to modify the viscoelastic properties of rubber compositions, such as those used in the manufacture of rubber-based products, including tire tread compounds, such that tire tread performance properties (such as wet grip, rolling resistance) are enhanced. Resins can also be used as processing aids to reduce the compound viscosity, and they can provide an improvement in tack which is needed for the tire construction process.

Resins are increasingly used in rubber mixtures for vehicle tire applications, in particular in rubber mixtures for tire treads. U.S. Patent Application Publication No. 2016/0222197 discloses tire treads containing thermoplastic resins in amounts exceeding 50 phr. A good compatibility between rubber and thermoplastic resin is a prerequisite for achieving high thermoplastic resin loadings in the polymer matrix.

Current thermoplastic resin technology for tires uses high glass transition thermoplastic resins to modify the rubber glass transition temperature Tg and viscoelastic properties to improve wet grip and rolling resistance performance balance. The wet grip performance must be balanced with other tire properties including rolling resistance and wear that are affected by the introduction of thermoplastic resin.

Hydrocarbon thermoplastic resins are added to an internal mixer along with elastomers, reinforcing particulate fillers, and other ingredients to form the rubber compounds used in the construction of automobile tires. The formation of a single-phase blend of thermoplastic resin and elastomer is critical to the effectiveness of the thermoplastic resin to modify the viscoelastic properties of the elastomer. One use case of thermoplastic resins in tire tread applications is to increase the glass transition temperature (Tg) of the elastomer compound such that there is higher hysteretic energy loss for the mechanism of improved tire wet grip performance. However, this increase in hysteresis for wet grip must be balanced by the need for low hysteresis compound properties at elevated temperatures in order to achieve low rolling resistance (fuel efficient) tires.

The ability of a thermoplastic resin to effectively balance the wet grip and rolling resistance performance requirements in this way depends on the thermoplastic resin glass transition temperature (Tg), number average molecular weight (Mn), and molecular weight distribution. The Tg of typical hydrocarbon thermoplastic resins have a strong dependence on molecular weight, Mn. Low Tg thermoplastic resins have low Mn, while increasing Mn increases the thermoplastic resin Tg. In a typical thermoplastic resin molecular weight distribution, the low molecular weight thermoplastic resin species are not efficient for modifying the elastomer Tg because they have lower glass transition temperatures. Additionally, the very high molecular weight thermoplastic resin species (characterized by the z-average molecular weight, Mz) are not efficient either because they are not compatible with the elastomers. The current method to increase the thermoplastic resin Tg is by increasing the molecular weight; however, this is not efficient because during typical polymerization conditions, the amount of incompatible high molecular weight thermoplastic resin increases with increasing Mn.

It is therefore desirable to obtain a modified thermoplastic resin in which the modified thermoplastic resin has a high Tg while maintaining a low Mz to most efficiently modify the elastomer compound Tg while maintaining compatibility with the rubber matrix.

SUMMARY

Provided herein are modified thermoplastic resin compositions. It has been discovered that modification of thermoplastic resins by reducing the relative amount of oligomer present in the modified thermoplastic resin as compared to a corresponding unmodified thermoplastic resin, where oligomers are defined as dimer, trimer, tetramer, and/or pentamer species of monomers used to produce the modified thermoplastic resin provides a higher glass transition temperature (Tg) to z-average molecular weight (Mz) ratio (Tg/Mz) than is currently available with corresponding unmodified commercial thermoplastic resins. The modification of thermoplastic resins according to the methods disclosed herein confers superior unexpected properties to products incorporating such modified thermoplastic resins, such that products, such as rubber products, adhesive, molded plastics, tires, belts, gaskets, hoses, and the like, possess superior properties as compared to similar products without the disclosed modified thermoplastic resins. Disclosed are also methods of obtaining, manufacturing, or creating such modified thermoplastic resins, as well as various products incorporating the disclosed modified thermoplastic resins.

Thus, in one embodiment, disclosed are modified thermoplastic resins prepared by polymerization of one or more monomers and having a glass transition temperature (Tg) of between −50° C. and 160° C., a number average molecular weight of less than 3,000 g/mol, a z-average molecular weight (Mz) of less than 9,000 g/mol, comprising less than or equal to 55 wt % oligomers by gel permeation chromatography (GPC), or less than or equal to 38 wt % by high resolution thermogravimetric analysis (TGA), and where oligomers consist of dimers, trimers, tetramers, pentamers, or a mixture thereof, of the one or more monomers.

In such embodiments, the glass transition temperature (Tg) is between −50° C. and 160° C., the number average molecular weight is less than 1,000 g/mol, and/or the z-average molecular weight is less than 9,500 g/mol. Alternatively, the Tg is between 0° C. and 140° C., the number average molecular weight is less than 850 g/mol, and/or the z-average molecular weight is less than 8,000 g/mol.

Additionally, such modified thermoplastic resins are obtained by modification of pure monomer thermoplastic resin (PMR), C5 thermoplastic resin, C5/C9 thermoplastic resin, C9 thermoplastic resin, terpene thermoplastic resin, indene-coumarone (IC) thermoplastic resin, dicyclopentadiene (DCPD) thermoplastic resin, hydrogenated or partially hydrogenated pure monomer (PMR) thermoplastic resin, hydrogenated or partially hydrogenated C5 thermoplastic resin, hydrogenated or partially hydrogenated C5/C9 thermoplastic resin, hydrogenated or partially hydrogenated C9 thermoplastic resin, hydrogenated or partially hydrogenated dicyclopentadiene (DCPD) thermoplastic resin, terpene thermoplastic resin, modified indene-coumarone (IC) thermoplastic resin, or a mixture thereof.

In another embodiment, the modified thermoplastic resins described herein have a glass transition temperature (Tg) of between −50° C. and 160° C., between 0° C. and 140° C., or between 20° C. and 120° C., and/or a number average molecular weight (Mn) of the modified thermoplastic resin is less than or equal to 1,000 g/mol, 500 g/mol, or 250 g/mol, and/or wherein the z-average molecular weight (Mz) is less than or equal to 9,000 g/mol, 8,000 g/mol, or 6,000 g/mol.

In such embodiments, the high resolution TGA analysis is conducted with a thermal gravimetric analyzer calibrated by curie point of magnetic transition standards according to ASTM method E1582, procedure C; and/or wherein the high resolution TGA analysis is conducted using a TA Instruments Q500 thermal gravimetric analyzer with sensitivity set to 2.0 and resolution set to 3.0 by heating the modified thermoplastic resin in nitrogen with a scanning rate of 20 degrees per minute from ambient temperature to 625° C., and/or the GPC analysis is conducted at 30° C. in tetrahydrofuran solvent at a flow rate of 1 ml/min with a GPC instrument comprising a refractive index detector, a highly cross-linked polystyrene-divinylbenzene gel column, and/or a column comprising polymer particles with a nominal particle size of 6 μm.

In other embodiments, the modified thermoplastic resins described herein possesses the properties of formula I:

$$S = \left(\frac{T_g}{M_z}\right) / \left[\text{Oligomer} \times \left(1 - \frac{T_{10}}{T_{max}}\right)\right] \qquad \text{I}$$

In such embodiments, the Tg is the glass transition temperature in degrees Celsius of the modified thermoplastic resin, Mz is the z-average molecular weight of the modified thermoplastic resin, Oligomer is the fraction of oligomer present in the modified thermoplastic resin as measured by high resolution thermal gravimetric analysis (TGA) or gel permeation chromatography (GPC), $T_{10}$ is the temperature at which the modified thermoplastic resin loses about 10% of its weight as measured by high resolution TGA, and $T_{max}$ is the temperature of the maximum first derivative value of the modified thermoplastic resin as measured by high resolution TGA. In such embodiments, the value of S is greater than or equal to 2 and less than 50,000 when Oligomer is determined by GPC, or greater than or equal to 5 and less than 10,000 when Oligomer is determined by high resolution TGA and the value of Mz is less than or equal to 9,000 g/mol.

In another embodiment of the thermoplastic resins described by Formula I, the resins possess one or more of the following properties: a glass transition temperature (Tg) of between −50° C. and 160° C., a number average molecular weight of less than 1,000 g/mol, and/or a z-average molecular weight of less than 9,500 g/mol. Alternatively, in such embodiments, the modified thermoplastic resins described herein possess one or more of the following properties: a Tg of between 0° C. and 140° C., a number average molecular weight of less than 850 g/mol, and/or a z-average molecular weight of less than 8,000 g/mol.

Such embodiments of the modified thermoplastic resins described by Formula I are obtained by modification of pure monomer thermoplastic resin (PMR), C5 thermoplastic resin, C5/C9 thermoplastic resin, C9 thermoplastic resin, terpene thermoplastic resin, indene-coumarone (IC) thermoplastic resin, dicyclopentadiene (DCPD) thermoplastic resin, hydrogenated or partially hydrogenated pure monomer (PMR) thermoplastic resin, hydrogenated or partially hydrogenated C5 thermoplastic resin, hydrogenated or partially hydrogenated C5/C9 thermoplastic resin, hydrogenated or partially hydrogenated C9 thermoplastic resin, hydrogenated or partially hydrogenated dicyclopentadiene (DCPD) thermoplastic resin, terpene thermoplastic resin, modified indene-coumarone (IC) thermoplastic resin, or a mixture thereof.

In other embodiments where the modified thermoplastic resins are described by Formula I, and the oligomer content is determined by high resolution TGA, the modified thermoplastic resins possess one or more of the following properties: (a) the modified thermoplastic resin is a PMR resin, where the value of Tg/Mz is greater than or equal to 0.14, and: the weight percent of oligomer is less than 17, and/or the value of $T_{10}/T_{max}$ is greater than or equal to 0.90, and/or the value of S is greater than 17; (b) the modified thermoplastic resin is C5 resin, and: the weight percent of oligomer is less than 14, and/or the value of $T_{10}/T_{max}$ is greater than or equal to 0.92, and/or the value of S is greater than or equal to 5; (c) the modified thermoplastic resin is a C5/C9 resin, and: the weight percent of oligomer is less than 15, and/or the value of $T_{10}/T_{max}$ is greater than or equal to 0.92, and/or the value of S is greater than or equal to 10; (d) the modified thermoplastic resin is a C9 resin, where the value of Tg/Mz is greater than or equal to 0.12, and: the weight percent of oligomer is less than or equal to 15, and/or the value of $T_{10}/T_{max}$ is greater than or equal to 0.88, and/or the value of S is greater than or equal to 16; (e) the modified thermoplastic resin is a hydrogenated or partially hydrogenated DCPD resin, where the value of Tg/Mz is greater than 0.25, and the weight percent of oligomer is less than 31, and/or the value of $T_{10}/T_{max}$ is greater than 0.85, and/or the value of S is greater than or equal to 10; (0 the modified thermoplastic resin is a hydrogenated or partially hydrogenated PMR resin, where the value of Tg/Mz is greater than or equal to 0.30, and: the weight percent of oligomer is less than or equal to 16, and/or the value of $T_{10}/T_{max}$ is greater than 0.85, and/or the value of S is greater than or equal to 22; (g) the modified thermoplastic resin is a hydrogenated or partially hydrogenated PMR resin, where the value of Tg/Mz is less than 0.30, and: the weight percent of oligomer is less than 38, and/or the value of $T_{10}/T_{max}$ is greater than 0.75, and/or the value of S is greater than or equal to 5; (h) the modified thermoplastic resin is a hydrogenated or partially hydrogenated C5 resin or a hydrogenated or partially hydrogenated C5/C9 resin, and: the weight percent of oligomer is less than 30, and/or the value of $T_{10}/T_{max}$ is greater than or equal to 0.90, and/or the value of S is greater than or equal to 10; and/or (i) the modified thermoplastic resin is hydrogenated or partially hydrogenated C9, where the value of Tg/Mz is greater than or equal to 0.19, and: the weight percent of oligomer is less than or equal to 13, and/or the value of $T_{10}/T_{max}$ is greater than 0.90, and/or the value of S is greater than or equal to 16.

In other embodiments where the modified thermoplastic resins are described by Formula I, and the oligomer content is determined by GPC, the modified thermoplastic resins possess one or more of the following properties: (a) the modified thermoplastic resin is a PMR resin, the value of Tg/Mz is greater than or equal to 0.14 K/(g/mol), the Oligomer having a molecular weight of less than 300 g/mol is less than or equal to 0.02, and the Oligomer having a molecular weight of less than 600 g/mol is less than or equal to 0.1; (b) the modified thermoplastic resin is a C5 resin, and wherein: the Oligomer having a molecular weight of less than 300 g/mol is less than 0.03, or the Oligomer having a molecular weight of less than 600 g/mol is less than 0.17; (c) the modified thermoplastic resin is a C5/C9 resin, and wherein: the Oligomer having a molecular weight of less than 300 g/mol is less than 0.03, or the Oligomer having a molecular weight of less than 600 g/mol is less than 0.17; (d) the modified thermoplastic resin is a C9 resin, the value of Tg/Mz is greater than or equal to 0.09 K/(g/mol), the Oligomer having a molecular weight of less than 300 g/mol is less than or equal to 0.05, and the Oligomer having a molecular weight of less than 600 g/mol is less than 0.25; (e) the modified thermoplastic resin is a hydrogenated or partially hydrogenated DCPD resin, the value of Tg/Mz is greater than or equal to 0.25 K/(g/mol), and wherein: the Oligomer having a molecular weight of less than 300 g/mol is less than 0.16, or the Oligomer having a molecular weight of less than 600 g/mol is less than 0.55; (0 the modified thermoplastic resin is a hydrogenated or partially hydrogenated C5 resin and/or a hydrogenated or partially hydrogenated C5/C9 resin, and wherein: the Oligomer having a molecular weight of less than 300 g/mol is less than 0.15, or the Oligomer having a molecular weight of less than 600 g/mol is less than 0.45; (g) the modified thermoplastic resin is hydrogenated or partially hydrogenated C9 resin, the value of Tg/Mz is greater than 0.19 K/(g/mol), and wherein: the Oligomer having a molecular weight of less than 300 g/mol is less than or equal to 0.08 or 0.05 or 0.02, and the Oligomer having a molecular weight of less than 600 g/mol is less than 0.3; and/or (h) the modified thermoplastic resin is a hydrogenated or partially hydrogenated PMR resin, and: the value of Tg/Mz is greater than or equal to 0.30 K/(g/mol), the Oligomer having a molecular weight of less than 300 g/mol is less than 0.08, or the Oligomer having a molecular weight of less than 600 g/mol is less than 0.40, or the value of Tg/Mz is less than 0.30 K/(g/mol), the Oligomer having a molecular weight of less than 300 g/mol is less than 0.09, or the Oligomer having a molecular weight of less than 600 g/mol is less than 0.25.

In one such embodiment, the modified thermoplastic resin is a PMR resin and/or a modified hydrogenated or partially hydrogenated PMR resin, and when Oligomer has a molecular weight of less than 300 g/mol, S is greater than 2000. In another such embodiments, the modified thermoplastic resin is a hydrogenated or partially hydrogenated C9 resin, and where Oligomer has a molecular weight of less than 300 g/mol, S is greater than 90. In other similar embodiments, where the modified thermoplastic resin is defined by Formula I, the modified thermoplastic resin has a glass transition temperature (Tg) of between −50° C. and 160° C., between 0° C. and 140° C., or between 20° C. and 120° C., and/or the number average molecular weight (Mn) of the modified thermoplastic resin is less than or equal to 1,000 g/mol, 500 g/mol, or 250 g/mol, and/or wherein the z-average molecular weight (Mz) is less than or equal to 9,000 g/mol, 8,000 g/mol, or 6,000 g/mol.

Further embodiments of such modified thermoplastic resins defined by Formula I possess one or more of the following properties when the oligomer content is determined by GPC: (a) the modified thermoplastic resin is a PMR resin, and (i) for Oligomer having a molecular weight of less than 600 g/mol, S is greater than 14, or (ii) for Oligomer having a molecular weight of less than 300 g/mol, S is greater than 67; (b) the modified thermoplastic resin is a C5 resin, and (i) for Oligomer having a molecular weight of less than 600 g/mol, S is greater than 8, or (ii) for Oligomer having a molecular weight of less than 300 g/mol, S is greater than 36; (c) the modified thermoplastic resin is a C5/C9 resin, and (i) for Oligomer having a molecular weight of less than 600 g/mol, S is greater than 8, or (ii) for Oligomer having a molecular weight of less than 300 g/mol, S is greater than 36; (d) the modified thermoplastic resin is a C9 resin, the value of Tg/Mz is greater than 0.09 K/(g/mol), and (i) for Oligomer having a molecular weight of less than 600 g/mol, S is greater than 8, or (ii) for Oligomer having a molecular weight of less than 300 g/mol, S is greater than 38; (e) the modified thermoplastic resin is a hydrogenated or partially hydrogenated DCPD resin, and (i) for Oligomer having a molecular weight of less than 600 g/mol, S is greater than 5, or (ii) for Oligomer having a molecular weight of less than 300 g/mol, S is greater than 17; (0 the modified thermoplastic resin is a hydrogenated or partially hydrogenated C5 resin and/or a hydrogenated or partially hydrogenated C5/C9 resin, and (i) for Oligomer having a molecular weight of less than 600 g/mol, S is greater than 5, or (ii) for Oligomer having a molecular weight of less than 300 g/mol, S is greater than 10; (g) the modified thermoplastic resin is hydrogenated or partially hydrogenated C9 resin, the value of Tg/Mz is greater than or equal to 0.19 K/(g/mol), and (i) for Oligomer having a molecular weight of less than 600 g/mol, S is greater than 6, or (ii) for Oligomer having a molecular weight of less than 300 g/mol, S is greater than 29; and/or (h) the modified thermoplastic resin is a hydrogenated or partially hydrogenated PMR resin, and: the value of Tg/Mz is greater than or equal to 0.30 K/(g/mol), and (i) for Oligomer having a molecular weight of less than 600 g/mol, S is greater than 8, or (ii) for Oligomer having a molecular weight of less than 300 g/mol, S is greater than 26; or the value of Tg/Mz is less than 0.30 K/(g/mol), and (i) for Oligomer having a molecular weight of less than 600 g/mol, S is greater than 2, or (ii) for Oligomer having a molecular weight of less than 300 g/mol, S is greater than 5.

In such embodiments, where the modified thermoplastic resins are defined as in Formula I, the high resolution TGA analysis is conducted using a thermal gravimetric analyzer calibrated by curie point of magnetic transition standards according to ASTM method E1582, procedure C; and/or wherein the high resolution TGA analysis is conducted using a TA Instruments Q500 thermal gravimetric analyzer with sensitivity set to 2.0 and resolution set to 3.0 by heating the modified thermoplastic resin in nitrogen with a scanning rate of 20 degrees per minute from ambient temperature to 625° C., and/or the GPC analysis is conducted at 30° C. in tetrahydrofuran solvent at a flow rate of 1 ml/min with a GPC instrument comprising a refractive index detector, a highly cross-linked polystyrene-divinylbenzene gel column, and/or a column comprising polymer particles with a nominal particle size of 6 µm.

BRIEF DESCRIPTION OF THE DRAWINGS

The invention will now be described with reference to the drawings. The accompanying drawings, which are incorporated in and constitute a part of this specification, illustrate certain embodiments, and together with the written description, serve to explain certain principles of the constructs and methods disclosed herein.

FIG. 1A shows the GPC integrated percent area under the curve for molecules less than 600 g/mol for standard resins (y=1.061x+12.13, $R^2$=0.704) vs. percent oligomer determined by high resolution TGA. FIG. 1B shows the GPC integrated percent area under the curve for molecules less than 300 g/mol for standard resins (y=0.9405x−13.73, $R^2$=0.7206) vs. percent oligomer determined by high resolution TGA. FIG. 1C shows the GPC integrated percent area under the curve for molecules less than 600 g/mol for modified resins (y=1.5146x+19.422, $R^2$=0.3404) vs. percent oligomer determined by high resolution TGA. FIG. 1D shows the GPC integrated percent area under the curve for molecules less than 300 g/mol for modified resins (y=0.4451x−0.9992, $R^2$=0.5338) vs. percent oligomer determined by high resolution TGA.

DETAILED DESCRIPTION

Figure 1A:
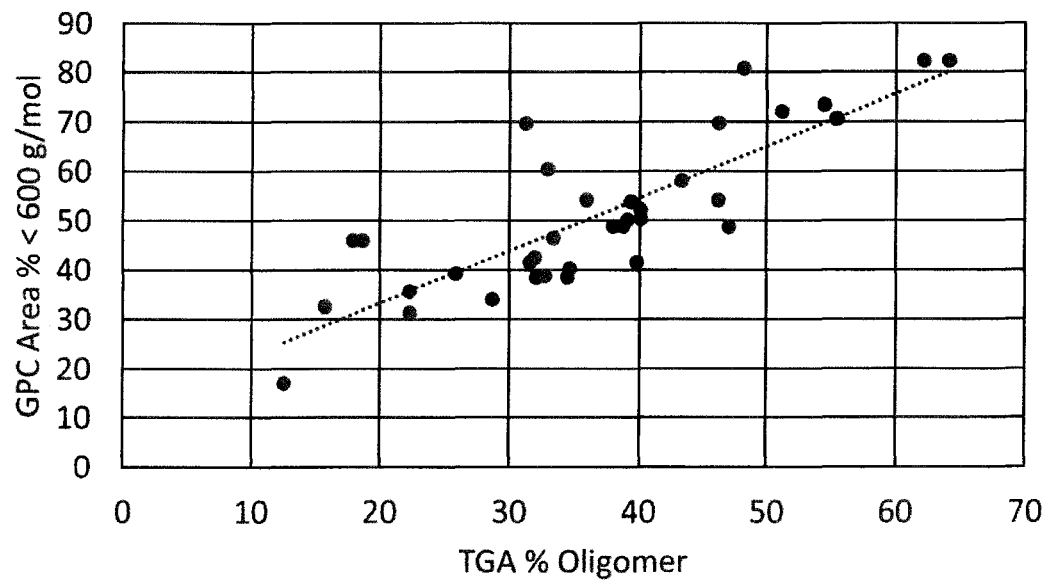
FIG. 1A, FIG. 1B, FIG. 1C, and FIG. 1D are correlation plots showing the linear relationship between percent oligomer as determined by high resolution thermal gravimetric analysis (TGA) versus gel permeation chromatography (GPC) using polystyrene standards methods for both modified thermoplastic resins and unmodified thermoplastic resins.
Figure 1B:
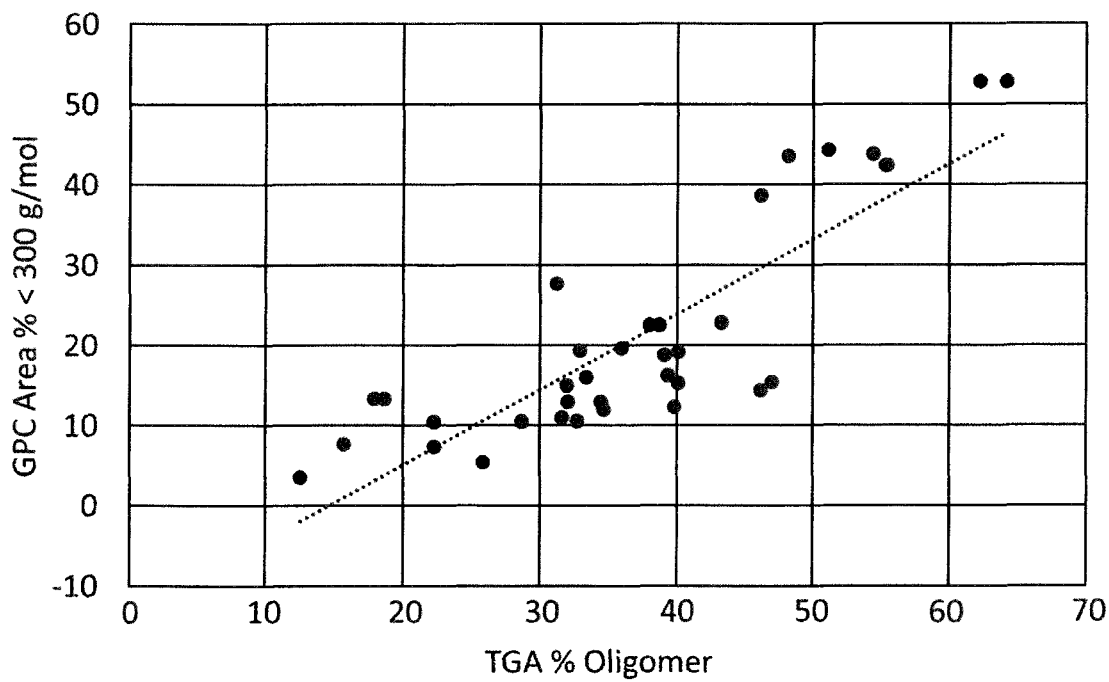
Figure 1C:
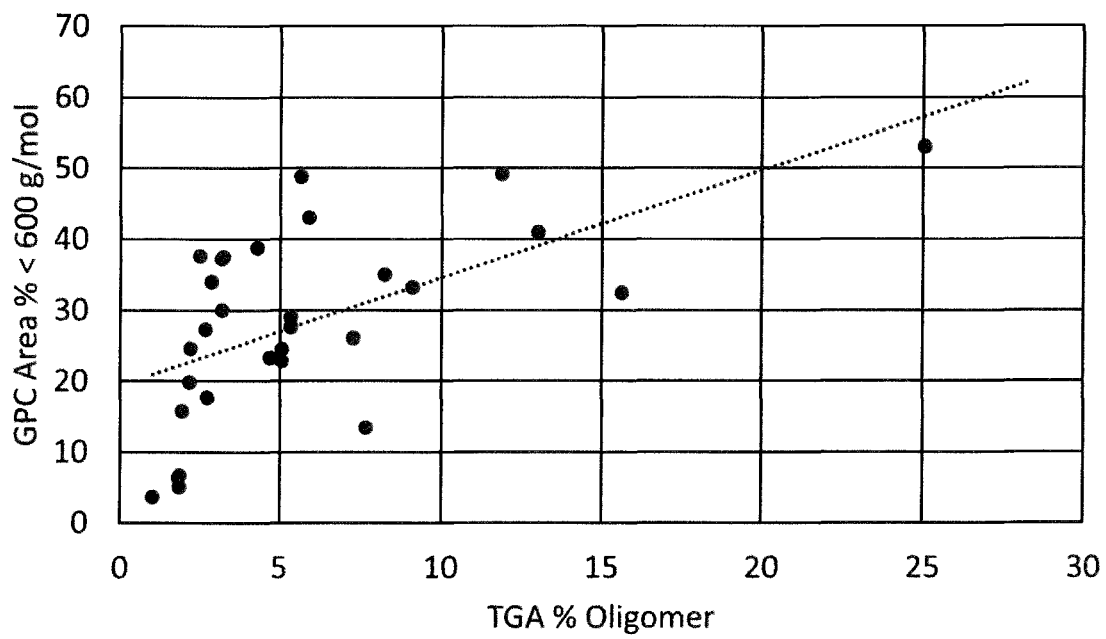
Figure 1D:
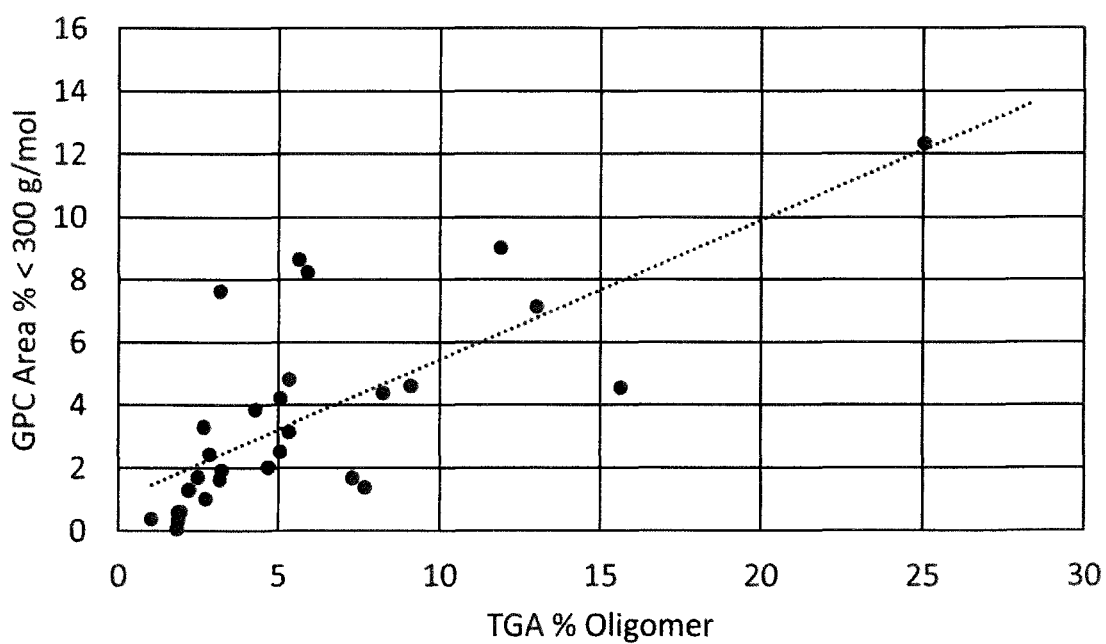

It is to be understood that the following detailed description is provided to give the reader a fuller understanding of certain embodiments, features, and details of aspects of the invention, and should not be interpreted as a limitation of the scope of the invention.

Definitions

Certain terms used throughout this disclosure are defined hereinbelow so that the present invention may be more readily understood. Additional definitions are set forth throughout the disclosure.

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless expressly indicated otherwise, are considered to be approximations as though the minimum and maximum values within the stated ranges were both preceded by the word "about." In this context, the term "about" is meant to encompass the stated value±a deviation of 1%, 2%, 3%, 4%, or not more than 5% of the stated value. In this manner, slight variations above and below the stated ranges can be used to achieve substantially the same results as the values within the ranges. In addition, the disclosure of these ranges is intended as a continuous range including every value between the minimum and maximum values.

Unless otherwise indicated, % solids or weight % (wt %) are stated in reference to the total weight of a specific formulation, emulsion, or solution.

Unless otherwise indicated, the terms "polymer" and "thermoplastic resin" do not necessarily mean the same thing, but include both homopolymers having the same recurring unit along the backbone, as well as copolymers having two or more different recurring units along the backbone. For instance, polymer refers to a molecule having a number averaged molecular weight of greater than 5,000 g/mol, as measured by GPC, whereas a "thermoplastic resin" refers to a molecule having a number average molecular weight of less than 5,000 g/mol, as measured by GPC. Such polymers or thermoplastic resins include but are not limited to, materials prepared by either condensation, cationic, anionic, Ziegler-Natta, reversible addition-fragmentation chain-transfer (RAFT), or free radical polymerization. Further, the term "thermoplastic resin" or "starting thermoplastic resin" when used alone refers to the unmodified, or non-modified thermoplastic resin. Furthermore, while the term "polymer" is meant to encompass elastomers, the term "elastomer" does not necessarily encompass all polymers. In other words, as known to one of skill in the art, not all polymers are elastomers.

The term "comprising" (and its grammatical variations) as used herein is used in the inclusive sense of "having" or "including" and not in the exclusive sense of "consisting only of."

The terms "a" and "the" as used herein are understood to encompass one or more of the components, i.e., the plural as well as the singular.

The stated "phr" means parts per hundred parts of rubber by weight, and is used in this specification to mean the conventional stated amount in the rubber industry for blend recipes. The dosage of the parts by weight of the individual substances in this context is always based on 100 parts by weight of the total weight of all the rubbers present in the blend. The abovementioned thermoplastic resins are not considered to be a rubber in the context of this disclosure.

A "thermoplastic polymer" refers to a polymer having a number average molecular weight of greater than 5,000 g/mol, as measured by GPC, that has no covalently cross-linked sites between individual polymer macromolecules and becomes liquid, pliable, or moldable above a specific temperature, and then it returns to a solid state upon cooling. In many instances, the thermoplastic polymers are also soluble in appropriate organic solvent media.

The term "vulcanized" as used herein means subjecting a chemical composition, such as a polymer, for example an elastomeric and/or thermoplastic polymer composition, to a chemical process including addition of sulfur or other similar curatives, activators, and/or accelerators at a high temperature. (See, for example, WO 2007/033720, WO 2008/083242, and PCT/EP2004/052743). The curatives and accelerators act to form cross-links, or chemical bridges, between individual polymer chains. Curing agents collectively refer to sulfur vulcanizing agents and vulcanization accelerators. Suitable sulfur vulcanizing agents include, for example, elemental sulfur (free sulfur) or sulfur donating vulcanizing agents that make sulfur available for vulcanization at a temperature of about 140° C. to about 190° C. Suitable examples of sulfur donating vulcanizing agents include amino disulfide, polymeric polysulfide, and sulfur olefin adducts. The polymer compositions described herein that are capable of being vulcanized can in some embodiments also include one or more vulcanizing accelerators. Vulcanizing accelerators control the time and/or temperature required for vulcanization and affect the properties of the vulcanizate. Vulcanization accelerators include primary accelerators and secondary accelerators. Suitable accelerators include, for example, one or more of mercapto benzothiazole, tetramethyl thiuram disulfide, benzothiazole disulfide, diphenyl guanidine, zinc dithiocarbamate, alkylphenol disulfide, zinc butyl xanthate, N-dicyclohexyl-2-benzothiazolesulfenamide, N-cyclohexyl-2-benzothiazole sulfenamide, N-oxydiethylene benzothiazole-2-sulfenamide, N,N-diphenyl thiourea, dithiocarbamyl sulfenamide, N,N-diisopropyl benzothiozole-2-sulfenamide, zinc-2-mercapto toluimidazole, dithio bis(N-methyl piperazine), dithio bis(N-beta-hydroxy ethyl piperazine), and dithio bis(dibenzyl amine). Other vulcanizing accelerators include, for example, thiuram, and/or morpholine derivatives. Further, vulcanized compounds also in some embodiments include one or more silane coupling agents such as, for example, bifunctional organosilanes possessing at least one alkoxy, cycloalkoxy, or phenoxy group on the silicon atom as a leaving group, and as the other functionality, having a group that can optionally undergo a chemical reaction with the double bonds of the polymer after splitting. The latter group may, for example, constitute the following chemical groups: SCN, —SH, —NH2 or —Sx- (where x is from 2 to 8). Thus, vulcanizates, i.e. mixtures to be vulcanized include in some embodiments various combinations of exemplary silane coupling agents such as 3-mercaptopropyltriethoxysilane, 3-thiocyanato-propyl-trimethoxysilane, or 3,3'-bis(triethoxysilylpropyl)-polysulfide with 2 to 8 sulfur atoms such as, for example, 3,3'-bis(triethoxysilylpropyl)tetrasulfide (TESPT), the corresponding disulfide (TESPD), or mixtures of the sulfides with 1 to 8 sulfur atoms having a differing content of the various sulfides, as described in further detail below.

The term "$M_w$" as used herein is the weight-average molecular weight and is determined using gel permeation chromatography (GPC) according to methodology described below. Values reported herein are reported as polystyrene equivalent weights.

The term "Mn" when used herein means the number average molecular weight in g/mol, i.e. the statistical average molecular weight of all polymer chains in the sample, or the total weight of all the molecules in a polymer sample divided by the total number of molecules present.

The term "Mz" when used herein means the z-average molecular weight in g/mol and is determined typically by sedimentation equilibrium (ultracentrifugation) and light scattering. Here Mz is determined by gel permeation chromatography (GPC) according to methods described below. Mz is the thermodynamic equilibrium position of a polymer where the polymer molecule becomes distributed according to its molecular size. This value is used in some instances as an indication of the high molecular weight tail in the thermoplastic resin.

The term "$T_{10}$" as used herein means the temperature (in degrees Celsius) at which the modified thermoplastic resin loses about 10% of its starting weight as measured by high resolution thermal gravimetric analysis (TGA) using the methodologies described below.

"High resolution thermogravimetric analysis" (high resolution TGA) as used herein indicates an extension to conventional TGA wherein the heating rate is varied as a function of sample weight loss rate, e.g. sample decomposition rate changes. Faster decomposition rates trigger lower heating rates in Hi-Res TGA. The high resolution (Hi-Res) TGA approach allows the use of high heating rates during no weight loss regions, then automatically reduces the heating rate during a weight loss transition. Thus, Hi-Res TGA enhances the resolution of multiple components in a mixed polymer system, such as resin compositions. (See, for instance, Salin et al., "Kinetic analysis of high-resolution TGA variable heating rate data," *J. Appl. Polym. Sci.,* 47: 847-856 (1993), and Sepe, M. P., "Thermal Analysis of Polymers," Volume 95 of RAPRA Technology Limited Shawbury: Rapra review reports, iSmithers Rapra Publishing, 1997). Note that whenever "TGA" is recited herein, the indicated technique is "high resolution" TGA in all instances.

"Glass transition temperature (Tg)" is a second order transition and is the temperature range at which amorphous material reversibly changes from a hard, rigid, or "glassy" solid state to a more pliable, compliant, or "rubbery" viscous state, and is measured in degrees Celsius or degrees Fahrenheit. Tg is not the same as melting temperature. Tg can be determined using Differential Scanning calorimetry (DSC) as disclosed below at Example 2.

"Modified thermoplastic resin" when used herein means a thermoplastic resin that has been processed or treated to remove a percentage of dimers, trimers, tetramers, and/or pentamers (oligomers) of the unmodified thermoplastic resin. Thermoplastic resin means any known thermoplastic resin that has a number average molecular weight of less than 5,000 g/mol as measured by GPC using, for instance, the GPC methodologies described below.

"Unmodified thermoplastic resin" when used herein means a thermoplastic resin, or starting thermoplastic resins, such as PMR, C5, C5/C9, C9, DCPD, terpene/polyterpene, and indene-coumarone (IC), as described hereinbelow. Thermoplastic resin means any known thermoplastic resin that has a number average molecular weight of less than 5,000 g/mol as measured by GPC. Unmodified thermoplastic resins include hydrogenated, partially-hydrogenated, and non-hydrogenated versions of these resins. For instance, DCPD includes aromatic-modified DCPD, as well as hydrogenated and partially hydrogenated DCPD and/or hydrogenated and partially hydrogenated aromatic-modified DCPD. C9 resin includes, for example hydrogenated and partially hydrogenated aliphatic-modified C9, hydrogenated C9, and hydrogenated and partially hydrogenated aliphatic-modified C9 resins. Likewise, PMR resins includes hydrogenated and partially hydrogenated PMR and C5 includes hydrogenated and partially hydrogenated C5 resin.

The term "PMR" as used herein means pure monomer thermoplastic resins. Pure monomer thermoplastic resins are produced from the polymerization of styrene-based monomers, such as, styrene, alpha-methyl styrene, vinyl toluene, and other alkyl substituted styrenes. Pure monomer thermoplastic resins are produced by any method known in the art. Pure monomer feedstock for the production of pure monomer thermoplastic resins are in some cases synthetically generated or highly purified monomer species. For example, styrene can be generated from ethyl benzene or alpha methyl styrene from cumene. In one embodiment, pure monomer hydrocarbon thermoplastic resins are prepared by cationic polymerization of styrene-based monomers such as styrene, alpha-methyl styrene, vinyl toluene, and other alkyl substituted styrenes using Friedel-Crafts polymerization catalysts such as Lewis acids (e.g., boron trifluoride ($BF_3$), complexes of boron trifluoride, aluminum trichloride ($AlCl_3$), and alkyl aluminum chlorides). Solid acid catalysts can also be utilized to produce pure monomer thermoplastic resins. The pure monomer thermoplastic resins disclosed herein are non-hydrogenated, partially hydrogenated, or fully hydrogenated resins. The term "hydrogenated" as used herein is also indicated alternatively in the shorthand "H2" and when H2 is used preceding or following a resin type it is intended to indicate that resin type is hydrogenated or partially hydrogenated, such as "PMR H2" and "C5 H2" for example. When "H2" is used herein, "H2" is meant to encompass both fully hydrogenated resin samples and partially hydrogenated resin samples. Thus, "H2" refers to the condition in which the resin is either fully hydrogenated or at least partially hydrogenated. Pure monomer thermoplastic resins are in some instances obtained as Piccolastic® styrenic hydrocarbon thermoplastic resins, Kristalex® styrenic/alkyl styrenic hydrocarbon thermoplastic resins, Piccotex® alkyl styrenic hydrocarbon thermoplastic resins, and Regalrez® hydrogenated or partially hydrogenated pure monomer thermoplastic resins from Eastman Chemical Company (Kingsport, Tenn., US).

The term "C5 thermoplastic resin" as used herein means aliphatic C5 hydrocarbon thermoplastic resins that are produced from the polymerization of monomers comprising C5 and/or C6 olefin species boiling in the range from about 20° C. to about 200° C. at atmospheric pressure. These monomers are typically generated from petroleum processing, e.g. cracking. The aliphatic C5 hydrocarbon thermoplastic resins of this invention can be produced by any method known in the art. In one embodiment, aliphatic C5 hydrocarbon thermoplastic resins are prepared by cationic polymerization of a cracked petroleum feed containing C5 and C6 paraffins, olefins, and diolefins also referred to as "C5 monomers." These monomer streams are comprised of cationically polymerizable monomers such as 1,3-pentadiene which is the primary reactive component along with cyclopentene, pentene, 2-methyl-2-butene, 2-methyl-2-pentene, cyclopentadiene, and dicyclopentadiene. The polymerizations are catalyzed using Friedel-Crafts polymerization catalysts such as Lewis acids (e.g., boron trifluoride ($BF_3$), complexes of boron trifluoride, aluminum trichloride ($AlCl_3$), and alkyl aluminum chlorides). In addition to the reactive components, nonpolymerizable components in the feed include saturated hydrocarbons that are in some instances co-distilled with the unsaturated components such as pentane, cyclopentane, or 2-methylpentane. Solid acid catalysts can also be utilized to produce aliphatic C5 hydrocarbon thermoplastic resins. Aliphatic C5 hydrocarbon thermoplastic resins include non-hydrogenated, partially hydrogenated, or fully hydrogenated resins. Aliphatic C5 thermoplastic resins can be obtained as Piccotac® C5 and Eastotac® C5 H2 thermoplastic resins from Eastman Chemical Company (Kingsport, Tenn., US).

The term "C5/C9 thermoplastic resin" as used herein means an aliphatic/aromatic hydrocarbon C5/C9 thermoplastic resin that is produced from the polymerization of monomers comprising at least one unsaturated aromatic C8, C9, and/or C10 species boiling in the range from about 100° C. to about 300° C. at atmospheric pressure and at least one monomer comprising C5 and/or C6 olefin species boiling in the range from about 20° C. to about 200° C. at atmospheric pressure. In one embodiment, C5 and/or C6 species include paraffins, olefins, and diolefins also referred to as "C5 monomers." These monomer streams are comprised of cationically polymerizable monomers such as 1,3-pentadiene which is the primary reactive component along with cyclopentene, pentene, 2-methyl-2-butene, 2-methyl-2-pentene, cyclopentadiene, and dicyclopentadiene. In one embodiment, unsaturated aromatic C8, C9, and/or C10 monomers are derived from petroleum distillates resulting from naphtha cracking and are referred to as "C9 monomers." These monomer streams are comprised of cationically polymerizable monomers such as styrene, alpha methyl styrene, beta-methyl styrene, vinyl toluene, indene, dicyclopentadiene, divinylbenzene, and other alkyl substituted derivatives of these components. The cationic polymerization is in some instances catalyzed using Friedel-Crafts polymerization catalysts such as Lewis acids (e.g., boron trifluoride ($BF_3$), complexes of boron trifluoride, aluminum trichloride ($AlCl_3$), and alkyl aluminum chlorides). Solid acid catalysts are also utilized to produce aliphatic/aromatic C5/C9 hydrocarbon thermoplastic resins. In addition to the reactive components, non-polymerizable components include, aromatic hydrocarbons such as xylene, ethyl benzene, cumene, ethyl toluene, indane, methylindane, naphthalene and other similar specifies. The non-polymerizable components of the feed stream are in some embodiments incorporated into the thermoplastic resins via alkylation reactions. Aliphatic/aromatic C5/C9 hydrocarbon thermoplastic resins include non-hydrogenated, partially hydrogenated resins, and hydrogenated resins. Aliphatic/aromatic C5/C9 thermoplastic resins can be obtained as Piccotac® thermoplastic resin from Eastman Chemical Company. The proportion of C5 to C9 is not limited. In other words, the amount of C5 monomer in the C5/C9 thermoplastic resin can be anywhere from 0.1 to 100% and vice versa the amount of C9 monomer in the C5/C9 thermoplastic resin can be from 0.1 to 100%.

The term "C9 thermoplastic resin" as used herein means an aromatic C9 hydrocarbon thermoplastic resin that is a thermoplastic resin produced from the polymerization of monomers comprising unsaturated aromatic C8, C9, and/or C10 species boiling in the range from about 100° C. to about 300° C. at atmospheric pressure. These monomers are typically generated from petroleum processing, e.g. cracking. The aromatic C9 hydrocarbon thermoplastic resins of this invention can be produced by any method known in the art. Aromatic C9 hydrocarbon thermoplastic resins are in one embodiment prepared by cationic polymerization of aromatic C8, C9, and/or C10 unsaturated monomers derived from petroleum distillates resulting from naphtha cracking and are referred to as "C9 monomers." These monomer streams are comprised of cationically polymerizable monomers such as styrene, alpha methyl styrene (AMS), beta-methyl styrene, vinyl toluene, indene, dicyclopentadiene, divinylbenzene, and other alkyl substituted derivatives of these components. Aliphatic olefin monomers with four to six carbon atoms are also present during polymerization in some embodiments of C9 resins. The polymerization is in some instances catalyzed using Friedel-Crafts polymerization catalysts such as Lewis acids (e.g., boron trifluoride ($BF_3$), complexes of boron trifluoride, aluminum trichloride ($AlCl_3$), and alkyl aluminum chlorides). In addition to the reactive components, nonpolymerizable components include, but are not limited to, aromatic hydrocarbons such as xylene, ethyl benzene, cumene, ethyl toluene, indane, methylindane, naphthalene, and other similar chemical species. The nonpolymerizable components of the feed stream are in some embodiments incorporated into the thermoplastic resins via alkylation reactions. C9 hydrocarbon thermoplastic resins include non-hydrogenated, partially hydrogenated, or fully hydrogenated resins. Aromatic C9 hydrocarbon thermoplastic resins can be obtained as Picco® C9 thermoplastic resin, and aliphatic hydrogenated and aliphatic/aromatic partially hydrogenated C9 H2 hydrocarbon thermoplastic resins can be obtained as Regalite® thermoplastic resin from Eastman Chemical Company.

The term "DCPD thermoplastic resin" as used herein means dicyclopentadiene (DCPD) thermoplastic resin, most commonly formed through ring opening metathesis polymerization (ROMP) of dicyclopentadiene in the presence of a strong acid catalyst, such as maleic acid or aqueous sulphuric acid, or thermal polymerization. Dicyclopentadiene is also formed in some embodiments by a Diels Alder reaction from two cyclopentadiene molecules and exists in two stereo-isomers: endo-DCPD and exo-DCPD. Typically, greater than 90% of the DCPD molecules present in commercial grades of DCPD are in the endo form. DCPD thermoplastic resins include aromatic-modified DCPD resins as well as hydrogenated, partially hydrogenated, and non-hydrogenated resins, though in most instances herein only H2 DCPD is described since it is the most readily commercially available form of DCPD. Aromatic-modified DCPD is also contemplated as a DCPD thermoplastic resin. Aromatic modification is, for instance, by way of C9 resin oil, styrene, or alpha methyl styrene (AMS), and the like. Hydrogenated and partially hydrogenated DCPD and hydrogenated and partially hydrogenated aromatic-modified DCPD resin is commercially available as Escorez® 5000-series resin (ExxonMobil Chemical Company, TX, US).

The term "terpene thermoplastic resin" or "polyterpene resin" as used herein means thermoplastic resins produced from at least one terpene monomer. For example, α-pinene, 0-pinene, d-limonene, and dipentene can be polymerized in the presence of aluminum chloride to provide polyterpene thermoplastic resins. Other examples of polyterpene thermoplastic resins include Sylvares® TR 1100 and Sylvatraxx® 4125 terpene thermoplastic resin (AZ Chem Holdings, LP, Jacksonville, Fla., US), and Piccolyte® A125 terpene thermoplastic resin (Pinova, Inc., Brunswick, Ga., US). Terpene thermoplastic resins can also be modified with aromatic compounds. Sylvares® ZT 105LT and Sylvares® ZT 115 LT terpene thermoplastic resins are aromatically modified (Az Chem Holdings, LP, Jacksonville, Fla., US).

The term "IC thermoplastic resin" or "IC resin" as used herein means indene-coumarone (IC) thermoplastic resin, i.e. a synthetic thermoplastic terpene resin formed using feedstocks of indene and coumarone made from heavy-solvent naphtha obtained from the distillation of coal tar, which is a by-product of coke production. Heavy-solvent naphtha is rich in coumarone and indene, but most especially indene, and can be modified with phenol. These feedstocks can be formed by polymerization in $BF_3$ or $BF_3$ etherates. Catalysts can be removed by an alkaline wash or lime after polymerization. The resin can be isolated by steam distilling off the unreacted naphtha. IC thermoplastic resins can be used as plasticizers, and secure stress-strain properties at high levels. Examples of such resins include Novares® C indene-coumarone and Novares® CA phenol-modified indene-coumarone thermoplastic resin, which are commercially available from Rutgers Germany GmbH., Duisburg, Germany.

It is to be understood that encompassed by the above definitions of certain types of thermoplastic resins, such as DCPD, PMR, C5, C9, C5/C9, IC, terpene, and the like, including hydrogenated, partially-hydrogenated, and non-hydrogenated versions of these resins, that these thermoplastic resins include resins of similar types generated by mixing or blending of dissimilar feedstocks to produce heterogeneous mixtures of the feedstocks used to generate the thermoplastic resins. Furthermore, it is to be understood that at least with respect to the PMR and terpene thermoplastic resins discussed herein these thermoplastic resins encompass various known derivatives of such thermoplastic resins such as phenol-modified and rosin-modified versions of the resins.

The term "thermoplastic resin oligomers" or "oligomer" refers to the dimer, trimer, tetramer, and/or pentamer species of polymerized monomers that comprise the thermoplastic resin.

The term "dimer" as used herein means a moiety encompassing two covalently linked units of a monomer. For instance, in the synthesis of a thermoplastic resin by way of polymerization of one or more types of monomers, a dimer is a species comprising two of the monomers. The dimer may either be a homodimer or heterodimer or a mixture of combinations thereof.

The term "trimer" as used herein means a moiety encompassing three covalently linked units of a monomer. For instance, in the synthesis of a thermoplastic resin by way of polymerization of one or more types of monomers, a trimer is a species comprising three of the monomers. The trimer may either be a homotrimer or heterotrimer or a mixture of combinations thereof.

The term "tetramer" as used herein means a moiety encompassing four covalently linked units of a monomer. For instance, in the synthesis of a thermoplastic resin by way of polymerization of one or more types of monomers, a tetramer is a species comprising four of the monomers. The tetramer may either be a homotetramer or heterotetramer or a mixture of combinations thereof.

The term "pentamer" as used herein means a moiety encompassing five covalently linked units of a monomer. For instance, in the synthesis of a thermoplastic resin by way of polymerization of one or more types of monomers, a pentamer is a species comprising five of the monomers. The pentamer may either be a homopentamer or heteropentamer or a mixture of combinations thereof. The term "oligomer" or "oligomers" as used herein means a mixture or combination of dimers, trimers, tetramers, and pentamers.

Modified Resins

Disclosed herein are modified hydrocarbon thermoplastic resins that are low molecular weight polymeric structures, i.e. Mn less than about 5,000 g/mol, polymerized from a mixture of different monomers or a single monomer. Thermoplastics and thermoplastic resins are polymers that turn to liquid when heated and turn solid when cooled. They can be repeatedly re-melted and remolded, allowing parts and scraps to be reprocessed. In most cases, such thermoplastic resins are also very recyclable. Amorphous thermoplastic resins have a randomly ordered molecular structure that does not possess a sharp melt point. Instead, amorphous materials soften gradually as the temperature rises. These materials change viscosity when heated. Amorphous thermoplastic resins are isotropic in flow, shrinking uniformly in the direction of flow and transverse to flow. As a result, amorphous materials typically exhibit lower mold shrinkage and less tendency to warp than the semi-crystalline thermoplastic materials. Amorphous thermoplastic resins tend to lose their strength quickly at temperatures above their glass transition temperature (Tg). Above its glass transition temperature, Tg, and below its melting point, Tm, if semi-crystalline, the physical properties of a thermoplastic change drastically without an associated phase change. Within this temperature range, most thermoplastics are rubbery due to alternating rigid crystalline regions, if present, and elastic amorphous regions, approximating random coils.

The polymerization of thermoplastic resins from monomer units is typically performed in organic solvent according to known procedures in the art. The solvent is then removed by evaporation after the polymerization process resulting in the hydrocarbon thermoplastic resin. During the evaporation process the solvent is selectively removed, but most oligomers (dimer, trimer, tetramer, and/or pentamer species) remain in the polymerized hydrocarbon thermoplastic resin.

However, improvement of such thermoplastic resins is sometimes desired to obtain more desirable physical properties in various applications (noted below). It has been surprisingly discovered that by selectively removing a percentage of the low molecular weight oligomers of polymerized thermoplastic resins, the Tg of the modified thermoplastic resin created thereby is increased with respect to non-modified thermoplastic resins. Decreasing the relative amount of the low molecular weight dimer, trimer, tetramer, and pentamer species in modified thermoplastic resins as compared to unmodified thermoplastic resins is accomplished without increasing the amount of high molecular weight species in the modified thermoplastic resin. When used in some applications, for instance in an elastomeric tire tread compound, such modified thermoplastic resins provide surprisingly improved wet grip versus rolling resistance performance balance.

Thermoplastic resins useful in this regard, i.e. thermoplastic resins that benefit from modification as disclosed herein, include, but are not limited to, the following: PMR, DCPD, C5, C9, C5/C9, terpene, and IC thermoplastic resins, for example, as well as hydrogenated, partially-hydrogenated, and non-hydrogenated versions of these resins. Other resins known in the art can also be amendable to the disclosed modification process to produce similar marked improvements in resin compositions incorporating the disclosed modified thermoplastic resins.

Thus, especially in elastomeric rubber compositions comprising thermoplastic resins, it is desired that the following thermoplastic resin parameters be optimized: low oligomer content, resulting in a high value of Tg to obtain the largest impact on the viscoelastic properties of thermoplastic resin-elastomer blends, and a low Mz value to maintain full thermoplastic resin-elastomer compatibility.

The modified thermoplastic resins disclosed herein are therefore modified in the sense that the amount of relatively low molecular weight species, i.e. thermoplastic resin species (monomers, dimers, trimers, tetramers, and/or pentamers) having a molecular weight (Mn) value of less than about 600 g/mol, or 300 g/mol, are decreased as compared with the corresponding unmodified thermoplastic resins. The feedstock for the modified thermoplastic resins is typically derived from petroleum, pine tree, citrus peel, or hydrocarbon monomers. The glass transition temperature (Tg) of the disclosed modified thermoplastic resins depends on the number average molecular weight (Mn). This characteristic is described by the Flory-Fox equation (Formula II):

$$T_g(M_n) \approx T_{g,\infty} - K/M_n \qquad \mathrm{II}$$

The Tg and Mn values of the Flory-Fox equation are as defined herein. The symbol $T_{g,\infty}$ is defined as the maximum glass transition temperature that can be achieved at a theoretical infinite molecular weight. The value of K is the empirical constant related to the free volume present in the polymer thermoplastic resin sample. This relationship shows that polymeric thermoplastic resins with an Mn value of greater than 5,000 g/mol (polymers) possess a constant Tg, while polymeric structures with an Mn value of less than 5,000 g/mol (thermoplastic resins) show a strong dependence of the value of Tg on the value of Mn. Given this definition, it is clear to one of skill that thermoplastic resins differ in composition from polymers.

Thus, disclosed are modified thermoplastic resins that achieve a high Tg value while maintaining to a large degree the original Mn value of the corresponding non-modified thermoplastic resin. In one embodiment, the Tg value of the modified thermoplastic resin is from about −50° C. to 160° C. In another embodiment, the Tg value is from about 0° C. to 140° C. In a further embodiment, the Tg value of the modified thermoplastic resin is from about 20° C. to 120° C. The Tg value of the modified thermoplastic resin may be anywhere from −50° C., −40° C., −30° C., −20° C., −10° C., 0° C., 10° C., 20° C., or 30° C., to anywhere from 120° C., 130° C., 140° C., 150° C., and 160° C. and all ranges included therebetween.

In one embodiment, the modified thermoplastic resins disclosed herein possess a number average molecular weight (Mn) having a value of less than about 1,000 g/mol. In another embodiment, the Mn value of the modified thermoplastic resin is less than about 850 g/mol. In yet another embodiment, the Mn value of the modified thermoplastic resin is less than about 900 g/mol. However, the Mn value of the modified thermoplastic resin can be any value of less than about 1,000 g/mol, 950 g/mol, 900 g/mol, 850 g/mol, 800 g/mol, 750 g/mol, 700 g/mol, 650 g/mol, 600 g/mol, 550 g/mol, 500 g/mol, 450 g/mol, 400 g/mol, 350 g/mol, 300 g/mol, and 250 g/mol.

The amount of oligomer species present in the modified thermoplastic resin, in other words the fraction of the modified thermoplastic resin that is composed of dimers, trimers, tetramers, and/or pentamer, as determined by high resolution TGA, is in one embodiment less than about 38 wt %. In another embodiment, the amount of oligomeric species present in the modified thermoplastic resin is less than about 15 wt %. In yet another embodiment, the amount of oligomer species present in the modified thermoplastic resin is less than about 10 wt %. It should be noted that since different thermoplastic resins comprise different amounts of monomers, dimers, trimers, tetramers, and/or pentamers, the amount of each specific species may change, or may remain the same. However, overall, the amount of the sum of all of these species is less than about 40 wt %, 10 wt %, or even less than about 5 wt %. In other embodiments, the amount of oligomeric species present in the modified thermoplastic resin is less than about 40 wt %, 38 wt %, 36 wt %, 34 wt %, 32 wt %, 30 wt %, 28 wt %, 26 wt %, 24 wt %, 22 wt %, 20 wt %, 18 wt %, 16 wt %, 14 wt %, 12 wt %, 10 wt %, 9 wt %, 8 wt %, 7 wt %, 6 wt %, 5 wt %, or even about 4 wt % of the total thermoplastic resin in the modified thermoplastic resin.

The z-average molecular weight, Mz, of the modified thermoplastic resins is preferably less than about 9,500 g/mol, more preferably less than about 8,000 g/mol, and most preferably less than about 6,000 g/mol. In other embodiments, the modified thermoplastic resin possesses an Mz value of less than about 9,000 g/mol, 8,500 g/mol, 8,000 g/mol, 7,500 g/mol, 7,000 g/mol, 6,500 g/mol, 6,000 g/mol, 5500 g/mol, 5000 g/mol, 4500 g/mol, 4000 g/mol, 3500 g/mol, 3000 g/mol, 2500 g/mol, 2000 g/mol, 1500 g/mol, 1000 g/mol, or about 900 g/mol.

Values for Tg/Mz across all resin types, either modified or unmodified, are generally between about 0.02 K/(g/mol) to about 0.7 K/(g/mol). Standard resins generally possess an Mn value of as low as about 300 g/mol, but lower values are possible.

The modified thermoplastic resins disclosed herein can be described based on other physical properties as well. In addition to the values of Mn, Tg, and percent of oligomeric species, the modified thermoplastic resins can be described by the relationship between the variables of the following Formula I:

$$S = \left(\frac{T_g}{M_z}\right) \Big/ \left[\text{Oligomer} \times \left(1 - \frac{T_{10}}{T_{max}}\right)\right] \quad \text{I}$$

wherein Tg is the glass transition temperature in degrees Celsius of the thermoplastic resin;

wherein Mz is the z-average molecular weight of the thermoplastic resin;

wherein "Oligomer" is the fractional percentage of oligomer present in the modified thermoplastic resin as measured by high resolution thermogravimetric analysis (TGA) or by gel permeation chromatography (GPC), Oligomer being defined as dimer, trimer, tetramer, and/or pentamer compounds of the monomer comprising the thermoplastic resin polymer;

wherein $T_{10}$ is the temperature (in degrees Celsius) at which the modified thermoplastic resin loses about 10% of its starting weight as measured by high resolution thermal gravimetric analysis (TGA); and wherein $T_{max}$ is the temperature (in degrees Celsius) of the maximum first derivative value of the modified thermoplastic resin as measured by high resolution thermal gravimetric analysis (TGA).

The value of "S" according to the equation of Formula I of the modified thermoplastic resins depends directly on the manner in which the value of Oligomer is measured, i.e., by high resolution TGA or GPC. Furthermore, the value of "S" depends also on whether, when Oligomer is measured by GPC, the value is referring to the fraction of resin having a molecular weight below 600 g/mol or below 300 g/mol. These various ranges for the value of "S" are provided in Tables 1A and 1B, for GPC measurements, and Table 1C for high resolution TGA measurement. Additionally, as noted in Tables 1A, 1B, and 1C, the value of "S" depends on the resin type that is subjected to the modification process. For instance, as provided in Table 1B, the value of S as measured by GPC for resins of the C5, C5/C9, C5 H2 and C5/C9 H2, C9, PMR, PMR H2, C9 H2, and DCPD H2 types, S values range from 2 to 30,000. However, theoretically, if Oligomer is as low as about 0.001, the value of S can be as high as about 4,000,000 or more. For instance, in one embodiment, the value of Oligomer is about 0.01, and the value of S therefore is as much as 400,000 or more. Referring to Formula I again, the smallest measured delta for $T_{10}/T_{max}$ is about 2.27 degrees apart. In such an embodiment where $T_{10}/T_{max}$ is as low as about 2.27, and Oligomer is as low as about 0.01, then the value of S is as high as about 784,000 or possibly higher. Given the same parameters, in another embodiment, if $T_{10}/T_{max}$ is about 1, and Oligomer is as low as 0.01, then S in this embodiment is as high as about 1,800,000.

The modified thermoplastic resins possess a value of $T_{10}/T_{max}$ of about 0.70 to about 0.98. In other embodiments, the modified thermoplastic resins disclosed herein possess a $T_{10}/T_{max}$ value of greater than or equal to about 0.75, 0.76, 0.77, 0.78, 0.79, 0.80, 0.85, 0.90, 0.91, 0.92, 0.93, 0.94, 0.95 or even 0.98.

In certain embodiments, the modified thermoplastic resins having an Mz<9,000 g/mol as disclosed herein possess a reduction in oligomer content as compared with corresponding unmodified thermoplastic resins. The modified thermoplastic resin oligomer content is reflected in Table 1A, 1B, and 1C, below, and as determined by GPC (Table 1A and Table 1B) or high resolution TGA (Table 1C) methodologies, said methodologies described in Example 2, below. Unmodified thermoplastic resin oligomer values are provided for comparison in Table 2, below.

TABLE 1A

Properties of Modified Thermoplastic Resins Having an Mz <9,000 g/mol, as Determined by GPC (Polystyrene Equivalents)

| Resin Type | Tg/Mz (K/(g/mol)) Requirement | AND/OR | % Resin < 300 g/mol | AND/OR | % Resin < 600 g/mol |
|---|---|---|---|---|---|
| C5 | — | AND | <3, <2, or <1 | AND/OR | <17, <10, or <5 |
| C5/C9 | — | AND | <3, <2, or <1 | AND/OR | <17, <10, or <5 |

TABLE 1A-continued

Properties of Modified Thermoplastic Resins Having an Mz <9,000 g/mol, as Determined by GPC (Polystyrene Equivalents)

| Resin Type | Tg/Mz (K/(g/mol)) Requirement | AND/OR | % Resin < 300 g/mol | AND/OR | % Resin < 600 g/mol |
|---|---|---|---|---|---|
| C5 H2 and C5/C9 H2 | — | AND | <15, <10, or <5 | AND/OR | <45, <40, or <30 |
| C9 | >0.09 | AND | <5, <3, or <1 | AND | <25, <20, or <15 |
| PMR | ≥0.14 | AND | ≤2.5, <1, or <0.5 | AND | ≤19, <10, or <5 |
| PMR H2 | ≥0.30 | AND | <10, <5, or <3 | AND/OR | <45, <40, or <20 |
| PMR H2 | <0.30 | AND | <10, <5, or <3 | AND/OR | <30, <20, or <10 |
| C9 H2 | ≥0.19 | AND | ≤10, <7, or <5 | AND | <34, <30, or <25 |
| DCPD H2 | >0.25 | AND | <16, <10, or <5 | AND/OR | <55, <45, or <40 |

TABLE 1B

Properties of Modified Thermoplastic Resins Having an Mz <9,000 g/mol, as Determined by GPC (Polystyrene Equivalents)

| Resin Type | S Value Tg/Mz (K/(g/mol)) Requirement | AND/OR | S Value when Oligomer is <600 g/mol | S Value when Oligomer is <300 g/mol |
|---|---|---|---|---|
| C5 | — | AND | >8, >25, >100, or >200 | >36, >100, >1000, or >2000 |
| C5/C9 | — | AND | 8, >25, >1000, or >2000 | >36, >100, >1000, or >2000 |
| C5 H2 and C5/C9 H2 | — | AND | >5, >20, or >50 | >10, >20, or >50 |
| C9 | >0.09 | AND | >8, >15, >50, or >100 | >38, >50, >1000, or >3000 |
| PMR | — | AND | >14, >56, >100, >500, or >1000 | >67, >100, >500, >1000, >5000, or >10,000 |
| PMR H2 | ≥0.30 | AND | >8, >12, >40, >55, or >75 | >26, >75, >125, >300, >500, >1000, or >1500 |
| PMR H2 | <0.30 | AND | >2, >15, >40, >75, or >125 | >5, >50, >100, >500, >1000, or >2000 |
| C9 H2 | ≥0.19 | AND | >6, >10, >35, or >45 | >29, >60, >120, or >300 |
| DCPD H2 | — | AND | >5, >10, >50, or >80 | >17, >40, >100, >500, or >1000 |

TABLE 1C

Properties of Modified Thermoplastic Resins Having an Mz <9,000 g/mol, as Determined by High Resolution TGA

| Resin class | Tg/Mz (K/(g/mol)) Requirement | AND/OR | S | % Oligomer | $T_{10}/T_{max}$ (×100) |
|---|---|---|---|---|---|
| C5 | — | AND | ≥5, >30, >50, >100, >300, >400, or >600 | <14, <8, or <4 | ≥92, >94, or >98 |
| C5/C9 | — | AND | ≥10, >30, >50, >100, >300, >400, or >600 | <15, <8, or <4 | ≥92, >94, or >98 |
| C5 H2 and C5/C9 H2 | — | AND | ≥10, >30, >50, >100, >300, >400, or >600 | <30, <20, or <10 | ≥90, >94, or >98 |
| C9 | ≥0.12 | AND | ≥16, >30, >50, >100, >500, >1000, >2000, or >4000 | ≤15, <8, or <4 | ≥88, >94, or >98 |
| PMR | ≥0.14 | AND | >12, >26, >50, >100, >500, >1000, >2000, or >4000 | <17, <8, or <4 | ≥90, >94, or >98 |
| PMR H2 | ≥0.30 | AND | ≥22, >30, >50, >100, >300, >600, >800, or >1000 | ≤16, <8, or <4 | >85, >90, or >94 |
| PMR H2 | <0.30 | AND | ≥5, >30, >50, >100, >300, >600, >800, >1000, >1500, or >2000 | <38, <8, or <4 | >75, >90, or >94 |
| C9 H2 | ≥0.19 | AND | ≥16, >30, >50, >100, >150, >175, >200 or >220 | <13, <8, or <4 | ≥90, >94, or >98 |
| DCPD H2 | >0.25 | AND | ≥10, >30, >50, >100, >300, >600, >800, or >1000 | <31, <20, or <10 | >85, >90, or >94 |

That is, the fraction of the modified thermoplastic resins described herein having a molecular weight of less than 600 g/mol as well as the fraction having a molecular weight of less than 300 g/mol, i.e., the oligomer percentage, is determined by gel permeation chromatography (GPC) in Table 1A and Table 1B. Table 1C also presents properties of the modified thermoplastic resins determined by high resolution TGA. GPC and high resolution TGA methodologies for determining the low molecular weight oligomer fractions (oligomers) of the modified resins are related in a linear manner. (See, FIGS. 1A, 1B, 1C, and 1D for correlations).

Thus, as set forth in Table 1A, for example, C5 and C5/C9 modified thermoplastic resins described herein possess no restrictions with regard to the Tg/Mz value, the percent modified resin having a molecular weight of less than 300 g/mol as determined by GPC is less than 3%, less than 2%, or less than 1%, and/or the percent modified resin having a molecular weight of less than 600 g/mol as determined by GPC is less than 17%, less than 10%, or less than 5%. That is, when determined by GPC analysis, the percent resin having a molecular weight of less than 300 g/mol is a sufficient characteristic to define the modified thermoplastic resin of C5 and C5/C9. Likewise, the percent resin having a molecular weight of less than 600 g/mol is a sufficient characteristic to define the modified thermoplastic resin of C5 and C5/C9. On the other hand, Table 1A discloses that with respect to C9 resins, for example, both conditions must be met if being characterized by GPC. That is, the amount of oligomers having a molecular weight of less than 300 g/mol in modified C9 resins is less than 5%, less than 3%, or less than 1%, and the amount of oligomers having a molecular weight of less than 600 g/mol in modified C9 resins is less than 25%, less than 20%, or less than 15%. Thus, for C9 resins, for example, both the stated conditions for % oligomer must be met to meet the definition of a modified thermoplastic resin. This is the meaning attributed to the "AND/OR" column in Table 1A. Furthermore, Table 1A notes that these amounts of oligomers found in modified thermoplastic C9 resins is true only when the modified thermoplastic C9 resins possess a Tg/Mz value greater than 0.09 K/(g/mol).

Turning to Table 1B, it is observed that the S value, when measured by GPC, changes depending on whether the oligomer is defined as % resin below 600 g/mol or % resin below 300 g/mol. Referring to Formula I, it can be readily understood that if the Oligomer term is in the denominator of the fraction defining the value of S, then changing the Oligomer cut off from less than 600 g/mol to less than 300 g/mol will impact the value of S. Thus, Table 1B lists the different S values that are possible when defining a modified thermoplastic resin, depending on whether Oligomer is defined by a cut off of % resin below 600 g/mol as compared with % resin below 300 g/mol. As with Table 1A, there are additional qualifications in the definition of S in Table 1B with respect to the value of Tg/Mz for certain starting resin types. For instance, when the starting resin type is C9 H2, then the values of S provided in Table 1B are only true for modified thermoplastic resins that also possess a Tg/Mz value of ≥0.19 (K/(g/mol)).

On the other hand, when analyzed by high resolution TGA, when the value of Tg/Mz is as defined herein for a certain resin type as set forth in Table 1C, then the modified thermoplastic resins described herein possess any one or more of the characteristics provided in Table 1C under the "TGA" header. Thus, In Table 1C for example in the context of starting resin C5, S is greater than or equal to 5, and in some embodiments greater than 30, and in other embodiments greater than 50. Where there is a dash ("-") indicated in any of Table 1A, 1B, or 1C, this means there is no further restriction on the Tg/Mz values with respect to modified resin properties and that the indicated modified resin property values in the table for these resins applies across all Tg/Mz values.

It is additionally noted that with respect to the "AND/OR" qualifications in Tables 1A, 1B, and 1C, if not otherwise stated, the qualification is "AND" or "OR." In other words, if the "AND/OR" column is not present, or if it is not otherwise stated, then either the first condition or the second condition (listed from left to right in the Table) must be met, or both the first condition and the second condition must be met to meet the definition of a modified thermoplastic resin as described herein.

As can be seen in Tables 1A, 1B, and 1C, some modified resins of certain classes, such as PMR, PMR H2, C9 H2, DCPD H2, and C9, in some embodiments, possess a specific Tg/Mz value, while other modified resins, such as C5, C5/C9, C5 H2, and C5/C9 H2, can be identified without reference to this value, since in the later embodiments the modified resins are sufficiently characterized or distinguished from unmodified resins based solely on the percent resin oligomer of less than 300 g/mol and/or less than 600 g/mol (as determined by GPC). Likewise, when analyzing the modified resins by high resolution TGA, some modified resins of certain types such as PMR, PMR H2, C9 H2, DCPD H2, and C9, possess a specific Tg/Mz value, while other modified resins can be identified without reference to this value, since in the later embodiments the modified resins are sufficiently characterized or distinguished from unmodified resins based solely on the percent oligomer as measured by high resolution TGA, S value, and/or $T_{10}/T_{max}$ value.

In comparison to the values of Tables 1A, 1B, and 1C, corresponding unmodified thermoplastic resins of all resin types tested possess the relative amounts of oligomers as determined by GPC and high resolution TGA as reflected in Table 2, below.

TABLE 2

Properties of Unmodified Thermoplastic Resins having an Mz <9,000 g/mol and Specified Tg/Mz Values

| | | GPC | | HIGH RESOLUTION TGA | | | |
|---|---|---|---|---|---|---|---|
| Resin Type | Tg/Mz (K/(g/mol)) | % Resin <300 g/mol | % Resin <600 g/mol | Tg/Mz (K/(g/mol)) | S | % Oligomer | $T_{10}/T_{max}$ (×100) |
| C5 | — | 3-7 | 17-26 | 0.08-0.10 | 2-10 | 13-31 | 71-89 |
| C5/C9 | — | 3-7 | 17-26 | 0.04-0.11 | 3-6 | 17-21 | 81-84 |
| C5 H2 | — | 16-28 | 54-61 | 0.13-0.23 | 1-5 | 31-48 | 55-79 |

TABLE 2-continued

Properties of Unmodified Thermoplastic Resins having an Mz <9,000 g/mol and Specified Tg/Mz Values

| | | GPC | | HIGH RESOLUTION TGA | | | |
|---|---|---|---|---|---|---|---|
| Resin Type | Tg/Mz (K/(g/mol)) | % Resin <300 g/mol | % Resin <600 g/mol | Tg/Mz (K/(g/mol)) | S | % Oligomer | $T_{10}/T_{max}$ (×100) |
| C9 | <0.09 | 5-10 | 15-39 | 0.13-0.31 | 4-16 | 16-42 | 66-87 |
| PMR | ≥0.14 | 3-9 | 15-31 | 0.14-0.30 | 2-11 | 17-52 | 72-91 |
| PMR H2 | — | 10-23 | 32-49 | 0.20-0.33 | 3-22 | 18-39 | 70-85 |
| C9 H2 | ≥0.19 | 8-28 | 23-70 | 0.19-0.53 | 3-11 | 21-57 | 65-81 |
| DCPD H2 | >0.25 | 7-53 | 31-84 | 0.27-0.54 | 2-10 | 32-64 | 63-83 |

Thus, it can be readily observed that the modified thermoplastic resins described herein possess substantially reduced amounts of oligomer as compared to their unmodified counterparts, comparing Table 1 values to Table 2 values, at least as determined by GPC and high resolution TGA methodologies.

To reduce the amount of the oligomeric fraction of the thermoplastic resins, that is, the dimer, trimer, tetramer, and/or pentamer species, several techniques known in the art are suitable, such as, but not limited to, one or more of: membrane separation, selective precipitation, selective polymerization conditions, evaporation and distillation, and preparative gel permeation chromatography.

Membrane separation is commonly employed as a purification technique in thermoplastic resin chemistry. (See, for instance, Bowen et al., *Chem. Eng. Res. Des.*, 76(8):885-893, 1998, and Llosa Tanco et al., *Process*, 4(29):1-21, 2016). In this method, the membrane is typically a selective barrier that permits the separation of certain chemical species in a liquid by a combination of sieving and sorption diffusion mechanism. Membranes can selectively separate components of a liquid composition based on particle size, over a wide range of particle sizes and molecular weights, from large polymeric, i.e. greater than 5,000 g/mol Mn, to low monomolecular materials. Given this ability, membrane separation is a suitable technology to remove oligomeric species fractions from thermoplastic resins of many different types.

Selective precipitation is also suitable for removing oligomeric fractions from thermoplastic resins. (See, for example, Niederauer et al., *Bioseparation*, Vol. 47, "Advances in Biochemical Engineering/Biotechnology," pages 159 to 188, 2006; and Loadman, M. J. R., "Analysis of Rubber and Rubber-Like Polymers," 4th Ed., Springer Science and Business Media, B.V., Dordrecht, Netherlands, 1998). The solubility in a given solvent depends on its concentration, molecular weight, and the temperature of the solution. Under certain conditions, the thermoplastic resin with a molecular weight above a certain value is not soluble anymore and precipitates, while the low molecular weight species remain soluble. By separating the precipitate from the solution by filtration or centrifuging, the oligomeric fractions can be removed from thermoplastic resins.

Another technique commonly used to separate oligomers from thermoplastic resins is preparative gel permeation chromatography, sometimes referred to in the literature as size exclusion chromatography (SEC) or gel permeation chromatography. (See, for example, Lesec, J., *J. Liquid Chrom.*, 8(5):875-923, 2006; and Striegel, A. et al., "Modern Size-Exclusion Liquid Chromatography: Practice of Gel Permeation and Gel Filtration Chromatography," 2nd Ed., John Wiley & Sons, Inc., Hoboken, N.J., 2009). This methodology is successfully applied in the pharmaceutical industry to separate and fractionate mixtures. As applied to thermoplastic resin samples, a solution of the thermoplastic resin sample is applied to the top of a gel column. The gel particles have distinct pore sizes of a diameter that is in the same range of the thermoplastic resin. The low molecular weight fraction of the thermoplastic resin will diffuse deep into the gel particle pores, while the larger molecular weight fractions of the thermoplastic resin can only diffuse a small distance into the gel. As a consequence, the larger sized molecules of thermoplastic resin are less retained then the smaller sized molecules, resulting in a separation between the oligomeric fraction of the thermoplastic resin and larger thermoplastic resin molecules.

Evaporation (wiped film evaporation) and distillation techniques are widely used to separate oligomers from thermoplastic resins. (See, for instance, U.S. Pat. No. 4,160,692). Temperature and pressure are important parameters to achieve adequate separation. In addition, the use of a carrier gas, such as a stream of nitrogen, or stream of steam, can help to improve the separation, but also specific designs of evaporation/distillation hardware, such as thin film evaporators, or distillation columns, can enhance the separation. Evaporation has typically a lower selectivity than distillation and is used when there is a large difference in boiling point between the distillate and residue.

Compositions Comprising Modified Thermoplastic Resins and Uses Thereof

The modified thermoplastic resins described above can be incorporated into various chemical compositions with numerous applications. The chemical compositions are, for example, solvent borne, waterborne, emulsions, 100% solids, or hot melt compositions/adhesives. For instance, the modified thermoplastic resins can be blended with polymers. More specifically, in one embodiment, various thermoplastic elastomers, EVAs, various polyolefins, polyesters, acrylics, and acrylates can be blended with the disclosed modified thermoplastic resins. In another embodiment, modified thermoplastic resin compositions include rubber compositions or mixtures comprising various polymers and rubber compounds commonly used in, for example, the tire industry, explained in further detail below. Provided below are several non-limiting examples of how the disclosed modified thermoplastic resins can be incorporated into various products to impart on these products beneficial and useful properties not previously available.

Disclosed are modified thermoplastic resins that can be easily blended with other polymers as known in the art. As explained above, the modified thermoplastic resins are processed in a manner that decreases or reduces the amount of low molecular weight species, i.e. dimers, trimers, tetramers, and/or pentamers, from the modified thermoplastic resin as compared with the corresponding unmodified thermoplastic resin. The modified thermoplastic resins therefore possess a lower oligomer content. The low oligomer content of the modified thermoplastic resins provides these modified thermoplastic resins with a better compatibility with polymers and a higher glass transition temperature (Tg) to z-average molecular weight (Mz) ratio (Tg/Mz) than is currently available with similar commercial unmodified thermoplastic resins. More specifically, the polymers of interest for modification are typically thermoplastic elastomers (such as styrene block copolymers), elastomers (such as styrene-butadiene rubber (SBR), butadiene rubber (BR), and natural rubber), ethylene vinyl acetate (EVA) polymers, various polyolefins and alpha-polyolefins, reactor-ready polyolefins, thermoplastic olefins, polyesters, acrylics, and acrylates, filled and unfilled, with and without crosslinking.

The thermoplastic elastomer compositions further optionally include polyolefins comprising amorphous or crystalline homopolymers or copolymers of two or more different monomers derived from alpha-mono-olefins having from 2 to about 12 carbon atoms, or from 2 to about 8 carbon atoms. Non-limiting examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Additional suitable polyolefins include, but are not limited to, low density polyethylene, high-density polyethylene, linear-low-density polyethylene, poly-propylene (isotactic and syndiotactic), ethylene/propylene copolymers, polybutene, and olefinic block copolymers. Polyolefin copolymers also include the greater part by weight of one or more olefin monomers and a lesser amount of one or more non-olefin monomers, such as vinyl monomers including vinyl acetate, or a diene monomer, EPDM, and the like. Generally, a polyolefin copolymer includes less than about 30 weight percent of a non-olefin monomer, less than 20 weight percent, or less than about 10 weight percent of a non-olefin monomer. Polyolefin polymers and copolymers are commercially available from sources including, but not limited to, Chevron, Dow Chemical, DuPont, Exxon Mobil, REXtac, LLC, Ticona, and Westlake Polymer under various designations.

Migration and volatilization of low molecular weight components of currently commercially available unmodified thermoplastic resins used to modify elastomeric compounds such as adhesives, thermoplastic elastomer (TPE) compounds, molding compounds, mastics, etc. causes release of unpleasant odors, volatiles, fogging, product defects, reduced product cohesive strength, reduced adhesion, degradation of performance over time, and increased cost by using larger amounts of thermoplastic resin to get the desired change in property provided by the higher molecular weight portion of the thermoplastic resin used.

TPE compositions incorporating the modified resins described herein are in some embodiments formed into a variety of articles as well understood by those of ordinary skill in the art. For example, TPE compositions are reprocessed, such as by being pressed, compression molded, injection molded, calendared, thermoformed, blow-molded, or extruded into final articles and embodiments thereof. When reprocessing TPE compositions, the composition is generally heated to a temperature of at least the softening or melting point of the thermoplastic component of the TPE composition in order to facilitate further forming into desired articles of various shapes and sizes. The end user of the TPE compositions will benefit by the processing advantages described throughout this disclosure.

Any polymer known in the art can be mixed with the modified thermoplastic resins described herein to create compositions useful in various end products such as adhesives, described herein. For instance, in one embodiment, TPEs include, but are not limited to, block copolymers thermoplastic/elastomer blends and alloys, such as styrenic block copolymers (TPE-S), metallocene-catalyzed polyolefin polymers and elastomers, and reactor-made thermoplastic polyolefin elastomers. Block copolymers include, but are not limited to, styrenic block copolymer, olefin block copolymer, co-polyester block copolymer, polyurethane block copolymer and polyamide block copolymer. Thermoplastic/elastomer blends and alloys include, but are not limited to, thermoplastic polyolefins and thermoplastic vulcanizates. Two-phase TPEs are in some embodiments combined with the disclosed modified thermoplastic resins in these end use applications described herein. TPE-S copolymers include, but are not limited to, styrene-butadiene-styrene block copolymer (SBS), styrene-ethylene/butylene-styrene block copolymer (SEBS), styrene-ethylene-ethylene/propylene-styrene block copolymer (SEEPS), and styrene-isoprene-styrene block copolymer (SIS).

Use of the modified thermoplastic resins disclosed herein having reduced oligomers will provide better compatibility in elastomeric compounds, increasing or maintaining the desired performance improvements in properties such as, but not limited to, adhesion, cohesion, dimensional stability, chemical stability, and heat resistance.

Having a modified thermoplastic resin with an increased Tg/Mz ratio can increase the change in the desired performance per unit of the modified thermoplastic resin added to a composition, such as providing equivalent or better peel adhesion at lower loading of modified thermoplastic resin than of current commercially available unmodified thermoplastic resin. The reduction in oligomers can reduce outgassing or volatilization of low molecular weight components, providing advantages such as reduced defects due to bubbles, reduced odor, and reduced fogging. The reduction in oligomers/oils of the modified thermoplastic resins can also reduce the possibility of migration of the modified thermoplastic resin into an adjacent material, such as rubber, film, food, etc. This reduces any contamination issues, and reduced changes in performance of either material, such as reducing the tendency of an elastomer to become brittle due to out-migration of a plasticizing compound.

Tables 3A and 3B present expected performance enhancements from incorporation of modified thermoplastic resins having a narrow molecular weight distribution, i.e. possessing a relatively reduced amount of oligomer fraction, i.e. dimers, trimers, tetramers, and/or pentamers, particularly modified thermoplastic resins with little to no monomer, dimer, trimer, and/or pentamer content, in various applications where we envision these attributes to be advantageous. Upper case "X" indicated in Tables 3A and 3B indicates which attribute that is achievable by the modified thermoplastic resin disclosed herein and that is desirable in each application. A brief discussion of the application and appropriate testing to show improvement follows Tables 3A and 3B.

TABLE 3A

Expected Performance Enhancements From Modified Thermoplastic Resins

| Applications | Attributes | | | | |
|---|---|---|---|---|---|
| | Adhesive strength per phr added | Cohesive strength per phr added | Heat resistance per phr added | Reduced volatility, reduced fogging & out gassing | Reduced component migration |
| Thermoplastic Elastomer (TPE) compounds | X | X | X | X | X |
| Food contact grade adhesives (plastics directive approval) | X | X | | X | X |
| Pressure sensitive adhesives | X | X | X | X | X |
| sealants, caulks | X | X | X | X | X |
| coupling agents for wood-plastic composites | X | X | | X | X |
| low profile additive for sheet molding compounds (SMCs) and dough molding compounds (DMCs) | X | X | | X | X |
| polymeric plasticizers/modifiers for polyvinyl chloride (PVC), etc. | X | X | X | X | X |
| film modification | X | X | X | X | X |
| woodworking adhesives | X | X | X | X | X |
| Disposables, nonwovens (Hygiene particularly elastic adhesives) | X | X | X | X | X |
| Packaging (rigid, e.g. cardboard) | X | X | X | X | X |
| Laminating adhesives (flex pack, industrial, and the like) | X | X | X | X | X |
| Heat seal coatings/adhesives | X | X | X | X | X |
| lidding - heat seal | X | X | X | X | X |
| Rubber modification for gaskets, hoses, etc. | X | X | X | X | X |
| Investment casting wax | X | X | | X | X |
| Structural adhesives | X | X | X | X | X |
| tackifiers/modifiers for polyacrylic blends | X | X | X | X | X |
| Cementitious adhesives (concrete, mastics, and the like) | X | X | X | X | X |
| Textile sizing (woven, nonwoven) | X | X | X | X | X |
| Automotive components | X | X | X | X | X |

TABLE 3B

Expected Performance Enhancements From Modified Thermoplastic Resins

| Applications | Attributes | | | | | |
|---|---|---|---|---|---|---|
| | reduced odor, taste effects | Dimensional stability | Reduced high Mz fraction - better compatibility | Reduced high Mz fraction - better aged stability | Faster processing | Reduced product defects |
| TPE compounds | | X | X | X | X | X |
| Food contact grade adhesives (plastics directive approval) | X | | X | X | X | X |

TABLE 3B-continued

Expected Performance Enhancements From Modified Thermoplastic Resins

| Applications | reduced odor, taste effects | Dimensional stability | Reduced high Mz fraction - better compatibility | Reduced high Mz fraction - better aged stability | Faster processing | Reduced product defects |
|---|---|---|---|---|---|---|
| Pressure sensitive adhesives | | | X | X | | X |
| sealants, caulks | | X | X | X | | X |
| coupling agents for wood-plastic composites | | | X | | X | X |
| low profile additive for SMC (sheet molding compound) and DMC compounds | | X | X | | X | X |
| polymeric plasticizers/modifiers for PVC etc. | | X | X | X | X | X |
| film modification | | X | X | X | X | X |
| woodworking adhesives | X | | X | X | X | X |
| Disposables, nonwovens (Hygiene particularly elastic adhesives) | X | | X | X | X | X |
| Packaging (rigid, e.g., cardboard) | X | | X | X | X | X |
| Laminating adhesives (flex pack, industrial, etc.) | X | X | X | | X | X |
| Heat seal coatings/adhesives | X | | X | | X | X |
| lidding - heat seal | X | | X | | X | X |
| Rubber modification for gaskets, hoses, and the like | | X | X | X | X | X |
| Investment casting wax | | X | X | | X | X |
| Structural adhesives | | X | X | X | | X |
| tackifiers/modifiers for polyacrylic blends | | | X | | X | X |
| Cementitious adhesives (concrete, mastics, etc.) | | X | X | | X | X |
| Textile sizing (woven, nonwoven) | | | X | | X | X |
| Automotive components | | X | X | | X | X |

The modified thermoplastic resins can perform advantageously in the following useful applications. The removal of volatile oligomers would especially benefit products such as low shrinkage sheet molded articles and dough molded compounds, for example, by reducing the occurrence of bubbles and other defects in the molded part. Additionally, the disclosed modified thermoplastic resins can reduce cycle time because of the absence of low molecular weight fractions with low glass transition temperatures. Also, product appearance can be improved by reduction of haze caused by high Mz components present in current commercially available unmodified thermoplastic resins.

Low profile additives are thermoplastic/elastomeric polymers that are added to polyester or glass composites during formulation to improve surface finish and avoid shrinkage. It is known that composites undergo high volumetric shrinkage during polymerization of unsaturated polyester thermoplastic resin resulting in poor surface appearance, fiber prominence, warpage of molded parts and internal cracks and voids. Low profile additives are typically mixed with unsaturated polyester thermoplastic resins to prevent shrinkage during polymerization (7% to 10% by volume) to conserve its dimensional stability. During polymerization, low profile additives, and unsaturated polyester thermoplastic resins are in homogeneous liquid phase and with the rise in temperature unsaturated polyester thermoplastic resins polymerize causing expansion of low profile additives. (See, "Low Profile Additives (LPA) Market Analysis by Product (PVA, PMMA, PS, HDPE), by Application (SMC/BMC, Pultrusion®) And Segment Forecasts to 2020" by Grand View Research, Published April 2015, Report ID: 978-1-68038-240-2.

The modified thermoplastic resins disclosed herein can be incorporated into compositions for non-migrating plasticizers, for example in PVC extruded articles, or in adhesives in contact with plastics and/or elastomeric compounds into which the low molecular weight components of the currently commercially available unmodified thermoplastic resins products would migrate.

The low polydispersity can also provide improved performance at reduced addition levels (or phr, parts thermoplastic resin per hundred parts of rubber/elastomer/polymer), as compared with corresponding non-modified thermoplastic resins, resulting in a reduced cost product.

Additionally, higher levels of performance can be obtained at addition levels equal to or less than current use levels in an application since the narrow polydispersity can yield improved compatibility/solubility in the compound/formulation.

Also, the reduced high molecular weight tail of the modified thermoplastic resins described herein can improve compatibility with elastomeric, thermoplastic, and composite compositions, improving long-term stability of the compounds.

Further, the absence of low Tg components in the modified thermoplastic resins can allow compounds such as packaging adhesives to "set" more quickly, permitting greater formulation flexibility, possibly reducing the number of packages that fail by opening prematurely, and/or enabling increased processing speed on packaging lines and reducing cost. Additionally, the reduction in high Mz components of the disclosed modified thermoplastic resin can provide improved compatibility with the other components of a compound. This improved compatibility can result in a narrower glass transition of the compound, resulting in faster set times, lower heat sealing temperatures and/or faster heat seal processing.

Thus, the modified thermoplastic resins can be used with advantageous properties, such as enhancement of flexibility, prevention of stress cracking, improved processability, in many contexts, such as, but not limited to, hydrogenation for performance enhancers for rubber formulations, nitration for polyacrylic blends, hydrogenation to metallocene polyethylene (m-PE) tackifier applications for adhesives, hydrogenation to SBS tackifier applications for nonwoven adhesives, precision casting for lost-wax precision castings for increased dimensional stability, polyester applications for low profile additives in sheet molding compounds (SMCs) and dough molding compounds (DMCs), maleic anhydride additives for fiberglass reinforced plastics, as an additive for expanded polystyrene and lightweight concrete, as cellulosic fillers for coupling agents for wood-plastic composite materials, and in combination with plasticizers for non-migrating polymeric plasticizers for polyvinyl chloride (PVC) extrusions, and the like.

Disposable hygiene articles comprising an adhesive comprising the modified thermoplastic resins can exhibit improved adhesive strength and cohesive strength by improved values in peel adhesion testing of the laminate construction, improved peel adhesion after aging at body temperature, reduced creep of elastic strands over time, and improved core stability in a final hygiene article. Said articles may also exhibit improves chemical resistance and barrier properties, particularly regarding exposure to fluids such as body fluids.

Adhesives useful in packaging, product assembly, woodworking, automotive assembly and other applications, which are based on ethylene vinyl acetate, ethylene-butyl-acrylate, acrylics, semi-crystalline single-site catalyzed (metallocene) polyolefins, predominantly amorphous poly alpha-olefins such as Ziegler-Natta catalyzed polymers, reactor-ready polyolefins, thermoplastic olefins, and styrene block copolymers would exhibit improved adhesive and cohesive strength as measured by peel adhesion failure temperature (PAFT) testing, fiber tear testing, peel testing on adhered structures, shear adhesion failure temperature (SAFT) testing, IoPP (Institute of Packaging Professionals, Naperville, Ill., US) test T-3006 Heat Stress Resistance of Hot Melt Adhesives, and shear hold power. Set times can be measured using various bond testers with adjustable compression and de-bonding times. Said adhesives comprising the modified thermoplastic resin would exhibit improved heat resistance as evidenced by fiber tear or peel adhesion testing at elevated temperatures such as 60° C. Improved chemical resistance may be shown by reduced degradation of adhesive and cohesive strength after exposure to selected chemicals. More detailed description of adhesive applications of the modified thermoplastic resins described herein is provided below.

Non-vulcanized compositions comprising the modified thermoplastic resins disclosed herein can act as superior plasticizers or can improve plasticizer performance by reducing migration, as evidenced to improved adhesion over time, particularly after heat aging, as evidenced by any of the test methods above: PAFT, SAFT, peel, fiber tear, shear hold power at and above room temperature. Similarly, said compositions may exhibit improved adhesion to difficult surfaces or to substrates with migratory components (e.g. slip aids or plasticizers), as evidenced by the above listed adhesion tests.

Investment casing wax compositions comprising the disclosed modified thermoplastic resins can exhibit improved rheology for consistent production of parts, as evidenced by the composition rheology (stress-strain curves). Improved dimensional stability of the wax casting composition and improved casting composition stability during mold making are evidenced by improved tolerances on the cast product.

Heat seal coatings and adhesives can exhibit heat resistance by improved peel adhesion testing at temperatures near and above the sealing temperatures using ASTM F88.

Sealants can exhibit reduced fogging of sealed windows after aging.

The improved structural stability of sealants and gaskets and other rubber-based materials can be evidenced by improved dimensional stability following compression or elongation.

Vibration and sound damping improvement can be measured by ASTM E756 for sealants, gaskets, structural adhesives, cementitious, bitumen, and asphalt adhesives, thermoplastic elastomer (TPE) compounds and pressure sensitives.

Mastics containing bitumen, asphalt, or similar materials can have lower viscosity than current compositions, allowing easier processing, while exhibiting comparable or better adhesion to aggregate components, fillers, and substrates such as stone or cement, as evidenced by tensile testing on adhered stone or cement samples. Such mastics find application in the production of bridge decking, flooring, road construction, and roofing.

Reduction of low molecular components in compositions, particularly food packaging adhesives, can be measured by recent tests being used to measure mineral oil content at Fraunhofer Institute in Germany, as follows:

MOSH=Mineral oil saturated hydrocarbons
MOAH=Mineral oil aromatic hydrocarbons

Reduction of low molecular weight components in compositions such as pressure sensitive adhesives (tape, label, graphics protective films, window film) can provide performance improvements measured by, for example:

Adhesive strength: 180 degree peel test, e.g., PSTC 101.
Cohesive strength: static shear test (room temp. or elevated temp.), e.g., PSTC 107.
Temperature resistance: shear adhesion failure temperature (SAFT), e.g., PSTC 17 or AFERA 5013 GTF 6001.

Reduction of low molecular components in thermoplastic elastomers (TPEs) can provide performance improvements measured by, for example:

Cohesive strength: tensile (ASTM 638), and tear (ASTM D624).

Compression set (elasticity) ASTM 395-15

Temperature resistance: elevated temperature tensile and tear strength, and elevated temperature compression set (ASTM 395-15).

Performance improvements resulting from reduced low molecular weight components in the modified resin in various composites can be measured using, for example:

Standard Guide for Testing Polymer Matrix Composite Materials (ASTM D4762-16);

Standard Test Method for Tensile Properties of Polymer Matrix Composite Materials (ASTM D3039/D3039M-14); and Standard Test Method for Glass Transition Temperature (DMA Tg) of Polymer Matrix Composites by Dynamic Mechanical Analysis (DMA) (ASTM D7028-07(2015)).

In general resistance to solvents, water, foods, cleaning products, and other chemicals can be measured by direct exposure up to and including immersion for a period of time followed by testing above to compare to pristine material testing. Visual observations are made in general for degradation of articles during/after exposure. Uptake of the test fluid can be measured gravimetrically or spectroscopically.

Barrier properties are tested in specialized equipment to measure the flow rate of gases, water vapor, fluids, and the like, through a film of material.

Compatibility with fillers can be discerned indirectly via improved mechanical properties relative to controls. Also, it is typical to evaluate with various microscopic techniques the type and degree of dispersion of the filler.

One problem associated with pressure-sensitive adhesives (PSAs) based on tackified elastomeric blends is diffusion and migration of tackifiers and other species from the adhesive composition or article components into the facestock or substrate. As a result, the facestock or substrate may become stained over time and the construction may lose some adhesion. This migration or bleed through of some or all components of an adhesive, compounded film, or other composition comprising thermoplastic resins can also leave a residue on the bonded surface upon removal, such as with protective films, or can cause undesired surface contamination, skin irritation, etc. More critical to adhesive applications, compounds comprising thermoplastic resins or multilayer films, the migration or "bleed through" of chemical components towards the bonded interfaces, e.g. adhesive-substrate or film-adhesive-nonwoven, can cause immediate or delayed reduction or elimination of bond strength, damage to the bonded or laminated article, and/or reduction of adhesion with aging.

U.S. Pat. No. 6,214,935 describes the use of an intermediate softening point resins having a ring and ball softening point of from about 35° C. to 60° C. and an aromatic content of from about 5% to 25% as a method to reduce bleed through and staining of label facestock paper due to tackifier components, but handling such semi-solid, highly viscous resins that cold flow over time is very challenging and costly. Thus, there is a need for thermoplastic resins for use in adhesives that can be used alone or in combination with other thermoplastic resins and that exhibit reduced volatile components, fog generation, and migration.

The aforementioned compositions comprising the modified thermoplastic resins in some embodiments further comprise at least one polymer and about 0 to about 75 wt % un-modified thermoplastic tackifying resin. In another embodiment, the adhesive composition comprises at least one thermoplastic elastomer and at least one thermoplastic resin, in addition to the modified thermoplastic resin. The thermoplastic elastomer can, for instance be one or more of hydrogenated and/or nonhydrogenated styrenic block copolymers including, but not limited to, styrene-butadiene-styrene block copolymer (SBS), styrene-ethylene/butylene-styrene block copolymer (SEBS), styrene-[ethylene-(ethylene/propylene)]-styrene block copolymer (SEEPS), and/or styrene-isoprene-styrene block copolymer (SIS). In another embodiment, the adhesive compositions described herein exhibit a viscosity at 177° C. of about 50 to about 10,000 cP, and a softening point of about 60 to about 180° C. and are suitable adhesives.

In the composition embodiments described herein, the adhesive compositions can comprise at least 1, 2, 3, 4, 5, 10, 15, 20, 25, 30, 35, 40, 45, 50, 55, or 60 and/or not more than 99, 95, 90, 85, 80, 75, 70, or 65 weight percent of at least one modified thermoplastic resin.

In various embodiments, the compositions comprise 10, 20, 30, or 40 and/or not more than 90, 80, 70, or 55 weight percent of at least one polymer component. Exemplary polymer components of the disclosed compositions include, but are not limited to, ethylene vinyl acetate copolymer, ethylene n-butyl acrylate copolymer, ethylene methyl acrylate copolymer, polyester, neoprene, acrylics, urethane, poly (acrylate), ethylene acrylic acid copolymer, polyether ether ketone, polyamide, styrenic block copolymers, random styrenic copolymers, hydrogenated styrenic block copolymers, styrene butadiene copolymers, natural rubber, polyisoprene, polyisobutylene, atactic polypropylene, polyethylene including atactic polypropylene, ethylene-propylene polymers, propylene-hexene polymers, ethylene-butene polymers, ethylene octene polymers, propylene-butene polymers, propylene-octene polymers, metallocene-catalyzed polypropylene polymers, metallocene-catalyzed polyethylene polymers, ethylene-propylene-butylene terpolymers, copolymers produced from propylene, ethylene, and various $C_4$-$C_{10}$ alpha-olefin monomers, polypropylene polymers, functional polymers such as maleated polyolefins, butyl rubber, polyester copolymers, copolyester polymers, isoprene, the terpolymer formed from the monomers ethylene, propylene, and a bicyclic olefin (known as "EPDM"), isoprene-based block copolymers, butadiene-based block copolymers, acrylate copolymers such as ethylene acrylic acid copolymer, butadiene acrylonitrile rubber, and/or polyvinyl acetate.

The compositions disclosed herein, in various embodiments, contain elastomer, tackifier resin, and other additives such as, but not limited to, oils, waxes, plasticizers, antioxidants, and fillers, depending on the end use application. In various embodiments, the compositions comprise at least about 5, 10, 15, 20, 25, 30, 35, 40, 45, or 50, and/or not more than 500, 450, 400, 350, or 300 parts of elastomer, tackifier resin, and/or other additives per 100 parts of modified thermoplastic resin. For example, in one embodiment, the compositions disclosed herein contain about 50 to about 300 parts of elastomer per 100 parts of modified thermoplastic resin.

As noted above, in some embodiments, the described compositions comprise additives particularly suitable for a specific end-use application. For example, if the adhesive is intended to serve as a hot melt packaging adhesive, as noted above, then in this embodiment, the composition will further comprise a wax. In some embodiments, the adhesive composition comprises at least 1, 2, 5, 8, or 10 and/or not more than 40, 30, 25, or 20 weight percent of at least one wax. In another embodiment, the compositions described herein comprise about 1 to about 40, about 5 to about 30, about 8 to about 25, or about 10 to about 20 weight percent of at least one wax. Suitable waxes include, without limitation, microcrystalline wax, paraffin wax, waxes produced by Fischer-Tropsch processes, vegetable wax, functionalized waxes (maleated, fumerated, or wax with functional groups), and the like. In such embodiments, a wax is included in the composition in an amount of between about 10 and about 100 parts wax per 100 parts of the elastomer component.

In pressure sensitive adhesive (PSA) composition embodiments, such as adhesives used in tapes, mastics, and labels, and in nonwoven applications of the described adhesive compositions, various oils are added to the adhesive compositions. In one embodiment, the adhesive composition comprises at least about 1, 2, 5, 8, or about 10 and/or not more than about 40, 30, 25, or about 20 weight percent of at least one processing oil. In another embodiment of pressure sensitive adhesive compositions, the adhesive compositions comprise about 2 to about 40, about 5 to about 30, about 8 to about 25, or about 10 to about 20 weight percent of at least one processing oil. Processing oils include, but are not limited to, mineral oils, naphthenic oils, paraffinic oils, aromatic oils, castor oils, rape seed oil, triglyceride oils, and combinations thereof. Processing oils also include extender oils that are commonly used in various pressure-sensitive adhesive compositions. In another embodiment, the described adhesive composition comprises no processing oils.

In another embodiment of the compositions, one or more plasticizers are added to the adhesive compositions, such as, but not limited to, phthalate esters such as, for example, dibutyl phthalate and dioctyl phthalate, benzoates, terephthalates, and chlorinated paraffins. In one embodiment, the described adhesive compositions comprise at least about 0.5, 1, 2, or about 3 and/or not more than about 20, 10, 8, or about 5 weight percent of at least one plasticizer. In another embodiment, the adhesive compositions comprise about 0.5 to about 20, about 1 to about 10, about 2 to about 8, or about 3 to about 5 weight percent of at least one plasticizer. Other exemplary plasticizers include Benzoflex™ and Eastman 168™ (Eastman Chemical Company, Kingsport, Tenn., US).

In other embodiments, the compositions that incorporate one or more modified resins further comprise at least about 0.1, 0.5, 1, 2, or about 3 and/or not more than about 20, 10, 8, or about 5 weight percent of at least one antioxidant. Any antioxidant known to a person of ordinary skill in the art may be used in the adhesion compositions disclosed herein. Non-limiting examples of suitable antioxidants include amine-based antioxidants such as alkyl diphenyl amines, phenyl-naphthylamine, alkyl or aralkyl substituted phenyl-naphthylamine, alkylated p-phenylene diamines, tetramethyl-diaminodiphenylamine and the like; and hindered phenol compounds such as 2,6-di-t-butyl-4-methylphenol; 1,3,5-trimethyl-2,4,6-tris(3',5'-di-t-butyl-4'-hydroxybenzyl)benzene; tetrakis [(methylene(3,5-di-t-butyl-4-hydroxyhydrocinnamate)] methane, such as IRGANOX® 1010 (BASF Corp., LA, US); octadecyl-3,5-di-t-butyl-4-hydroxycinnamate, such as IRGANOX® 1076 (BASF Corp., LA, US) and combinations thereof. Where used, the amount of the antioxidant in the composition can be from about greater than 0 to about 1 wt %, from about 0.05 to about 0.75 wt %, or from about 0.1 to about 0.5 wt % of the total weight of the composition. In another such embodiment, the adhesive compositions comprise about 0.1 to about 20, about 1 to about 10, about 2 to about 8, or about 3 to about 5 weight percent of at least one antioxidant.

In another embodiment of the compositions, the composition comprises one or more fillers, such as, but not limited to, carbon black, calcium carbonate, titanium oxide, and zinc oxide. In another embodiment of the described compositions, the compositions comprise at least about 10, 20, 30, or about 40 and/or not more than about 90, 80, 70, or about 55 weight percent of at least one filler. In a further embodiment, the compositions comprise about 1 to about 90, about 20 to about 80, about 30 to about 70, or about 40 to about 55 weight percent of at least one filler.

Additionally, other tackifier resins are present in various embodiments of the described compositions, which are optionally present in the form of physical blends. Tackifier resins added to the described compositions in this embodiment include, without limitation, cycloaliphatic hydrocarbon resins, $C_5$ hydrocarbon resins, $C_5/C_9$ hydrocarbon resins, aromatically modified $C_5$ resins, $C_9$ hydrocarbon resins, pure monomer resins, e.g., copolymers of styrene with alpha-methyl styrene, vinyl toluene, para-methyl styrene, indene, and methyl indene, DCPD resins, dicyclopentadiene based/containing resins, cyclo-pentadiene based/containing resins, terpene resins, terpene phenolic resins, terpene styrene resins, esters of rosin, esters of modified rosins, liquid resins of fully or partially hydrogenated rosins, fully or partially hydrogenated rosin esters, fully or partially hydrogenated modified rosins resins, fully or partially rosin alcohols, fully or partially hydrogenated $C_5$ resins, fully or partially hydrogenated $C_5/C_9$ resins, fully or partially hydrogenated DCPD resins, fully or partially hydrogenated dicyclopentadiene based/containing resins, fully or partially hydrogenated cyclo-pentadiene based/containing resins, fully or partially hydrogenated aromatically modified $C_5$ resins, fully or partially hydrogenated $C_9$ resins, fully or partially hydrogenated pure monomer resins, e.g., copolymers or styrene with alpha-methyl styrene, vinyl toluene, para-methyl styrene, indene, and methyl indene, fully or partially hydrogenated $C_5$/cycloaliphatic resins, fully or partially hydrogenated $C_5$/cycloaliphatic/styrene/$C_9$ resins, fully or partially hydrogenated cycloaliphatic resins, and mixtures thereof.

In some embodiments, the compositions described herein include other conventional plastic additives in an amount that is sufficient to obtain a desired processing or performance property for the adhesive. The amount should not be wasteful of the additive nor detrimental to the processing or performance of the adhesive. Those skilled in the art of thermoplastics compounding, without undue experimentation but with reference to such treatises as Plastics Additives Database (2004) from Plastics Design Library (www.elsevier.com) can select from many different types of additives for inclusion into the compounds described herein. Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; oils and plasticizers; processing aids; release agents; silanes, titanates and zirconates; slip and anti-blocking agents; stabilizers (for example, Irganox® 1010 and Irganox® 1076, BASF Corporation, LA, US); stearates; ultraviolet light absorbers; viscosity regulators; waxes; and combinations thereof. Antioxidants are particularly useful for these compounds to provide additional durability.

Such compositions are manufactured in one embodiment by blending the modified thermoplastic resin with an elastomer (at least one polymer) to form the adhesive. That is, the adhesive compositions described herein are in one embodiment prepared by combining the modified thermoplastic resin, the elastomer, and the additives using conventional techniques and equipment. As a non-limiting exemplary embodiment, the components of the compositions described herein are blended in a mixer such as a Sigma blade mixer, a plasticorder, a Brabender mixer, a twin-screw extruder, and/or an in-can blend can (pint-cans). In another embodiment, the compositions are shaped into a desired form, such as a tape or sheet, by an appropriate technique including, for example, extrusion, compression molding, calendaring, or roll coating techniques (gravure, reverse roll, and the like). In some embodiments, the compositions described herein are applied using curtain coating, slot-die coating, or sprayed through different nozzle configurations at different speeds using typical application equipment.

In another embodiment, the compositions described herein are applied to a substrate by melting the composition and then using conventional hot melt adhesive application equipment recognized in the art to coat the substrate with the composition. Substrates include, for example, textile, fabric, paper, glass, plastic, and metal materials. Typically, about 0.1 to about 100 g/m$^2$ of adhesive composition is applied to a substrate.

The modified thermoplastic resins described herein, in some embodiments, are incorporated into various types of compositions including, but not limited to, hot melt or solvent based pressure sensitive adhesives, e.g., tapes, labels, mastics, HVACs, and the like, hot melt nonwoven adhesives, e.g., those for use in the construction industry, for elastic attachment, or for stretching, and hot melt packaging adhesives. Furthermore, the modified thermoplastic resins described herein in another embodiment are incorporated into different polymer systems as explained above to provide excellent physical and chemical properties in terms of processability, stability, thermal properties, viscoelasticity, rheology, volatility, fogging profiles, and/or adhesion and mechanical properties of such polymer systems. Moreover, the modified thermoplastic resins described herein enhance various physical and chemical properties in thermoplastic elastomer applications such as roofing applications (construction), adhesives, sealant applications, cable flooding/filling applications, and tire elastomer applications, e.g., tread compositions, side walls, inner liners, inner-tubes, and various other pneumatic tire components, for example.

While the preceding discussion is primarily directed to adhesive applications incorporating the modified thermoplastic resins described herein, these principals can be generally expanded and applied to other thermoelastic polymer compositions comprising the modified thermoplastic resins for use in a myriad number of end products. For instance, polymer modification applications for thermoplastic elastomers incorporating the modified thermoplastic resins described herein include, but are not limited to, roofing applications (such as asphalt modifiers in modified bitumen roofing), water proofing membranes/compounds, underlayments, cable flooding/filling compounds, caulks and sealants, polymer compounds/blends, films, e.g., cling films, TPE films, Biaxially Oriented PolyPropylene (BOPP) films, and the like, molded articles, rubber additive/processing aids, carpet backing, e.g., high performance precoat, thermoplastic compound, and the like, wire and cables, power and hand tools, pen grips, airbag covers, grips and handles, seals, and laminated articles, e.g., paper lamination, water activated, hot melt gummed, scrim reinforced tape, and the like. When incorporated into these various end use applications, the described modified thermoplastic resins in some embodiments are the sole resin in the compositions. In other embodiments, the modified thermoplastic resins are combined with other resins, elastomers/polymers, and/or additives. In such combined resin applications, the aforementioned compositions comprise at least about 1, 2, 3, 4, 5, 10, 15, 20, 25, 30, 35, 40, 45, 50, 55, or about 60 and/or not more than about 99, 95, 90, 85, 80, 75, 70, or about 65 weight percent of at least one modified thermoplastic resin.

Thus, in various embodiments, one or more of the modified thermoplastic resins described herein are incorporated into hot melt adhesive compositions. According to one or more embodiments, the adhesives therefore comprise at least about 1, 5, 10, 20, 30, 40, 50, or 60 and/or not more than about 95, 90, 80, 70, or 60 weight percent (wt %) of the modified thermoplastic resins, or mixtures thereof. Moreover, the adhesives in other embodiments comprise in the range of about 1 to 95, 5 to 90, 10 to 80, 20 to 70, 30 to 60, or 40 to 60 weight percent of the modified thermoplastic resins described herein, or mixtures thereof. In certain additional embodiments, the adhesives are entirely comprised of one or more the modified thermoplastic resins described herein. Furthermore, depending on the desired end use, these hot melt adhesives also comprise, in certain embodiments, various additives such as, for example, polymers, tackifiers, processing oils, waxes, antioxidants, plasticizers, pigments, and/or fillers.

In various embodiments, the adhesives comprise at least about 5, 10, 20, 30, or 40 and/or not more than about 95, 90, 80, 70, or 55 weight percent of at least one resin that is different from the modified thermoplastic resins described herein. Moreover, the adhesives comprise, in other embodiments, in the range of about 10 to 90, 20 to 80, 30 to 70, or 40 to 55 weight percent of at least one resin that is different from the modified thermoplastic resins described herein. Contemplated resins include any suitable resin listed hereinabove.

In various embodiments, the adhesives comprise at least about 10, 20, 30, 40, 50, or 60 and/or not more than about 90, 80, 70, or 60 weight percent of at least one tackifier. Moreover, the adhesives comprise in such embodiments in the range of about 10 to 90, 20 to 80, 30 to 70, or about 40 to 60 weight percent of at least one tackifer. Suitable tackifiers contemplated herein include, for example, cycloaliphatic hydrocarbon resins, C5 hydrocarbon resins; C5/C9 hydrocarbon resins; aromatically-modified C5 resins; C9 hydrocarbon resins; pure monomer resins such as copolymers of styrene with alpha-methyl styrene, vinyl toluene, para-methyl styrene, indene, methyl indene, C5 resins, and C9 resins; terpene resins; terpene phenolic resins; terpene styrene resins; rosin esters; modified rosin esters; liquid resins of fully or partially hydrogenated rosins; fully or partially hydrogenated rosin esters; fully or partially hydrogenated modified rosin resins; fully or partially hydrogenated rosin alcohols; fully or partially hydrogenated C5 resins; fully or partially hydrogenated C5/C9 resins; fully or partially hydrogenated aromatically-modified C5 resins; fully or partially hydrogenated C9 resins; fully or partially hydrogenated pure monomer resins; fully or partially hydrogenated C5/cycloaliphatic resins; fully or partially hydrogenated C5/cycloaliphatic/styrene/C9 resins; fully or partially hydrogenated cycloaliphatic resins; and combinations thereof. Exemplary commercial hydrocarbon resins include Regalite™ hydrocarbon resins (Eastman Chemical Co., Kingsport, Tenn., US).

In various embodiments, the adhesives comprise at least about 1, 2, 5, 8, or 10 and/or not more than about 40, 30, 25, or 20 weight percent of at least one processing oil. Moreover, in such embodiments, the adhesives comprise in the range of about 2 to 40, 5 to 30, 8 to 25, or about 10 to 20 weight percent of at least one processing oil. Suitable processing oils are those known in the art, and include, for example, mineral oils, naphthenic oils, paraffinic oils, aromatic oils, castor oils, rape seed oil, triglyceride oils, or combinations thereof. As one skilled in the art would appreciate, processing oils may also include extender oils, which are commonly used in adhesives. The use of oils in the adhesives are in some instances desirable if the adhesive is to be used as a pressure-sensitive adhesive (PSA) to produce tapes or labels or as an adhesive to adhere nonwoven articles. In certain additional embodiments, the adhesive comprises no processing oils.

In various embodiments, the adhesives comprise at least about 1, 2, 5, 8, or 10 and/or not more than about 40, 30, 25, or 20 weight percent of at least one wax. Moreover, in such embodiments, the adhesives comprise in the range of about 1 to 40, 5 to 30, 8 to 25, or 10 to 20 weight percent of at least one wax. Suitable waxes can include those known in the art, for example, microcrystalline wax, paraffin wax, waxes produced by Fischer-Tropsch processes, functionalized waxes (maleated, fumerated, or wax with functional groups etc.) and vegetable wax. The use of waxes in the adhesives are desirable in certain instances if the adhesive is to be used as a hot melt packaging adhesive. In certain embodiments, the adhesive comprises no wax.

In various embodiments, the adhesives comprise at least about 0.1, 0.5, 1, 2, or 3 and/or not more than about 20, 10, 8, or 5 weight percent of at least one antioxidant. Moreover, in such embodiments, the adhesives comprise in the range of about 0.1 to 20, 1 to 10, 2 to 8, or 3 to 5 weight percent of at least one antioxidant. In other embodiments, the adhesive contains no antioxidant.

In various embodiments, the adhesives comprise at least about 0.5, 1, 2, or 3 and/or not more than about 20, 10, 8, or 5 weight percent of at least one plasticizer. Moreover, in such embodiments, the adhesives comprise in the range of about 0.5 to 20, 1 to 10, 2 to 8, or 3 to 5 weight percent of at least one plasticizer. Suitable plasticizers are those known in the art, and include, for example, dibutyl phthalate, dioctyl phthalate, chlorinated paraffins, and phthalate-free plasticizers. Commercial plasticizers include, for example, Benzoflex™ and Eastman168™ plasticizers (Eastman Chemical Co., Kingsport, Tenn., US).

In various additional embodiments, the adhesives comprise at least about 10, 20, 30, or 40 and/or not more than about 90, 80, 70, or 55 weight percent of at least one filler. Moreover, in such embodiments, the adhesives comprise in the range of about 1 to 90, 20 to 80, 30 to 70, or 40 to 55 weight percent of at least one filler. Suitable fillers are those known in the art and include, for example, carbon black, calcium carbonate, titanium oxide, zinc oxide, or combinations thereof.

In another embodiment, a non-vulcanized composition comprising the modified thermoplastic resin comprises about 10 to about 90 weight percent of at least one polymer, about 5 to about 70 weight percent of at least one modified thermoplastic resin, about 0 to about 60 weight percent of at least one thermoplastic tackifying resin, about 0 to about 50 weight percent of at least one wax, about 0 to about 60 weight percent of at least one oil or plasticizer, about 0.5 to about 3 weight percent of at least one stabilizer, and about 0 to about 70 weight percent of at least one filler. Alternatively, such compositions comprise about 40 to about 90 weight percent of at least one polymer, about 10 to about 60 weight percent of at least one modified thermoplastic resin, about 0 to about 50 weight percent of at least one thermoplastic tackifying resin, about 0 to about 30 weight percent of at least one wax, and about 0 to about 20 weight percent of at least one oil or plasticizer. Alternatively, such embodiments, which are pressure sensitive adhesive embodiments, comprise about 15 to about 70 weight percent, or about 35 or 40 to about 55 weight percent, of the polymer, wherein greater than about 15 weight percent of the at least one polymer is an elastomeric polymer, about 35 to about 70 weight percent of the modified thermoplastic resin, about 0 to about 50 weight percent of the at least one thermoplastic tackifying resin, and about 5 to about 35 weight percent of the at least one oil or plasticizer. In another such embodiment, the composition comprises about 10 to about 80 weight percent of the at least one polymer, wherein the at least one polymer is an elastomer, about 5 to about 20 weight percent of the at least one thermoplastic polymer, wherein the thermoplastic polymer is a polyolefin polymer or copolymer, about 5 to about 25 weight percent of the modified thermoplastic resin, about 0 to about 15 weight percent of at least one thermoplastic tackifying resin, about 2 to about 60 weight percent of at least one oil or plasticizer, and about 10 to about 70 weight percent of at least one filler. In another embodiment of the non-vulcanized compositions comprising the modified thermoplastic resins described herein comprise about 40 to about 90 weight percent of the at least one polymer, about 10 to about 60 weight percent of the at least one modified thermoplastic resin, about 0 to about 50 weight percent of the at least one thermoplastic tackifying resin, about 0 to about 30 weight percent of the at least one wax, and about 0 to about 20 weight percent of the at least one oil or plasticizer.

In such embodiments, the at least one modified thermoplastic resin has a glass transition temperature (Tg) of between −50° C. and 160° C. In such embodiments, the modified thermoplastic resin additionally possesses the properties set forth in Formula I, above, wherein the value of S is greater than or equal to 2 and less than 50,000 when Oligomer is determined by GPC, or greater than or equal to 5 and less than 10,000 when Oligomer is determined by high resolution TGA; and wherein the value of Mz is less than or equal to 9,000 g/mol. Alternatively, or additionally, in such embodiments, the modified thermoplastic resin has a glass transition temperature (Tg) of between −50° C. and 160° C. and a number average (Mn) molecular weight of less than 3,000 g/mol. Additionally, or alternatively, in this embodiment the modified thermoplastic resin has a z-average molecular weight (Mz) of less than 9,000 g/mol and the modified thermoplastic resin comprises less than or equal to 38 wt % oligomers as measured by the high resolution thermal gravimetric analysis (TGA), or less than 55% oligomers of equal to or less than 600 g/mol as measured by GPC.

Rubber Compositions Comprising Modified Thermoplastic Resins

Disclosed are rubber compositions for use in, for example, automotive components, such as, but not limited to, tires and tire components, automotive belts, hoses, brakes, and the like, as well as non-automotive and/or mechanical devices including technical rubber articles such as, for example, belts, as in conveyor belts, for instance, straps, brakes, and hoses or tubing, and the like, as well as clothing articles, such as, but not limited to, shoes, boots, slippers, and the like, that incorporate the disclosed modified thermoplastic resins.

Thus, rubber compositions are disclosed that comprise elastomers, fillers, and the modified thermoplastic resins disclosed herein. In one embodiment, the elastomers are one or more of a natural rubber, a polyisoprene, a styrene-butadiene rubber, a polybutadiene, a halobutyl rubber, and a nitrile rubber, or a modified rubber grade, or a rubber mixture thereof. In another embodiment, the halobutyl rubber is bromobutyl rubber, chlorobutyl rubber, a modified rubber grade, or a mixture thereof. When used in tire embodiments, the main rubber components of such tire embodiments comprise various polymers such as, but not limited to, polyisoprene (synthetic or natural), styrene-butadiene copolymer, or butadiene polymer, and the like. In other embodiments, such rubber polymer(s) contain various modifications and/or functionalizations at the end of chains or at pendant positions along the polymer chain. In these embodiments, such modifications contain various standard moieties such as, but not limited to, hydroxyl- and/or ethoxy- and/or epoxy- and/or siloxane- and/or amine- and/or aminesiloxane- and/or carboxy- and/or phthalocyanine- and/or silane-sulfide-groups, and/or combinations thereof. Additional modifications known to one of skill, such as metal atoms, are also contemplated as being included in the rubber polymers used to make the disclosed tires and other rubber-containing components disclosed herein.

In some embodiments, the rubber mixture according to the disclosure also contains 5 to 80 phr, 5 to 49 phr, 5 to 30 phr, or 5 to 20 phr of at least one further diene rubber.

The at least one further rubber is in this case one or more of natural polyisoprene and/or synthetic polyisoprene and/or butadiene rubber and/or solution-polymerized styrene-butadiene rubber and/or emulsion-polymerized styrene-butadiene rubber and/or liquid rubbers with a molecular weight Mw greater than 20,000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluorine rubber and/or silicone rubber and/or polysulfide rubber and/or epichlorohydrin rubber and/or styrene-isoprene-butadiene terpolymer and/or hydrated acrylonitrile butadiene rubber and/or isoprene-butadiene copolymer and/or hydrogenated styrene-butadiene rubber.

In one embodiment, nitrile rubber, hydrogenated acrylonitrile butadiene rubber, chloroprene rubber, butyl rubber, halobutyl rubber, ethylene-propylene-diene rubber, or a mixture thereof, is used in the production of technical rubber articles such as straps, belts, and hoses, for example.

In another embodiment, the further diene rubber is one or more of synthetic polyisoprene and natural polyisoprene and polybutadiene. In a further embodiment, the further diene rubber is at least natural polyisoprene. This allows to achieve particularly favorable processability (extrudability, miscibility, et cetera) of the rubber mixture.

According to a further embodiment of the disclosure, the rubber mixture contains 10 to 70 phr of a conventional solution-polymerized styrene-butadiene rubber having a glass transition temperature of −40 to +10° C. (high-Tg SSBR) and 10 to 70 phr of the styrene-butadiene rubber having a Tg of −120 to −75° C., −110 to −75° C., −110 to −80° C., or −87 to −80° C., with the rubber in this embodiment having a styrene content of 1 to 12 wt %, 9 to 11 wt %, or 10 to 11 wt %.

In some embodiments, rubber mixture contains at least one further diene rubber, such as a natural and/or synthetic polyisoprene.

The modified thermoplastic resins are incorporated into the rubber mixtures by various methods known to one of skill. The amount of modified thermoplastic resin in the rubber mixture is from 5 to 150 phr, 5 to 120 phr, or even 5 to 100 phr. The rubber mixture additionally comprises in some embodiments unmodified thermoplastic resins. Further, mixtures of modified and unmodified thermoplastic resins are incorporated into the rubber mixtures in these embodiments. The total thermoplastic resin content, including unmodified thermoplastic resin and modified thermoplastic resin, in these embodiments is from 5 to 200 phr, 5 to 150 phr, or even 5 to 100 phr, i.e. a modified thermoplastic resin is incorporated into the rubber mixtures to achieve a phr value of 5 to 50 by dilution. Likewise, mixtures of modified thermoplastic resins are in some embodiments incorporated into the rubber mixtures by adding the desired amount to the rubber mixture to achieve the desired phr.

According to another embodiment, the amount of the solution-polymerized styrene-butadiene rubber present in the rubber mixture is from 5 to 50 phr, 20 to 50 phr, or even 30 to 40 phr. The rubber mixture of the disclosure comprises about 20 to 250 phr, 30 to 150 phr, or 30 to 85 phr, of at least one filler. The filler is one or more of a polar or non-polar filler, such as, but not limited to, silica, carbon black, alumino-silicates, chalk, starch, magnesium oxide, titanium dioxide, and/or rubber gels, or mixtures thereof. Further, carbon nanotubes (CNTs) including hollow carbon fibers (HCF) and modified CNTs, including one or more functional groups such as, for example, hydroxy, carboxy, or carbonyl groups, are used as filler materials in some embodiments. Additionally, graphite and graphene, as well as "carbon-silica dual-phase filler" are used as filler materials in other embodiments. It is contemplated herein to use any of the types of carbon black known to a person skilled in the art.

In some embodiments, the rubber mixture comprises carbon black as sole filler or as main filler, that is, the amount of carbon black is markedly greater than the amount of any other fillers present. If another filler is present alongside carbon black, in one embodiment the other filler is silica. Thus, in another embodiment, the rubber mixtures described herein comprise similar amounts of carbon black and silica, for example 20 to 100 phr of carbon black combined with 20 to 100 phr of silica. For example, the ratio of carbon black to silica can be anywhere from about 1:150 to 100:20.

In some embodiments, the rubber mixture comprises silica as sole filler or as main filler, that is, the amount of silica is markedly greater than the amount of any other fillers present.

When carbon black is present as the filler, preferably the amount of carbon black in the rubber mixture is from 1 to 150 phr, 2 to 100 phr, 2 to 90 phr, 2 to 80 phr, 2 to 70 phr, 2 to 60 phr, 2 to 50 phr, 2 to 40 phr, 2 to 30 phr, or from 2 to 20 phr. However, in some embodiments a carbon black is used that has an iodine adsorption number according to ASTM D 1510 of 30 to 180 g/kg, 40 to 180 g/kg, or 40 to 130 g/kg, and a DBP number according to ASTM D 2414 of 80 to 200 ml/100 g, 90 to 200 ml/100 g, or 90 to 150 ml/100 g.

The silicas contemplated herein include all silicas known to the person skilled in the art that are suitable as fillers for tire rubber mixtures. However, one embodiment includes a finely dispersed, precipitated silica having a nitrogen surface area (BET surface area) (according to DIN ISO 9277 and DIN 66132) of 35 to 350 $m^2/g$, 35 to 260 $m^2/g$, 100 to 260 $m^2/g$, or 130 to 235 $m^2/g$ and a CTAB surface area (according to ASTM D 3765) of 30 to 400 $m^2/g$, 30 to 250 $m^2/g$, 100 to 250 $m^2/g$, or 125 to 230 $m^2/g$. Such silicas, when used, for example, in rubber mixtures for tire treads, produce particularly favorable physical properties of the vulcanizate. This also provides in some instances advantages in mixture processing by reducing mixing time while retaining the same product properties, which leads to improved productivity. In one embodiment, the silica incorporated into the described rubber mixtures includes the Ultrasil® VN3 type of silica (Evonik Industries AG, Essen, Germany) and highly-dispersible silicas such as the aforementioned HD silicas (for example, Zeosil® 1165 MP Rhodia—Solvay International Chemical Group, Brussels, Belgium).

To improve processability and to bind the silica and other polar fillers that are in some embodiments present to the diene rubber, silane coupling agents are used in various embodiments of the described rubber mixtures. In such embodiments, one or a plurality of different silane coupling agents in combination with one another are used. The rubber mixture in some embodiments therefore contains a mixture of various silanes. The silane coupling agents react with the superficial silanol groups of the silica or other polar groups during the mixing of the rubber or of the rubber mixture (in situ), or even before adding the filler to the rubber as a pretreatment (pre-modification). In such embodiments, the silane coupling agents are any of those known to the person skilled in the art as suitable for use in the disclosed rubber mixtures. Non-limiting examples of conventional coupling agents are bifunctional organosilanes possessing at least one alkoxy, cycloalkoxy, or phenoxy group on the silicon atom as a leaving group, and as the other functionality, having a group that can optionally undergo a chemical reaction with the double bonds of the polymer after splitting. The latter group may, for example, constitute the following chemical groups: SCN, —SH, —NH2 or —Sx- (where x is from 2 to 8).

Contemplated silane coupling agents for use in such embodiments include for example, 3-mercaptopropyltriethoxysilane, 3-thiocyanato-propyl-trimethoxysilane, and 3,3'-bis(triethoxysilylpropyl)-polysulfide with 2 to 8 sulfur atoms such as, for example, 3,3'-bis(triethoxysilylpropyl) tetrasulfide (TESPT), the corresponding disulfide (TESPD), and mixtures of the sulfides with 1 to 8 sulfur atoms having a differing content of the various sulfides. For example, TESPT is also suitable to be added as a mixture with industrial carbon black (X50S®, Evonik Industries AG, Essen, Germany).

In another embodiment, a silane mixture is used that contains up to 40 to 100 wt % of disulfides, 55 to 85 wt % of disulfides, or 60 to 80 wt % of disulfides. This type of mixture, described by way of example in U.S. Pat. No. 8,252,863, is obtainable by way of example with Si 261® (Evonik Industries AG, Essen, Germany). Blocked mercaptosilanes such as those known from WO 99/09036 are also contemplated to be used as silane coupling agents. Silanes such as those described in U.S. Pat. Nos. 7,968,633; 7,968,634; 7,968,635; and, 7,968,636, as well as U.S. Pat. App. Pub. Numbers US 20080161486; US 20080161462; and US 20080161452 A1, or any combination thereof, are also in some embodiments incorporated into the disclosed rubber mixtures. Suitable are, for example, silanes marketed under the name NXT in different variants by the firm Momentive, USA, or those marketed under the name VP Si 363® by the firm Evonik Industries.

Moreover, in some embodiments, the rubber mixtures also contain carbon nanotubes (CNT), including discrete CNTs, so-called hollow carbon fibers (HCF), and modified CNT containing one or a plurality of functional groups such as hydroxy, carboxy, and carbonyl groups.

Graphite, graphene, and so-called "carbon-silica dual-phase fillers" are also suitable as fillers.

Moreover, the rubber mixtures in some embodiments contain other polar fillers, such as, for example, aluminosilicates, chalk, starch, magnesium oxide, titanium dioxide, or rubber gels.

In one embodiment, the rubber mixture is free from other fillers, that is, in this embodiment the rubber mixture comprises 0 phr of any other filler. In this embodiment, it is therefore not necessary to add any second filler.

For the purposes of the present disclosure, zinc oxide is not considered to be a filler.

In one embodiment, the rubber mixture contains 0 to 70 phr, 0.1 to 60 phr, or 0.1 to 50 phr of at least one plasticizer. These include one or more of all plasticizers known to the person skilled in the art, such as aromatic, naphthenic, or paraffinic mineral oil plasticizers, for example, MES (mild extraction solvate) or TDAE (treated distilled aromatic extract), rubber-to-liquid (RTL) oils or biomass-to-liquid (BTL) oils, factices, plasticizing thermoplastic resins, or liquid polymers (such as liquid BR), whose average molecular weight (determined by gel permeation chromatography (GPC), based on BS ISO 11344:2004), is between 500 and 20,000 g/mol. If liquid polymers are used in the rubber mixtures described herein as plasticizers, these are not included as rubber in calculating the composition of the polymer matrix.

If a mineral oil is used, the mineral oil is selected from, for example, one or more of DAE (distilled aromatic extracts) and/or RAE (residual aromatic extracts) and/or TDAE (treated distilled aromatic extracts) and/or MES (mild extracted solvents) and/or naphthenic oils and/or paraffinic oils.

Moreover, the rubber mixtures disclosed herein contain in some embodiments various common additives in the commonly known number of parts by weight. These additives include:

a) antioxidants such as, for example, N-phenyl-N'-(1,3-dimethylbutyl)-p-phenylene diamine (6PPD), N,N'-Diphenyl-p-phenylene diamine (DPPD), N,N'-ditolyl-p-phenylene diamine (DTPD), N-Isopropyl-N'-phenyl-p-phenylene diamine (IPPD), N,N'-Bis(1,4-dimethylpentyl)-p-phenylenediamine (77PD), and 2,2,4-trimethyl-1,2-dihydroquinoline (TMQ), b) activators such as, for example, zinc oxide and fatty acids (for example, stearic acid), c) waxes, d) thermoplastic resins, in particular adhesive thermoplastic resins, e) mastication auxiliaries such as, for example, 2,2'-dibenzamidodiphenyldisulfide (DBD), and f) processing auxiliaries, for example, fatty acid salts such as, for example, zinc soaps, fatty acid esters and derivatives thereof.

In particular, in the use of the rubber mixtures disclosed herein for the internal components of a tire or a technical rubber article that are in direct contact with the reinforcing supports present, a suitable adhesive system, often in the form of adhesive thermoplastic resins, is also generally added to the rubber.

The proportion of further additives contained in the entire amount is 3 to 150 phr, 3 to 100 phr, or 5 to 80 phr.

The proportion of further additives contained in the entire amount also includes 0.1 to 10 phr, 0.2 to 8 phr, or 0.2 to 4 phr of zinc oxide (ZnO).

This zinc oxide useful in these embodiments includes of any type known to the person skilled in the art, such as, for example, ZnO granulate or powder. Generally speaking, conventionally used zinc oxide shows a BET surface area of less than 10 m²/g. However, so-called nano zinc oxide having a BET surface area of 10 to 60 m²/g is also contemplated.

Vulcanization is performed in the presence of sulfur or sulfur donors using vulcanization accelerators, with some vulcanization accelerators also being capable of acting as sulfur donors. Sulfur, or sulfur donors, and one or a plurality of accelerators, are added in the last mixing step in the aforementioned amounts to the rubber mixture. Here, the accelerator is one or more of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Suitable accelerators include, for instance those selected from N-cyclohexyl-2-benzothiazole sulfenamide (CBS) and/or N,N-dicyclohexylbenzothiazole-2-sulfenamide (DCBS), N-tert-butyl-2-benzothiazyl sulfenamide (TBBS), mercapto benzothiazole, tetramethyl thiuram disulfide, benzothiazole disulfide, diphenyl guanidine, zinc dithiocarbamate, alkylphenol disulfide, zinc butyl xanthate, N-dicyclohexyl-2-benzothiazolesulfenamide, N-cyclohexyl-2-benzothiazole sulfenamide, N-oxydiethylene benzothiazole-2-sulfenamide, N,N-diphenyl thiourea, dithiocarbamyl sulfenamide, N,N-diisopropyl benzothiozole-2-sulfenamide, zinc-2-mercapto toluimidazole, dithio bis(N-methyl piperazine), dithio bis(N-beta-hydroxy ethyl piperazine), dithio bis(dibenzyl amine), and combinations thereof. Other vulcanizing accelerators include, for example, thiuram, and/or morpholine derivatives.

In one embodiment of the disclosed rubber mixtures, the mixture comprises CBS as the accelerator. Particularly good tear properties are thus achieved for such rubber mixtures.

Further, network-forming systems such as for example those available under the brand names Vulkuren® (Lanxess, Shanghai, PRC), Duralink® (ChemLink, Schoolcraft, Mich., US), and Perkalink® (Lanxess, Shanghai, PRC), or network-forming systems such as those described in WO 2010/059402, are also contemplated to be used in the rubber mixtures described herein. This system contains a vulcanizing agent that crosslinks with a functionality greater than four and at least one vulcanization accelerator. The vulcanizing agent that crosslinks with a functionality greater than four has, for example, General Formula A:

$$G[C_aH_{2a}\text{—}CH_2\text{—}S_bY]_c \qquad A$$

where G is a polyvalent cyclic hydrocarbon group and/or a polyvalent heterohydrocarbon group and/or a polyvalent siloxane group that contains 1 to 100 atoms; where each Y contains sulfur-containing functionalities independently selected from a rubber-active group; and where a, b and c are whole numbers for which the following applies independently: a equals 0 to 6; b equals 0 to 8; and c equals 3 to 5.

The rubber-active group is one or more of a thiosulfonate group, a dithiocarbamate group, a thiocarbonyl group, a mercapto group, a hydrocarbon group, and a sodium thiosulfonate group (colored salt group). This allows achievement of highly favorable abrasion and tear properties of the rubber mixture according to the invention.

Within the scope of the present disclosure, sulfur and sulfur donors, including sulfur-donating silanes such as TESPT, curing agents and cures such as those described in EP 2288653, vulcanization accelerators as described above, and vulcanizing agents that crosslink with a functionality of greater than 4 as described in WO 2010/059402, such as, for example, a vulcanizing agent of Formula A), and the aforementioned systems Vulkuren® (Lanxess, Shanghai, PRC), Duralink® (ChemLink, Schoolcraft, Mich., US), and Perkalink® (Lanxess, Shanghai, PRC), are combined under the term vulcanizing agents.

The rubber mixture according to the disclosure includes, in some embodiments, at least one of these vulcanizing agents. This makes it possible to produce vulcanizates, in particular for use in vehicle tires, from the rubber mixture according to the disclosure.

In some embodiments, vulcanization retarders are present in the rubber mixture.

As known in the art, there is typically a "trade off" between rolling resistance and wet braking in tire technology. Often when one of these two elements is improved, the other is worsened. Thus, an improvement in rolling resistance (RR) is often accompanied by a worsened performance of wet braking, and vice versa. This is the RR-wet braking target conflict. Embodiments encompassed by this disclosure therefore include tires that possess surprisingly improved rolling resistance with no change in wet braking. Thus, an object of the disclosed rubber compositions is to provide a vehicle tire that exhibits improved rolling resistance behavior, as well as snow performance. This object is achieved in that the vehicle tire contains the rubber mixtures according to this disclosure in at least one component as described above. In this context, all of the aforementioned embodiments of the constituents and properties thereof apply.

In one embodiment, the component is a tread. As known to the person skilled in the art, the tread contributes to a relatively high degree to overall rolling resistance of the tire. In particular, high resistance to cracking and crack propagation in the tread is also advantageous. In one embodiment, the rubber compositions described herein are useful in other parts of the tire as well and can comprise various tire components and various tire component compounds. The tires can be built, shaped, molded and cured by various methods that are known and will be readily apparent to those having skill in such art.

Another object of the present disclosure is improved snow performance. For instance, when the modified thermoplastic resins disclosed herein are incorporated into a tire tread, such as Kristalex® F-85, the modified Kristalex® F-85 exhibits an improved RR-wet breaking target conflict.

The modified Kristalex® F-85 thermoplastic resin, and indeed other thermoplastic resins modified in this manner, possess a higher Tg value. One could then compare the performance of resins of similar Tg values to show additional surprising performance features of the rubber mixtures incorporating one or more of the disclosed modified thermoplastic polymers. For instance, one can compare the performance of the modified Kristalex® F-85 thermoplastic resin to an un-modified Kristalex® F-115 thermoplastic resin, since the unmodified Kristalex® F-115 thermoplastic resin possesses a similar Tg value as the modified Kristalex® F-85 thermoplastic resin. In such an embodiment, it is surprisingly observed that the unmodified Kristalex® F-115 exhibits surprisingly decreased performance, for instance especially in snow performance, as compared with the similar Tg value modified Kristalex® F-85 thermoplastic resin. Additionally, the wear or abrasion performance of tire treads, and other rubber products, is substantially and surprisingly improved as compared with rubber products that do not incorporate the disclosed modified thermoplastic resins.

Further, as noted above, the modified Kristalex® F-85 thermoplastic resin tire exhibits superior performance in the RR-wet target conflict, as shown in the examples below. Thus, incorporation of the modified thermoplastic resins disclosed herein imparts surprising performance improvements in tires, such as pneumatic tires, for instance pneumatic tires for use by an automobile, and the like.

A further object of the disclosure is to optimize the abrasion behavior and the tear properties of technical rubber articles such as, for example, belts, straps, brakes, and hoses without having a significant negative effect on other properties that are relevant for the respective use.

This object is achieved by using the above-described rubber mixtures for the production of technical rubber articles such as, for example, belts (for instance, conveyor belts, automobile engine belts such as timing belts, driving belts, and the like), straps, seals, tubes, and hoses. Another such technical rubber article is a shoe sole, for instance for walking shoes, running shoes, cross-training shoes, boots, slippers, etc., items that are to be worn on the feet to protect the feet and associated bones and joints from damage caused by jarring or pounding motions associated with walking, running, jumping, etc. and to provide excellent resistant to slipping in wet and/or dry conditions. Various methods are known in the art for incorporation of rubber mixtures into footwear. See, for example, U.S. Pat. App. Pub. Nos.: 2013/0291409, 2011/0252671, and U.S. Pat. No. 8,689,381 (all incorporated by reference in their entirety for all purposes).

The term body mixture as used here refers to rubber mixtures for the internal components of a tire. Internal tire components essentially include the squeegee, side wall, inner liner (inner layer), core profile, belt, shoulder, belt profile, carcass ply, bead wire, cable profile, horn profile, and bandage.

Manufacturing of these disclosed rubber mixtures is performed by the methods commonly used in the rubber industry, in which a basic mixture with all of the constituents except the vulcanization system (sulfur and vulcanization-affecting substances) is first produced in one or a plurality of mixing stages. The finished mixture is produced by adding the vulcanization system in a last mixing stage. The finished mixture is further processed, for example, by means of an extrusion process, and given the corresponding form.

For use in vehicle tires, the mixture is preferably made into a tread and applied in the known manner in production of the vehicle tire blank. However, the tread in some embodiments is also wound onto a tire blank in the form of a narrow rubber mixture strip. In two-part tread embodiments (upper part: cap and lower part: base), the rubber mixture according to the disclosure is used both for the cap and for the base.

Manufacturing of the rubber mixture according to the disclosure for use as a body mixture in vehicle tires is performed as described above for the tread. The difference lies in the molding after the extrusion process. The forms of the rubber mixture according to the disclosure obtained in this manner for one or a plurality of various body mixtures are then used to produce a tire blank. To use the rubber mixture according to the disclosure in belts and straps, in particular in conveyor belts, the extruded mixture is made into the corresponding form and, at the same time or thereafter, often provided with reinforcing supports, for example, synthetic fibers or steel cords. In most cases, one obtains a multilayer structure composed of one and/or a plurality of layers of the rubber mixture, one and/or a plurality of layers of the same and/or different reinforcing supports, and one and/or a plurality of further layers of the same and/or another rubber mixture.

Unless otherwise defined, all technical and scientific terms used herein have the same meaning as commonly understood by one of ordinary skill in the art. Although methods and materials similar or equivalent to those described herein can be used in the practice or testing of the present invention, suitable methods and materials are described below. All publications, patent applications, patents, and other references mentioned herein are incorporated by reference in their entirety for all purposes. In case of conflict, the present specification, including definitions, will control. In addition, the materials, methods, and examples are illustrative only and not intended to be limiting.

EXAMPLES

A variety of modified thermoplastic resins have been prepared and tested in rubber mixtures for vehicle tires. These modified thermoplastic resins have also been prepared and tested in other compositions, such as adhesives and the like. The synthetic routes and the experimental data are provided below.

The modified thermoplastic resins can be synthesized using the different methodologies provided hereinbelow, as well as other methodologies apparent to one of skill in the art upon reading the methods provided below. All chemical reagents were from Sigma-Aldrich (St. Louis, Mo., US), unless otherwise noted.

Example 1: Method of Modifying Thermoplastic Resin

A wiped film evaporation technique was selected for the separation of the oligomers from the thermoplastic resin. An 80% solution of Kristalex™ F-85 (Eastman Chemical Co., Kingsport, Tenn., US) in light aromatic solvent naphtha was applied to a laboratory-scale wiped film evaporator (Fischer Scientific, Hampton, N.H., US) to remove the oligomer fractions of the thermoplastic resins. The feed rate was adjusted to a residence time of 20 seconds on the evaporator. The evaporator temperature was set 280° C. and the pressure was 1.2 mBarA. At these conditions a modified Kristalex™ F-85 resin was made that had a Tg of about 61° C., Table 4. In Table 5, the physical properties of modified thermoplastic resin made from C9, C5, C5/C9, hydrogenated aromatic-modified DCPD, hydrogenated and partially hydrogenated C9, and hydrogenated PMR, and non-hydrogenated PMR resins that were produced using the below described wiped film evaporator technique with process conditions for temperature ranging from 240 to 320° C. and for pressure ranging from 0.01 to 1013 mBarA. The columns marked "T (° C.)" and "P (mBarA)" correspond to the conditions used during the modification process.

Figure 2:
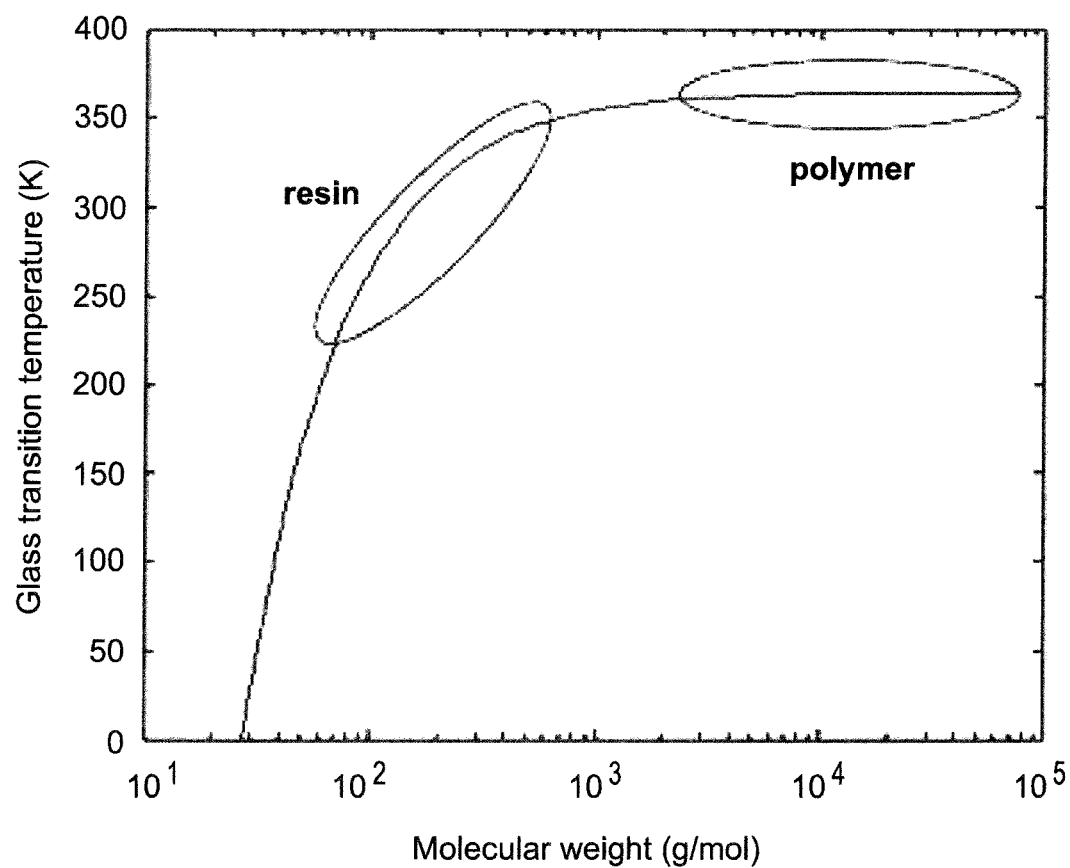
FIG. 2 shows a plot of glass transition temperature (K) vs. molecular weight (g/mol) according to the Flory-Fox equation, revealing the compositional property differences between thermoplastic resins possessing an Mn value of less than about 5,000 g/mol and polymers possessing an Mn value of greater than about 5,000 g/mol, based on gel permeation chromatography (GPC) using polystyrene standards.
Figure 3:
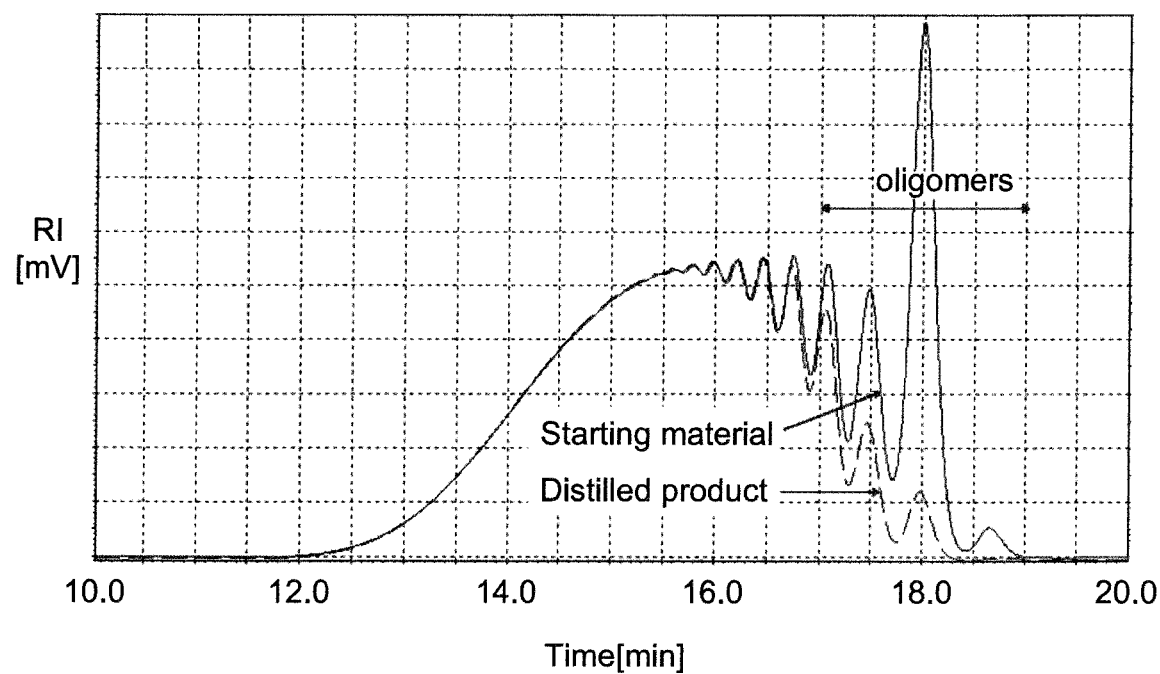
FIG. 3 shows the result of the separation of modified thermoplastic resin as measured with high resolution GPC.

FIG. 2 shows the result of the separation measured with high resolution gel permeation chromatography. The separation was carried out on an Agilent OligoPore column (300×7.5 mm, Agilent Technologies, Santa Clara, Calif., US). The solid line is the starting material and the dashed line the distilled product GPC analysis in FIG. 3.

Figure 4A:
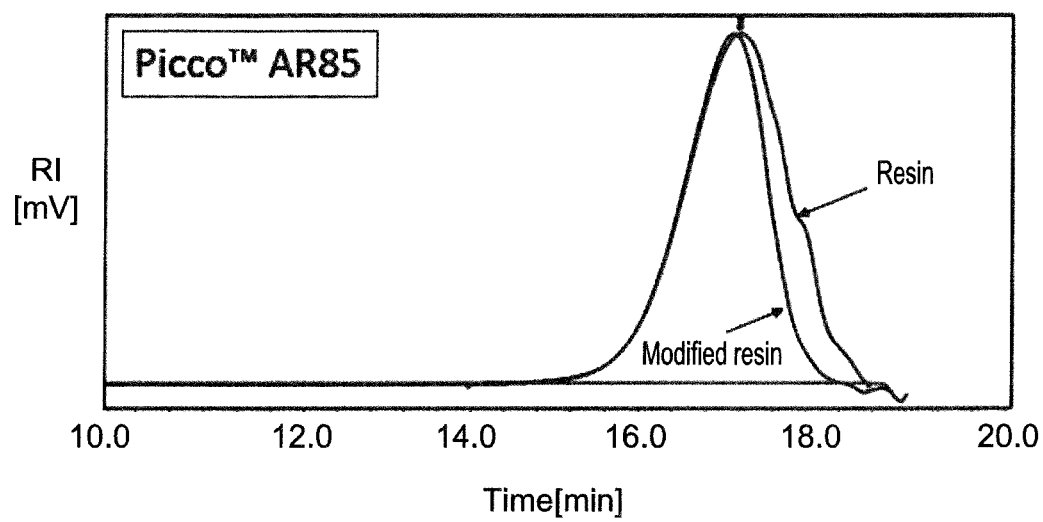
FIG. 4A, FIG. 4B, and FIG. 4C show GPC traces of the starting thermoplastic resins Picco® AR85, Picco® A100, and Piccotac® 1095, and modified thermoplastic resins of the same, respectively.
Figure 4B:
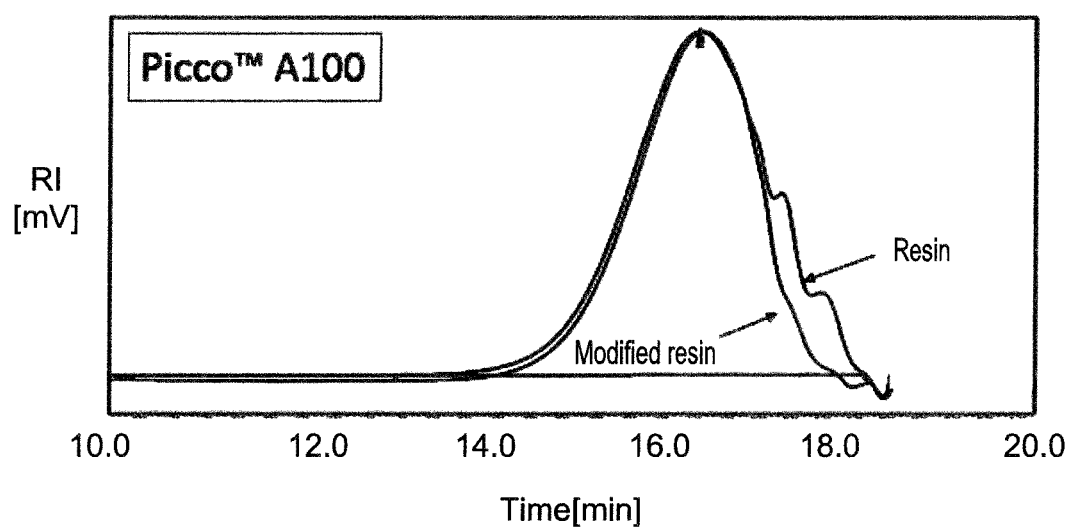
Figure 4C:
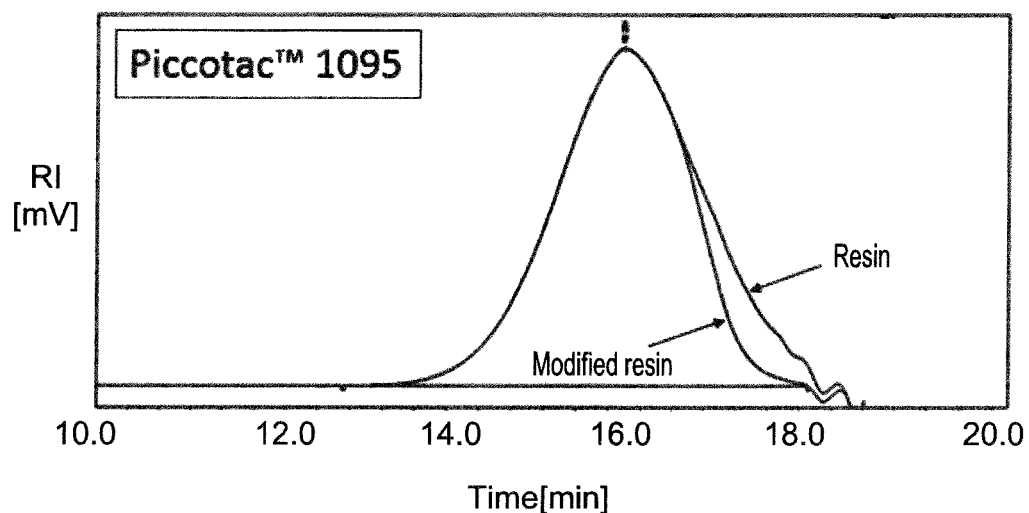

Exemplary GPC traces of the starting thermoplastic resins Picco® AR85, Picco® A100, and Piccotac® 1095 (Eastman Chemical Company, Kingsport, Tenn., US), and modified thermoplastic resins of the same, are shown in FIG. 4.

Figure 5:
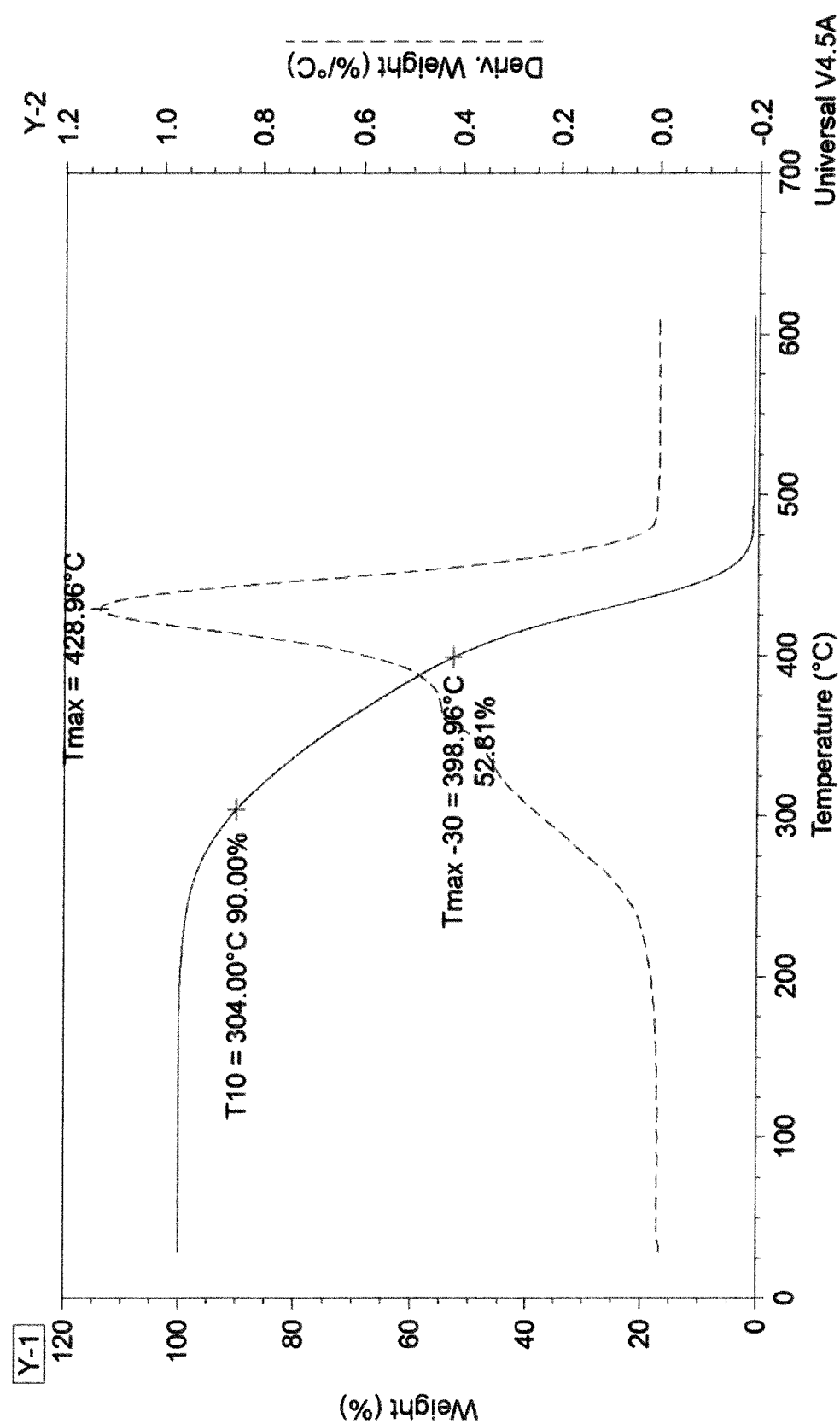
FIG. 5 shows an exemplary high resolution thermogravimetric analysis (TGA) trace showing weight loss versus temperature and the first derivative of the trace for a modified DCPD thermoplastic resin.
Figure 6:
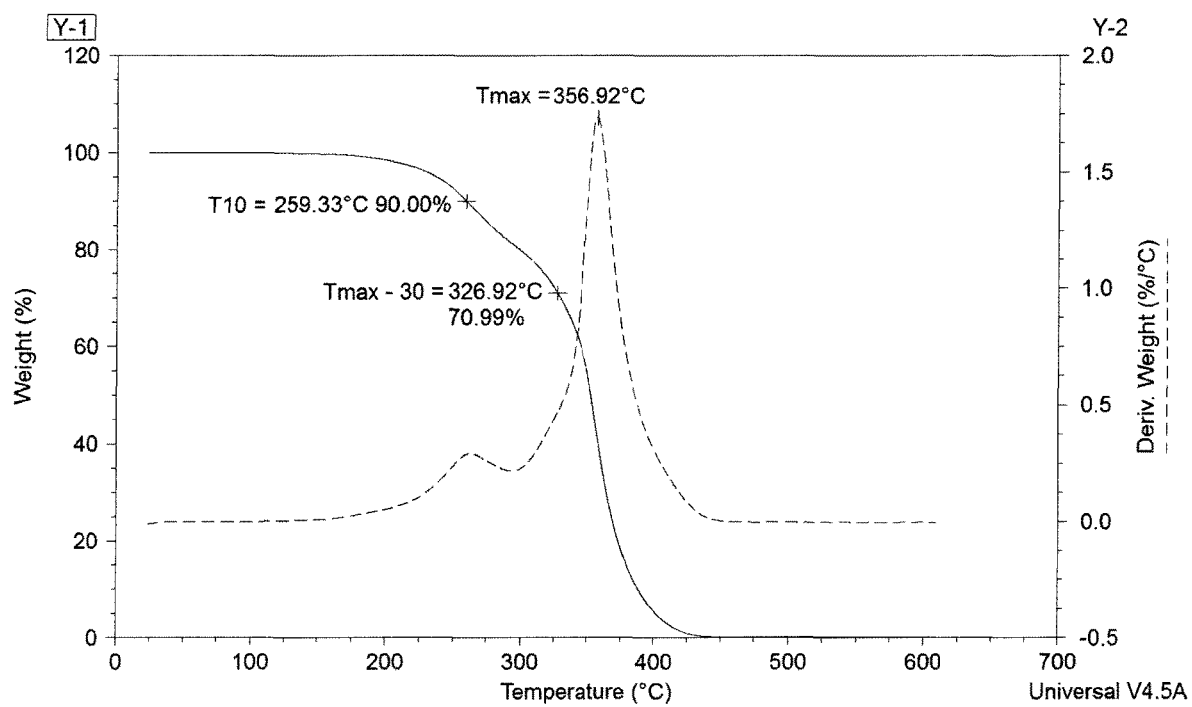
FIG. 6 shows an exemplary trace showing weight loss versus temperature and the first derivative of the trace for an unmodified PMR thermoplastic resin.
Figure 7:
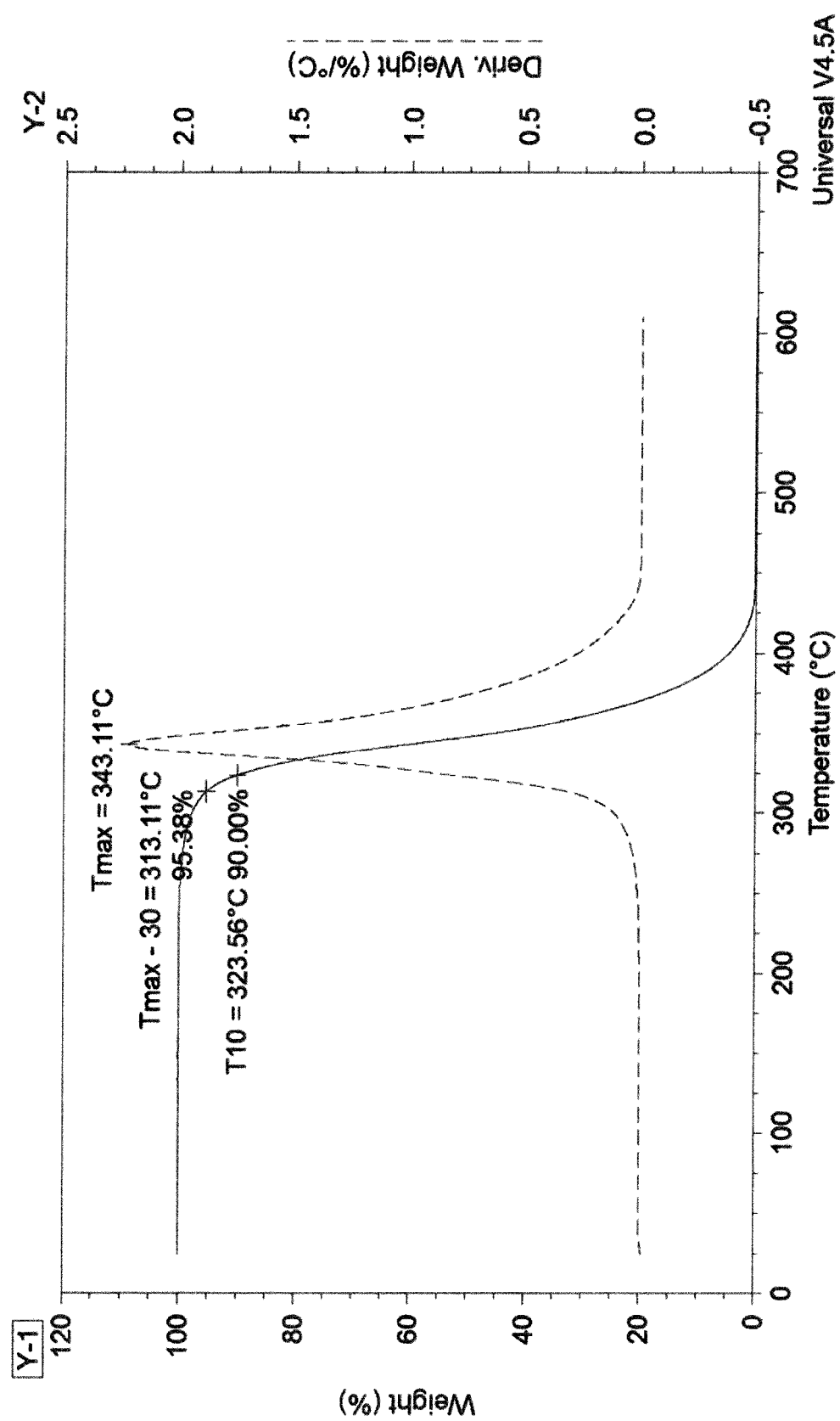
FIG. 7 shows an exemplary trace showing weight loss versus temperature and the first derivative of the trace for a modified PMR thermoplastic resin.
Figure 8:
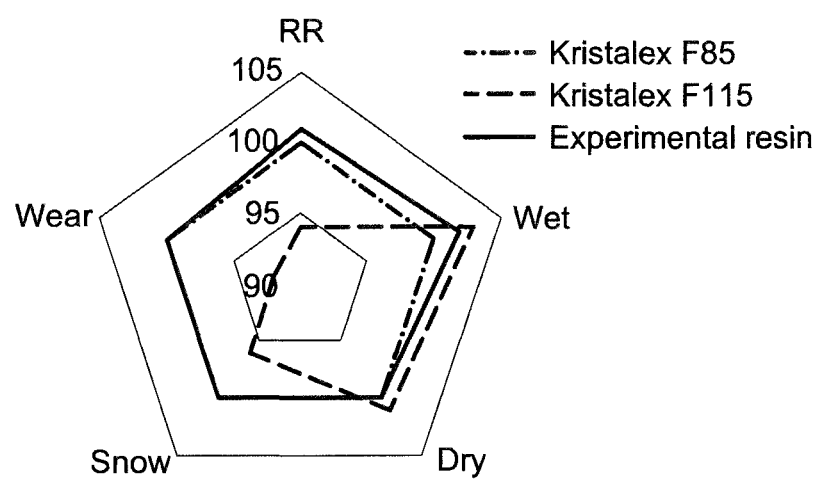
FIG. 8 shows a spider diagram of the tire performance results of Kristalex® F-85, Kristalex® F-115, and the modified thermoplastic resin.

An exemplary high resolution TGA trace showing weight loss versus temperature for a modified DCPD thermoplastic resin is shown in FIG. 5. An exemplary trace showing weight loss versus temperature for an unmodified PMR thermoplastic resin is shown in FIG. 6. An exemplary trace showing weight loss versus temperature for a modified PMR thermoplastic resin is shown in FIG. 7.

This method was repeated for several different types of thermoplastic resins including those of the PMR, hydrogenated DCPD, C9, C5/C9, and C5 type.

As noted, the molecular weight distribution was determined by GPC analysis, and the glass transition temperature was determined using DSC. The softening point was determined using a Herzog model HRB 754 (PAC, L.P., Houston, Tex., US) and the ring and ball method (Standard Test Methods for Softening Point of Hydrocarbon Resins and Rosin Based Resins by Automated Ring-and-Ball Apparatus, ASTM D6493-11(2015)). The values obtained for Mn, Mw, Mz, Mp, Tg, and SP are provided in Table 4, below.

TABLE 4

Comparison of Physical Parameters of Modified and Non-Modified Thermoplastic Resins

| | Mn | Mw | Mz | Mp | Tg [° C.] | SP [° C.] |
|---|---|---|---|---|---|---|
| Kristalex ® F-85 | 650 | 1050 | 1700 | 880 | 40 | 86 |
| Kristalex ® F100 | 790 | 1350 | 2150 | 1200 | 54 | 100 |
| Kristalex ® F-115 | 1015 | 1989 | 3500 | 1735 | 71 | 115 |

TABLE 4-continued

Comparison of Physical Parameters of Modified and Non-Modified Thermoplastic Resins

| | Mn | Mw | Mz | Mp | Tg [° C.] | SP [° C.] |
|---|---|---|---|---|---|---|
| Modified Kristalex ® F-85 | 830 | 1200 | 1800 | 880 | 62 | 105 |

Further, the values of Mn, Mw, Mz, Tg, $T_{10}$, $T_{max}$, and percent oligomer content as measured by high resolution TGA, as well as S value determined using methodologies described hereinbelow. The values of the thermoplastic resins tested are presented in Table 5. (Picco®, Piccotac®, Regalite®, Regalrez®, and Kristalex® are from Eastman Chemical Co., Kingsport, Tenn., US; Escorez® is from ExxonMobil Chemical Company, Spring, Tex., US). It is noted that when there is more entry for a particular starting resin, such as for Piccotac™ 1095N, for example, reading from left to right in Table 5, there are indicated two different test conditions (temperature and pressure) for the same starting resin. Furthermore, the Oligomer term is provided in Table 5 as a percentage, i.e. Oligomer×100, with respect to Formula I.

TABLE 5

Physical Parameters of Modified Thermoplastic Resins

| Starting Resin | Resin Type | T (° C.) | P (mBarA) | Mn (g/mol)¥ | Mw (g/mol)¥ | Mz (g/mol)¥ | % Resin <600 g/mol¥ | % Resin <300 g/mol¥ |
|---|---|---|---|---|---|---|---|---|
| Kristalex ™ 3085 | PMR | 280 | 60 | 838 | 1092 | 1476 | 16 | 0.07 |
| Kristalex ™ F-85 | PMR | 265 | 0.5 | 1046 | 1415 | 2115 | ND | ND |
| Piccotac ™ 1095N | C5 | 270 | 5 | 1028 | 1860 | 3947 | 13 | 1 |
| Piccotac ™ 1095N | C5 | 270 | 0.05 | 1233 | 2051 | 4155 | 5 | 0.6 |
| Regalite ™ R1100 | C9 H2 | 280 | 0.5 | 650 | 928 | 1512 | 35 | 4 |
| Regalite ™ S7125 | C9 H2 | 320 | 0.05 | 699 | 975 | 1509 | 23 | 3 |
| Regalite ™ S7125 | C9 H2 | 280 | 0.25 | 682 | 1018 | 1663 | 28 | 3 |
| Regalite ™ S7125 | C9 H2 | 300 | 3 | 587 | 851 | 1417 | 41 | 7 |
| Regalite ™ S5100 | C9 H2 | 280 | 1.2 | 574 | 837 | 1521 | 42 | 7 |
| Kristalex ™ F-85 | PMR | 320 | 0.5 | 1046 | 1407 | 2079 | 7 | 0.3 |
| Regalite ™ R1100 | C9 H2 | 300 | 0.5 | 660 | 951 | 1536 | 33 | 5 |
| Regalrez ™ 1094 | PMR H2 | 240 | 1013 | 566 | 757 | 1017 | 43 | 8 |
| Regalrez ™ 1126 | PMR H2 | 240 | 1013 | 669 | 1041 | 1660 | 30 | 8 |
| Regalrez ™ 1126 | PMR H2 | 240 | 400 | 722 | 1018 | 1510 | 27 | 3 |
| Regalrez ™ 1094 | PMR H2 | 240 | 760 | 634 | 778 | 984 | 38 | 2 |
| Picco ® A100 | C9 | 319 | 0.03 | 962 | 1308 | 2139 | ND | ND |
| Kristalex ® 3070 | PMR | 319 | 0.01 | 936 | 1048 | 1219 | 4 | 0.4 |
| Escorez ® 5600 | H2 DCPD | 318 | 0.03 | 660 | 843 | 1179 | 34 | 2 |
| Piccotac ® 1095 | C5 | 318 | 0.01 | 1345 | 2231 | 4432 | ND | ND |
| Piccotac ® 1095 | C5 | 318 | 0.01 | 1320 | 2181 | 4300 | ND | ND |
| Escorez ® 5600 | H2 DCPD | 299 | 0.02 | 621 | 811 | 1174 | 39 | 4 |
| Picco ® A100 | C9 | 319 | 4.8 | 785 | 1133 | 1915 | 23 | 2 |
| Piccotac ® 1095 | C5 | 269 | 0.01 | 1178 | 2047 | 4213 | ND | ND |
| Kristalex ® F-85 | PMR | 280 | 1.2 | 851 | 1268 | 2078 | ND | ND |
| Escorez ® 5600 | H2 DCPD | 299 | 0.5 | 540 | 740 | 1185 | 49 | 9 |
| Kristalex ® 3070 | PMR | 275 | 1.2 | 693 | 841 | 1061 | ND | ND |
| Piccotac ® 7590-N | C5/C9 | 280 | 2 | 923 | 1587 | 3382 | ND | ND |
| Picco ® A100 | C9 | 280 | 2 | 696 | 1170 | 2523 | ND | ND |
| Picco ® AR100 | C9 | 280 | 2 | 629 | 787 | 1138 | ND | ND |
| Piccotac ® 8090-E | C5/C9 | 280 | 2 | 1023 | 2158 | 5430 | ND | ND |
| Piccotac ® 1095 | C5 | 280 | 2 | 964 | 1823 | 4078 | ND | ND |
| Piccotac ® 1105-E | C5 | 280 | 2 | 1365 | 3552 | 9529 | ND | ND |
| Picco ® AR85 | C9 | 280 | 2 | 644 | 824 | 1171 | ND | ND |
| Picco ® A100 | C9 | 269 | 4.9 | 679 | 1070 | 2003 | ND | ND |

| Starting Resin | S¥ (<600 g/mol) | S¥ (<300 g/mol) | Tg (° C.)[1] | $T_{10}$ (° C.)[2] | $T_{max}$ (° C.)[2] | % Oligomer[2] | $S^2$ |
|---|---|---|---|---|---|---|---|
| Kristalex ™ 3085 | 56 | 965 | 63 | 336 | 350 | 3 | 361 |
| Kristalex ™ F-85 | ND | ND | 77 | 338 | 353 | 4 | 195 |
| Piccotac ™ 1095N | 17 | 166 | 57 | 335 | 366 | 10 | 16 |
| Piccotac ™ 1095N | 229 | 2042 | 69 | 349 | 359 | 3 | 169 |

TABLE 5-continued

Physical Parameters of Modified Thermoplastic Resins

| | | | | | | | |
|---|---|---|---|---|---|---|---|
| Regalite™ R1100 | 17 | 135 | 91 | 351 | 384 | 11 | 43 |
| Regalite™ S7125 | 47 | 349 | 96 | 355 | 375 | 7 | 128 |
| Regalite™ S7125 | 28 | 209 | 89 | 346 | 368 | 7 | 85 |
| Regalite™ S7125 | 11 | 62 | 74 | 325 | 369 | 17 | 22 |
| Regalite™ S5100 | 10 | 63 | 69 | 331 | 371 | 14 | 26 |
| Kristalex™ F-85 | 266 | 16567 | 76 | 348 | 356 | 2 | 572 |
| Regalite™ R1100 | 17 | 119 | 90 | 357 | 387 | 10 | 54 |
| Regalrez™ 1094 | 23 | 121 | 72 | 313 | 334 | 6 | 183 |
| Regalrez™ 1126 | 43 | 167 | 89 | 318 | 328 | 3 | 449 |
| Regalrez™ 1126 | 83 | 671 | 84 | 327 | 334 | 3 | 829 |
| Regalrez™ 1094 | 50 | 983 | 71 | 328 | 340 | 3 | 586 |
| Picco® A100 | ND | ND | 103 | 353 | 355 | 1 | 3980 |
| Kristalex® 3070 | 1135 | 11478 | 66 | 363 | 367 | 1 | 4051 |
| Escorez® 5600 | 85 | 1187 | 112 | 409 | 417 | 3 | 1012 |
| Piccotac® 1095 | ND | ND | 77 | 348 | 356 | 2 | 299 |
| Piccotac® 1095 | ND | ND | 75 | 347 | 356 | 3 | 217 |
| Escorez® 5600 | 42 | 427 | 105 | 399 | 413 | 4 | 383 |
| Picco® A100 | 33 | 384 | 83 | 343 | 358 | 5 | 166 |
| Piccotac® 1095 | ND | ND | 68 | 343 | 354 | 3 | 138 |
| Kristalex® F-85 | ND | ND | 61 | 343 | 360 | 5 | 113 |
| Escorez® 5600 | 26 | 144 | 89 | 385 | 401 | 6 | 221 |
| Kristalex® 3070 | ND | ND | 44 | 318 | 348 | 10 | 61 |
| Piccotac® 7590-N | ND | ND | 57 | 330 | 349 | 6 | 52 |
| Picco® A100 | ND | ND | 70 | 328 | 356 | 9 | 33 |
| Picco® AR100 | ND | ND | 66 | 307 | 349 | 16 | 27 |
| Piccotac® 8090-E | ND | ND | 50 | 333 | 353 | 7 | 25 |
| Piccotac® 1095 | ND | ND | 62 | 334 | 359 | 8 | 25 |
| Piccotac® 1105-E | ND | ND | 6 | 350 | 369 | 6 | 20 |
| Picco® AR85 | ND | ND | 51 | 296 | 347 | 18 | 19 |
| Picco® A100 | ND | ND | 72 | 314 | 355 | 141 | 19 |

[¥]Determined by GPC,
[1]determined by DSC,
[2]determined by high resolution TGA
"ND" = no data available Likewise, similar physical parameters were analyzed for non-modified thermoplastic resins for comparison to the modified thermoplastic resins. The parameters of the non-modified thermoplastic resins are reflected in Table 6, below. (Plastolyn® is from Eastman Chemical Co., Kingsport, Tenn., US; Oppera® is from ExxonMobil Chemical Company, Spring, Tex., US; Sylvares® and Sylvatraxx® are from AZ Chem Holdings, LP, Jacksonville, Fla., US; Sukorez® and Hickotack® are from Kolon Industries, Inc., South Korea; Wingtack® and Norsolene® are from Cray Valley Hydrocarbon Specialty Chemicals, Exton, Pa., US).

It can be seen from the data in Tables 5 and 6 that the modification process primarily reduces the value of Mn (number average molecular weight) due to the removal of the low molecular weight oligomer content, i.e. the dimer, trimer, tetramer, and/or pentamer molecules in the thermoplastic resin. The high molecular weight fraction of the modified thermoplastic resins, as indicated by Mz, is nearly unchanged as compared to non-modified thermoplastic resins, i.e. the physical parameters of the thermoplastic resins measured before modification. By removing the low molecular weight, low Tg fraction, the thermoplastic resin Tg increases significantly. This is also reflected in the increase in ring and ball softening point temperature.

These data also show that such modifications can be made to any number of commercially available thermoplastic resins at least of the PMR, PMR H2, DCPD, DCPD H2, C5, C5 H2, C9, C9 H2, C5/C9 H2, and C5/C9 types. Values in Tables 5 and 6 are determined using the methodologies described further below.

TABLE 6

Physical Parameters of Representative Unmodified Thermoplastic Resins

| Starting Resin | Resin type | Mn (g/mol)[¥] | Mw (g/mol)[¥] | Mz (g/mol)[¥] | % Resin <600 g/mol[¥] | % Resin <300 g/mol[¥] | S[¥] (<600 g/mol) | S[¥] (<300 g/mol) | $T_g$ (° C.)[1] | $T_{10}$ (° C.)[2] | $T_{max}$ (° C.)[2] | % Oligomer[2] | S[2] |
|---|---|---|---|---|---|---|---|---|---|---|---|---|---|
| Kristalex® F-115 | PMR | 1030 | 2099 | 3945 | 15 | 3 | 14 | 67 | 67 | 316 | 342 | 8 | 26 |
| Kristalex® F-115 | PMR | 1009 | 2145 | 4094 | ND | ND | ND | ND | 67 | 299 | 334 | 12 | 12 |
| Kristalex® F-85 | PMR | 680 | 1123 | 1930 | 31 | 7 | 4 | 18 | 39 | 284 | 361 | 22 | 6 |
| Piccotac® 1115 | C5 | 1132 | 3310 | 9977 | 13 | 3 | 8 | 39 | 60 | 346 | 366 | 8 | 14 |
| Plastolyn® R1140 | C9 H2 | 730 | 1437 | 2820 | 24 | 8 | 6 | 17 | 85 | 330 | 393 | 20 | 7 |
| Plastolyn® R1140 | C9 H2 | 726 | 1561 | 3392 | 25 | 9 | 4 | 12 | 84 | 324 | 391 | 23 | 5 |
| Plastolyn® R1140 | C9 H2 | 744 | 1601 | 3311 | 23 | 8 | 5 | 13 | 84 | 324 | 393 | 20 | 5 |
| Regalite® R1100 | C9 H2 | 460 | 772 | 1427 | 50 | 19 | 3 | 7 | 48 | 277 | 383 | 40 | 3 |
| Regalite R1125 | C9 H2 | 601 | 989 | 1616 | 34 | 11 | 5 | 17 | 72 | 315 | 393 | 29 | 6 |
| Regalite® S5100 | C9 H2 | 522 | 894 | 1643 | 42 | 15 | 3 | 10 | 48 | 287 | 376 | 32 | 4 |
| Regalite® S5100 | C9 H2 | 562 | 933 | 1757 | 39 | 12 | 4 | 12 | 49 | 286 | 370 | 28 | 5 |
| Regalite® S7125 | C9 H2 | 625 | 1202 | 2453 | 32 | 11 | 4 | 15 | 71 | 315 | 379 | 22 | 6 |

TABLE 6-continued

Physical Parameters of Representative Unmodified Thermoplastic Resins

| Starting Resin | Resin type | Mn (g/mol)[¥] | Mw (g/mol)[¥] | Mz (g/mol)[¥] | % Resin <600 g/mol[¥] | % Resin <300 g/mol[¥] | S[¥] (<600 g/mol) | S[¥] (<300 g/mol) | Tg (°C.)[1] | $T_{10}$ (°C.)[2] | $T_{max}$ (°C.)[2] | % Oligomer[2] | S[2] |
|---|---|---|---|---|---|---|---|---|---|---|---|---|---|
| Regalrez 1094 | PMR H2 | 510 | 710 | 959 | 46 | 13 | 8 | 26 | 41 | 284 | 335 | 18 | 23 |
| Regalrez ® 1126 | PMR H2 | 623 | 1016 | 1629 | 32 | 10 | ND | ND | 62 | ND | ND | ND | ND |
| Kristalex ® 3085 | PMR | 690 | 1106 | 2359 | 28 | 6 | 9 | 42 | 42 | 312 | 344 | 11 | 23 |
| Picco ® A120 | C9 | 712 | 1588 | 3489 | ND | ND | ND | ND | 74 | 320 | 357 | 11 | 15 |
| Kristalex ® 3070 | PMR | 590 | 771 | 1013 | ND | ND | ND | ND | 30 | 282 | 355 | 23 | 11 |
| Escorez ® 5637 | H2 DCPD | 437 | 637 | 1052 | 60 | 19 | 5 | 17 | 80 | 359 | 432 | 33 | 10 |
| Hickotac ® P90S | C9 | 635 | 1075 | 1937 | ND | ND | ND | ND | 51 | 300 | 362 | 18 | 9 |
| Kristalex ® 3085 | PMR | 666 | 983 | 1451 | ND | ND | ND | ND | 37 | 281 | 345 | 23 | 9 |
| Picco ® AR100 | C9 | 565 | 765 | 1124 | ND | ND | ND | ND | 52 | 278 | 351 | 30 | 8 |
| Fuijan Sanmming | Terpene | 659 | 1007 | 1680 | ND | ND | ND | ND | 87 | 245 | 317 | 22 | 8 |
| Sylvatraxx ® 4401 | PMR | 659 | 1190 | 1935 | ND | ND | ND | ND | 37 | 268 | 352 | 17 | 7 |
| Escorez ® 5340 | H2 DCPD | 297 | 508 | 903 | 73 | 39 | 4 | 7 | 86 | 333 | 441 | 37 | 7 |
| Piccotac ® 7590-N | C5/C9 | 743 | 1480 | 3350 | ND | ND | ND | ND | 41 | 299 | 356 | 17 | 6 |
| Sylvares ® SA85 | PMR | 729 | 1359 | 2241 | ND | ND | ND | ND | 41 | 273 | 364 | 17 | 6 |
| Kristalex ® F-85 | PMR | 661 | 1139 | 2044 | ND | ND | ND | ND | 39 | 284 | 359 | 25 | 5 |
| Escorez ® 5600 | H2 DCPD | 386 | 592 | 890 | ND | ND | ND | ND | 54 | 310 | 427 | 44 | 5 |
| Kristalex ® 3105 SD | PMR | 847 | 1271 | 2022 | 21 | 4 | 12 | 66 | 59 | 298 | 339 | 52 | 5 |
| Picco ® A100 | C9 | 528 | 1062 | 2413 | ND | ND | ND | ND | 48 | 272 | 356 | 22 | 5 |
| Kristalex ® F-100 | PMR | 817 | 1547 | 2871 | ND | ND | ND | ND | 54 | 282 | 347 | 24 | 4 |
| Norsolene ® W100 | PMR | 768 | 1283 | 2184 | ND | ND | ND | ND | 55 | 286 | 350 | 34 | 4 |
| Regalite ® S5100 | C9 H2 | 499 | 851 | 1648 | ND | ND | ND | ND | 46 | 274 | 371 | 33 | 4 |
| Picco ® AR85 | C9 | 482 | 683 | 989 | ND | ND | ND | ND | 35 | 235 | 353 | 42 | 4 |
| Oppera ® PR373N | C5/C9 | 716 | 1502 | 4289 | ND | ND | ND | ND | 42 | 291 | 354 | 21 | 3 |
| Eastotac ® H-142R | C5 H2 | 412 | 721 | 1621 | ND | ND | ND | ND | 89 | 316 | 433 | 40 | 3 |
| Piccotac ® 8090-E | C5/C9 | 783 | 1965 | 5286 | ND | ND | ND | ND | 39 | 286 | 352 | 18 | 3 |
| Sukorez ® SU400 | H2 DCPD | 300 | 506 | 942 | 72 | 44 | 3 | 4 | 54 | 291 | 429 | 51 | 3 |
| Piccotac ® 1105-E | C5 | 986 | 3324 | 9464 | ND | ND | ND | ND | 46 | 311 | 364 | 15 | 3 |
| Piccotac ® 1095 | C5 | 737 | 1694 | 4131 | ND | ND | ND | ND | 42 | 285 | 368 | 21 | 3 |
| Norsolene ® W85 | PMR | 619 | 1074 | 1805 | ND | ND | ND | ND | 37 | 256 | 352 | 50 | 2 |
| Eastotac ® H-130R | C5 H2 | 372 | 702 | 1591 | ND | ND | ND | ND | 73 | 282 | 433 | 47 | 2 |
| Wingtack ® 95 | C5 | 1000 | 1727 | 3148 | ND | ND | ND | ND | 51 | 264 | 369 | 31 | 2 |
| Eastotac ® H-100E | C5 H2 | 308 | 743 | 2133 | ND | ND | ND | ND | 43 | 237 | 429 | 48 | 1 |
| Eastotac ® H130W | C5 H2 | 423 | 735 | 1648 | 58 | 23 | 2 | 5 | 75 | 443 | 57 | 43 | 3 |
| Escorez ® 5320 | H2 DCPD | 265 | 591 | 1801 | 74 | 41 | 1 | 2 | 64 | 301 | 442 | 39 | 2 |

Example 2: Analytical Characterization of Modified Resins, General Methods

General methods: Differential scanning calorimetry (DSC) and high resolution thermogravimetric analysis (TGA) were used to evaluate thermal stability. GPC was used to determine any molecular weight changes.

DSC was performed with a TA Instruments Q200 (TA Instruments, New Castle, Del., US) under nitrogen at 20° C./min. Values from the second heating scan were reported for heat, cool, heat cycles. High resolution TGA was conducted under nitrogen with a TA Instruments Q500 (TA Instruments, New Castle, Del., US) at heating rate of 10° C./min.

A TA Instruments Q2000 Differential Scanning calorimeter (DSC) with an RCS 90 cooling system (TA Instruments, New Castle, Del., US) was calibrated using the same heating rate, purge gas, and flow rate as was used during sample analysis. Indium was weighed and prepared in a standard aluminum pan and was used to calibrate the temperature as outlined in ASTM E 967.

Samples were prepared by weighing 3 to 5 mg of thermoplastic resin into standard aluminum pans. Both the sample mass and pan mass were recorded and entered into the TA software for analysis. During sample testing, nitrogen was purged through the cell with a flow rate of 50 ml/min. Samples were cooled to zero degrees Celsius and held isothermal for two minutes before heating to 135° C. with a heating rate of 20° C./min. This heating cycle was repeated and the second heating scan was used for analysis.

TA Instruments Universal Analysis software (TA Instruments, New Castle, Del., US) was employed for the analysis of samples. The second heating scan of samples were analyzed for a step change or glass transition (Tg). The step midpoint was set at the half height between the onset and end of the Tg. Initial and final limits for the transition were manually selected where approximately 20° C. of steady baseline was observed before the onset and following the end of the Tg.

GPC methodologies were as follows: an Agilent 1100 HPLC (Agilent Technologies, Inc., Santa Clara, Calif., US) equipped with refractive index detector (RID) was used for the GPC analysis. (See, for instance, Mulder et al., J. Chrom. A, 51:459-477, 1970). The sample was prepared by dissolving 25 mg of material in 10 mL of THF and sonicated for about 5 min. Then, 10 µL of toluene was added and swirled. A portion of this solution was added to a vial. Run Method: Flow: 1 mL/min, Solvent: THF, Runtime: 26 min, RID Temp: 30° C., Column Temp: 30° C., Injection: 50 µL, Calibration Material: EasiCal PS-1 (Agilent Technologies, Inc., Santa Clara, Calif., US, Part Number 2010-0505), Column Type: 1st Column: GPC Guard Column (Agilent Technologies, Inc., Santa Clara, Calif., US, Part Number PL1110-1520), Particle Size—5 µm, Length: 50 mm×7.5 mm, 1st Column: PLGel 5 µm MIXED-C, Part Number—PL1110-6500, Particle Size—5 µm, Length: 300 mm×7.5 mm, 2nd Column: OligoPore (Agilent Technologies, Inc., Santa Clara, Calif., US, Part Number PL1113-6520), Particle Size—6 µm, Pore Type—100A, Length: 300 mm×7.5 mm.

An Agilent 1100 HPLC with an Agilent 1260 Refractive Index detector was used for GPC analysis (Agilent Technologies, Inc., Santa Clara, Calif., US). The mobile phase used was tetrahydrofuran stabilized with BHT preservative (Mollickrodt Pharmaceuticals, Inc., Staines-upon-Thames, England, UK). The stationary phase consisted of three columns from Agilent: PLgel MIXED guard column (5 micron, 7.5×300 mm, Agilent Technologies, Inc., Santa Clara, Calif., US), PLgel Mixed C Column (5 micron, 7.5×300 mm, Agilent Technologies, Inc., Santa Clara, Calif., US), and an OligoPore GPC column (5 micron, 7.5×300 mm, Agilent Technologies, Inc., Santa Clara, Calif., US).

The calibrants used were monodisperse polystyrene standards with a molecular weight (MW) range from 580 to 4,000,000 although peaks for polystyrene dimer, trimer tetramer, and pentamer, were also observed and included in the calibration. Analytical grade toluene was used as flow marker. A fourth-degree polynomial equation was used to find the best fit for the Log MW versus the observed retention time. The instrument parameters used for calibration and sample analysis include a flow rate of 1.0 ml/min, injection volume of 50 microliters while the columns and RI detector were heated at 30° C. Samples were prepared by dissolving 25 mg of the sample into 10 ml of THF with BHT, after which 10 microliters of toluene was added as the flow marker. Samples were analyzed to determine the Mw, Mn, and Mz of the thermoplastic resins. The percent thermoplastic resin below 300 g/mol and below 600 g/mol, including the amount below 300 g/mol, was determined by GPC integration with Agilent GPC/SEC Software Version 1.2.3182.29519.

The instrument parameters used for calibration and sample analysis include a flow rate of 1.0 ml/min, injection volume of 50 microliters while the columns and RI detector were heated at 30° C. Samples were prepared by dissolving 25 mg of the sample into 10 ml of THF with BHT, after which 10 microliters of toluene was added as the flow marker. Samples were analyzed to determine the Mw, Mn, and Mz of the thermoplastic resins.

In the high resolution TGA analyses of oligomer percentages (Tables 6 and 7), a TA Instruments Q500 Thermal Gravimetric Analyzer was calibrated using the curie point of magnetic transition standards as outlined in ASTM method E1582, procedure C. It was calibrated with a rate of 10 degrees per minute in Nitrogen using Alumel, Nickel, Perkalloy, Iron and room temperature. A small aluminum pan was paced on a platinum pan and tared before analysis. Between ten and twelve milligrams of thermoplastic resin sample was placed inside the aluminum pan for analysis. The sample was heated in nitrogen with a scanning rate of 20 degrees per minute from ambient temperature to 625° C., using a resolution factor of 3.0 and Hi-Res sensitivity of 2.0.

Samples were analyzed by features observed in the weight percent versus temperature thermogram and the first derivative curve of the same variables. The temperature at the maximum 1st derivative value, $T_{max}$, is used as a reference temperature, and the percentage of oligomer is obtained by taking the percent weight loss at a temperature 30° C. below, $T_{max}$. If the first derivative is multimodal and the $T_{max}$ is reasonably assigned to oligomers, then the second maximum temperature in the first derivative should be designated as $T_{max}$. Additionally, the temperature at 10% weight loss, $T_{10}$, is also determined.

The Verband Der Automobilindustrie E.V. (VDA) method 278 (VDA 278) tests for volatile to medium volatile substances in the VOC value measurement, allowing substances to be determined and analyzed up to n-pentacosane ($C_{25}H_{52}$, 353 g/mol). (See, VDA 278 Thermal Desorption Analysis of Organic Emissions for the Characterization of Non-Metallic Materials for Automobiles, for the Characterization of Non-Metallic Materials for Automobiles, issued 29 Sep. 2011, updated October 2011, issued by the German Association of the Automotive Industry (VDA), Behrenstraße 35, 10117 Berlin, Germany). This is the same carbon number cited in the European Food Contact Material 95 definition for mineral oil. VDA 278 also reports a FOG value that is the total of substances in the boiling point range of n-alkanes $C_{14}H_{30}$ to $C_{32}H_{66}$ 198-451 g/mol. Mineral oils have been characterized by Vavasour and Chen of the World Health Organization as having a relative average molecular mass of 300 to 600 g/mol. (See, Vavasour et al., WHO FOOD ADDITIVES SERIES: 50, "Safety evaluation of certain food additives/ prepared by the fifty-ninth meeting of the Joint FAO/WHO Expert Committee on Food Additives," 2003, "MINERAL OILS (MEDIUM-AND LOW-VISCOSITY) AND PARAFFIN WAXES"). Thus, characterization of the modified thermoplastic resins by the percent of the resin material that has a molecular weight below 600 g/mol and also the resin fraction that has a molecular weight below 300 g/mol (included in the percentage under 600 g/mol) is characterized herein.

Standard molecular weight values were used for typical the resin monomers including styrene, AMS, DCPD, DCP, indene, and piperylene. Modified thermoplastic PMR resins and C9 resins, including hydrogenated, partially hydrogenated, and comonomer-modified PMR and C9 resins, generally have trimer, tetramer, and pentamer oligomers possessing a molecular weight between about 300 g/mol and about 600 g/mol. The dimers of these resins possess a molecular weight of between about 100 g/mol and about 300 g/mol. The other types of resins, such as C5, C5/C9, DCPD, aromatic-modified-DCPD, and other comonomer modified versions of these resins, as well as hydrogenated and partially hydrogenated versions of these resins, comprise dimers and trimers that have molecular weights generally between about 100 g/mol and about 300 g/mol, and tetramer and pentamer oligomers of a molecular weight of between about 300 g/mol and about 600 g/mol. C5 resins and DCPD resins, and their corresponding hydrogenated and partially hydrogenated versions, without aromatic modification, generally possess tetramer oligomers having a molecular weight of between about 100 g/mol and about 300 g/mol.

Example 3: Reduction of Volatile Organic Compounds (VOC) and FOG

Modified thermoplastic resins (C9 H2, PMR H2) were prepared and tested according to Verband Der Automobilindustrie E.V. (VDA) method 278. Unmodified commercial thermoplastic resins Regalite™ 55100, Regalite™ R1100, Regalrez 1126, and Regalrez 1094 (Eastman Chemical Company, Kingsport, Tenn., US) were tested for comparison.

An Agilent 7890B gas chromatograph with an Agilent 5977A MS detector was equipped with a Restek Rtx-5MS 30 meter (m)×0.25 millimeter (mm)×0.25 μm column (Restek Corporation, Bellefonte, Pa., US) with 10 m deactivated Integra guard and connected to a PerkinElmer Turbomatrix ATD650 (PerkinElmer, Waltham, Mass., US). A 15 to 20 mg sample was cut from the interior of a pellet and inserted into a stainless-steel desorption tube and held in place with glass wool. According to the VDA 278 method, the sample was heated in the thermal desorption tube for 30 minutes at 90° C. for volatile organic compound (VOC) gas emissions followed by 60 minutes at 120° C. for condensable substance (FOG) emissions. For each, the emissions were collected on a Tenax cold trap (Tenax Corporation, Baltimore, Md., US) and then desorbed onto a GC column for separation, then sent into a mass selective detector (MSD) for identification and quantification.

The VOC value is the total of the readily volatile to medium volatile substances. This method allows substances to be determined and analyzed up to n-pentacosane (C25). The FOG value is the total of substances in the boiling point range of n-alkanes C14 to C32. Quantitation is achieved by external calibration and is reported as toluene equivalent concentrations for the VOCs and n-hexadecane equivalent concentrations for the FOGs. Sample values identified by * were tested by the same procedure on an Agilent 7890B gas chromatograph with an Agilent 5975A MS detector was equipped with an Agilent DB-5MS 30 m×0.25 mm×0.25 μm column with 5 m deactivated fused silica guard column and connected to a Gerstel Thermal Desorption System (TDS) using 30 mg samples (Agilent Technologies, Santa Clara, Calif., US).

The results for VOC as toluene equivalents and the results for FOG as n-hexadecane equivalents in Table 7 show that the modified thermoplastic resins have a surprising 65% to 96% decrease in VOC and 80% to 97% decrease in FOG compared to currently commercially available unmodified resins. This makes the described modified thermoplastic resins with reduced VDA 278 VOC and FOG values uniquely advantageous for applications involving use of adhesives, plastic modification, film modification, and thermoplastic elastomeric compounds where decreasing odor, air pollution, and/or migration of low molecular weight components are of interest. Such applications include, but are not limited to, window sealants for buildings, adhesives sealants, gaskets, seals, o-rings, molded parts, extruded parts, and such for automobiles, trucks and other motor vehicles, woodworking adhesives, carpet backing compounds and adhesives, flooring adhesives, duct tape, mastics, and sealants, and the like.

TABLE 7

VDA 278 Performance of Modified and Unmodified Thermoplastic Resins

| | Resin tested | | | | | | | |
|---|---|---|---|---|---|---|---|---|
| | Regalrez™ 1126 | modified Regalrez 1126 | Regalite™ S5100 | modified Regalite™ S5100 | Regalite™ R1100 | modified Regalite™ R1100 | Regalrez™ 1094 | modified Regalrez™ 1094 |
| Resin type | PMR H2 | PMR H2 | C9 H2 | C9 H2 | C9 H2 | C9 H2 | PMR H2 | PMR H2 |
| RBSP (° C.) | 122 | 132 | 100 | 116 | 102 | 140 | 94 | 121 |
| VOC (μg/g as toluene equivalents) | 194* | 68* | 1400 | 270 | 1240 | 250 | 701* | 26* |
| FOG (μg/g as nC16 ⁺ equivalents) | 794* | 155* | 11250 | 1550 | 10650 | 270 | 3313* | 93* |

⁺ nC16 = n-hexadecane
*defined as above

Example 4: Compatibility of Binary Blends of Modified Thermoplastic Resins

Two of the modified thermoplastic resins, specifically the modified Regalite™ R1100 thermoplastic resin and the modified Regalite™ S5100 thermoplastic resin of Example 3, Table 7, modified Kristalex F-85 and a second modified Regalite™ R1100 thermoplastic resin were prepared and combined (50 wt %) with the specified metallocene-polyethylene (m-PE) or ethylene vinyl acetate (EVA) polymers (50 wt %) in an aluminum tray heated on a hot plate to approximately 150° C. These blends were mixed with a spatula until homogeneous or for a maximum of 10 minutes. Commercial resins Plastolyn™ R1140, Kristalex™ F-115, and Regalite™ S5100 (Eastman Chemical Company, Kingsport, Tenn., US) were incorporated into comparative resin blends. Additionally, the same two modified Regalite™ R1100 thermoplastic resins were combined (20 wt %) with an extrusion grade polypropylene (PP) polymer with 3 g/min Melt Flow Rate (MFR), 230° C./2.16 kg (79.9 wt %) and 0.1 wt % Irganox® 1010 (pentaerythritol tetrakis(3-(3,5-di-tert-butyl-4-hydroxyphenyl)propionate), BASF, Ludwigshafen, Germany) at 200° C. and 35 rpm for 10 minutes in a Brabender measuring mixer W50EHT (C.W. Brabender Instruments, Inc. Hackensack, N.J., US). Commercial resin Plastolyn™ R1140 was used to similarly prepare a comparative blend. The modified thermoplastic resins, specified polymers, and prepared blends were characterized by DSC, and the obtained values are provided in Tables 8A and 8B, below.

The Fox Equation ($1/T_{g,mix} \approx \Sigma_i \omega_i/T_{g,i}$) is well-known to describe the Tg of a polymer blend when the components are fully compatible with each other. The magnitude of deviation from the predicted Fox Tg is sometimes considered an indication of compatibility with a fully compatible system having zero difference between the predicted Fox Tg and the actual measured Tg of the prepared blend. The blends provided herein including the described modified thermoplastic resins were as much as 5° C. closer to the predicted Fox Tg than the comparative blends, indicating significantly improved compatibility of the modified thermoplastic resins in the polymers as compared with unmodified standard resins. It was especially surprising that the polypropylene (PP) blends comprising inventive resins and PPE1 and PPE2 had Tg values within 1° C. of the predicted Fox Tg values. Additionally, blends comprising the inventive modified resins were clear or had less haze than the comparative blends, indicating the improved compatibility of the inventive resins in the polymers tested.

TABLE 8A

Compatibility Of Modified Thermoplastic Resins With Polymers

| | Polymer | | | | | |
|---|---|---|---|---|---|---|
| | AFFINITY ™ GA1950 | | | Polypropylene (PP) (3 g/10 min MFR, 230° C./2.16 kg) | | |
| | test resin | | | | | |
| | Modified Regalite ™ R1100 | Modified Regalite ™ R1100 | Plastolyn ™ R1140 | Modified Regalite ™ R1100 | Modified Regalite ™ R1100 | Plastolyn ™ R1100 |
| Polymer (%) | 50 | 50 | 50 | 80 | 80 | 80 |
| Resin (%) | 50 | 50 | 50 | 20 | 20 | 20 |
| DSC Tg, resin | 93.9 | 92.7 | 90.2 | 93.9 | 92.5 | 84.9 |
| DSC Tg, polymer | −51.5 | −51.5 | −51.5 | −2.0 | −2.0 | −2.0 |
| DSC Tg, Blend - actual | −31.5 | −31.5 | −36.8 | 22.9 | 22.0 | 17.8 |
| DSC Tg, blend - Fox predicted | 3.2 | 2.9 | 2.2 | 21.9 | 21.9 | 20.2 |
| Difference (Fox predicted Tg - actual blend Tg) | 34.7 | 34.4 | 39.0 | −0.9 | −0.1 | 2.3 |
| ° C. improved compatibility | 4.3 | 4.6 | reference | 1.4 | 2.2 | reference |
| Melt appearance (5 = opaque) | Clear at 160° C. | Clear at 160° C. | Haze = 4 at 160° C. | Clear at 215° C. | Clear at 215° C. | Haze = 1 at 215° C. |

TABLE 8B

Compatibility Of Modified Thermoplastic Resins With Polymers

| | Polymer | | | |
|---|---|---|---|---|
| | Evatane ™ 40-55 | | Evatane ™ 28-150 | |
| | test resin | | | |
| | Modified Kristalex ™ F-85 | Kristalex ™ F-115 | Modified Regalite ™ S5100 | Regalite ™ S5100 |
| Polymer (%) | 50 | 50 | 50 | 50 |
| Resin (%) | 50 | 50 | 50 | 50 |
| DSC Tg, resin | 76.7 | 67.6 | 70.1 | 50.0 |
| DSC Tg, polymer | −24.6 | −24.6 | −28.8 | −28.8 |
| DSC Tg, Blend - actual | −5.1 | −11.9 | −7.1 | −17.2 |
| DSC Tg, blend - Fox predicted | 17.5 | 14.3 | 12.3 | 5.1 |
| Difference (Fox predicted Tg - actual blend Tg) | 22.6 | 26.2 | 19.4 | 22.3 |
| ° C. improved compatibility | 3.6 | — | 2.9 | — |
| Melt appearance (5 = opaque, 1 = clear) | Haze = 2, 160° C. | Haze = 5, 160° C. | Haze = 1, 160° C. | Haze = 1, 160° C. |

Example 5: HMPSA Compositions Containing Modified Thermoplastic C5 Resins

Modified thermoplastic resins (C5) were prepared and combined in the ratios shown below in Table 9 to create Hot Melt Pressure Sensitive Adhesives (HMPSAs) TE1, TE2, and TE3 (all values are in phr). A nonmodified thermoplastic resin (C5), Piccotac™ 1115 (Eastman Chemical Company, Kingsport, Tenn., US), was used to prepare comparative adhesive TC1. The styrene block copolymer adhesives were mixed in a 1 Kg capacity Linden sigma-blade mixer attached to a Julabo Hot Oil Temperature Control Unit (Julabo Labortech GmbH, Seelbach, Germany). The mixer was pre-heated for 45 minutes using oil at 170° C., resulting in a typical mixer temperature of approximately 150° C. The styrene block copolymer, antioxidant, and half the resin were charged under nitrogen and mixed for approximately 12 minutes or until homogenous. Each subsequent component addition was mixed for 5 to 10 minutes before another addition was made. Thermoplastic resin was added in thirds, followed by addition of about one-third the specified oil, and the remaining oil was added in three portions. The final composition was mixed for an additional 30 minutes, with a typical final adhesive temperature of 150° C.

TABLE 9

HMPSA Formulations for PSA Tape Testing Containing Modified C5 Resins

| | TC2 | TE1 | TE2 | TE3 |
|---|---|---|---|---|
| Kraton ™ D1160 | 100 | 100 | 100 | 100 |
| Piccotac ™ 1115 | 115 | 0 | 0 | 0 |
| Modified Piccotac ™ 1095N | 0 | 115 | 0 | 0 |
| Modified Piccotac ™ 1095N | 0 | 0 | 115 | 100 |
| Nyflex ® 820 oil | 15 | 15 | 15 | 15 |
| Antioxidant Irganox ® 1010 | 0.01 | 0.01 | 0.01 | 0.01 |

Viscoelastic characteristics of Comparative Adhesive TC2 and Example Inventive Adhesives TE1, TE2, and TE3 were characterized by Dynamic Mechanical Analysis (DMA), and the values obtained are provided in Table 10. The viscosity of the prepared adhesives was measured following ASTM D-3236, Brookfield Engineering Laboratories Model DV-II, spindle 29. Relative finger tack within a set of samples was independently evaluated by three operators and the average values are reported in Table 10.

The modified thermoplastic resin adhesives exhibit increased Tan-δ peak value corresponding to excellent compatibility of the modified thermoplastic resins with the polymer midblock, resulting in increased adhesive tack as compared to the unmodified resin-containing comparative example.

TABLE 10

Comparison of Physical Parameters of HMPSA formulated with Modified and Non-Modified Thermoplastic Resins

| | TC2 | TE1 | TE2 | TE3 |
|---|---|---|---|---|
| Resin RBSP (° C.) | 113 | 107 | 117 | 117 |
| Properties of the HMPSA | | | | |
| HMPSA RBSP (° C.) | 134 | 133 | 134 | 148 |
| Brookfield viscosity at 180° C. (cP) | 109,800 | 120,700 | 152,000 | 188,000 |
| Finger tack | +/− | +++ | ++ | +++ |
| DMA Tan-δ peak temperature (° C.) | 9.2 | 7.2 | 13.2 | 7.2 |
| DMA Tan-δ peak value | 1.5 | 1.9 | 1.9 | 1.8 |
| DMA 3rd cross over temperature (Tan-δ = 1) (° C.) | 123 | 125 | 128 | 127 |

The prepared HMPSA formulations were coated onto 2 mil Mylar (BoPET, biaxially-oriented polyethylene terephthalate) film using a Bobis hot melt knife coater at 180° C. (LC200 lab-coater produced by Maan Group, Raalte, The Netherlands). The comparative HMPSA formulation was coated at 190° C. to obtain good flow. Tapes were tested after 24 hours at 23° C./50% RH and after aging two weeks in an oven at 40° C. Tape performance tests were conducted according to AFERA 5001 (180° peel strength, stainless steel, n=4), AFERA 5012 (static shear adhesion, n=4, 23° C./2.5 kg, 40° C./1 kg and 70° C./0.5 kg), AFERA 5013 GTF 6001 (Shear Adhesion Failure Temperature, SAFT, n=4, 0.5 kg), and FTM-9 (loop tack, n=4). The results of these tests are presented in Table 11.

The coat weights were 18±1 g/m$^2$, and coated tape samples were conditioned in a controlled temperature and humidity climate (25° C. and 50% RH) overnight before testing as pressure sensitive adhesive tapes.

Loop tack tests were performed on a Instron tensile tester type 3344 with 50 N load cell in accordance with PSTC-16 Instron Corporation, Norwood, Mass., US). The crosshead displacement rate was 5 mm/s. A 25 mm×125 mm loop of tape was used in the experiments. The free loop of tape, unrestricted by the grips, was 75 mm long. The contact area of the loop was 25 mm×25 mm, and the maximum force per unit width of the specimen was recorded. The initial height, measured from the bottom of the grips to the substrate surface, was 50 mm. The maximum displacement was 44 mm and the dwell time at maximum displacement was one second.

Shear Adhesion Failure Temperature (SAFT) measurement followed AFERA 5013 GTF 6001 Test Method for Shear Adhesion Failure Temperature (SAFT) of Pressure Sensitive Tape and was measured using a Shear Test Oven equipped with a High Temperature Shear Bank Tester (ChemInstruments, Fairfield, Ohio, US). A 25×25 mm (1"× 1") area of tape was adhered to a stainless-steel panel using one complete pass of a standard 2 kg (4.5 lb.) hand roller. Samples were prepared and climatized for 30 minutes at 25° C. and 50% RH, then placed in the oven and a static load of 500 g was suspended from the tape. The oven was equilibrated for 20 minutes at 40° C., and then the temperature was increased with a heating rate of 0.5° C./minute. The measured time to failure was recorded and converted to a failure temperature in degrees Celsius (° C.). The minimum number of samples for SAFT testing was four.

Shear holding power measurements were performed with a modification of the AFERA 5012 method, Self Adhesive Tapes—Measurement of Static Shear Adhesion EN 1943 2002, using a shear tester. These experiments were conducted to measure the room temperature, cohesive, or shear properties of the adhesive tape. A 25 mm×25 mm (1" by 1") contact area described in AFERA 5012 was used. The pressure-sensitive adhesive tape (PSAT) was adhered to stainless steel coupons with a standard 4.5 lb. (2 kg) roller and a mass of 2.5 kg was suspended from the tape. The time (h) at which the adhesive failed cohesively was recorded as the holding power. After reaching a maximum time of 167 h (10,000 min), the samples were removed from the test apparatus. Samples for shear holding power at 70° C. were similarly prepared. Samples were placed in an oven and were climatized to 70° C. After reaching this temperature, the static load of 500 g was suspended from the tape. The measured time to failure was recorded. The minimum number of samples tested was four.

The 180° peel resistance or peel force per unit width was measured in accordance with AFERA 5001: Self Adhesive Tapes—Measurement of Peel Adhesion from Stainless Steel or from its own Backing—Single-Coated Tapes, Peel Adhesion at 180° Angle. Rectangular strips of tape measuring 25 mm×250 mm were tested using an Instron Model 3344 at 5 minis (12 inch/minute) crosshead displacement rate (Instron, Norwood, Mass., US). Results were recorded in N/25 mm.

The excellent compatibility of the modified thermoplastic resins in the adhesive yielded superior tack with over 100% improvement in loop tack, and superior adhesion with over 50% higher peel strength. Surprisingly, the modified thermoplastic resin provided superior performance in tack, adhesion, and cohesion with superior cohesive strength as indicated by longer shear adhesion at 23° C. after aging, and improved temperature resistance as indicated by higher SAFT temperatures of TE2 and TE3. Surprisingly, the inventive adhesives have superior cohesive strength at high temperature, as indicated by more than 80% longer shear adhesion at 70° C. Most surprising was that the 70° C. shear adhesion of TE3 was over 400% longer than the 70° shear adhesion of TC1.

Furthermore, adhesive TE3 uses less resin to achieve higher temperature resistance, cohesive strength, and tack as comparative adhesive TC2 containing only unmodified resin. This means that the modified thermoplastic resin in TE3 is more effective per gram used in achieving the desired tape performance properties than current commercially available unmodified thermoplastic resins.

TABLE 11

Performance of HMPSA Tapes Formulated with Modified and Non-Modified Thermoplastic Resins

| Test | TC2 | TE1 | TE2 | TE3 |
|---|---|---|---|---|
| Loop tack to steel (N)- initial | 1.2 | 4.1 | 2.2 | 3.4 |
| Loop tack (N)- aged | no tack | 1.7 | 0.5 | 1.5 |
| Peel adhesion (N/25 mm) - initial | 12.3 | 19.0 | 19.9 | 19.3 |
| Peel adhesion (N/25 mm) - aged | 0.2 | 16.9 | 16.5 | 16.0 |
| Shear adhesion at 23° C./2.5 kg (min)- initial | >2 weeks | >2 weeks | >2 weeks | >2 weeks |
| Shear adhesion at 23° C./2.5 kg (min)- aged | no tack | >2 weeks | >2 weeks | >2 weeks |
| Shear adhesion at 70° C./0.5 kg (min) -initial | 4292 | 7781 | 8913 | >2 weeks |
| Shear adhesion at 70° C./0.5 kg (min)- aged | no tack | >2 weeks | 7183 | >2 weeks |
| SAFT (° C.) - initial ($\sigma = 1$) | 112 | 117 | 112 | 120 |
| SAFT (° C.) - aged | No tack | 113 | 117 | 120 |

Example 6: Metallocene-Polyethylene Packaging Adhesive Compositions

Modified thermoplastic resin (C9 H2) was prepared and combined in the ratios shown in Table 12 to prepare hot melt adhesive PE4. The components were placed in an aluminum tray heated on a hot plate to approximately 150° C. The mixture was mixed with a spatula until homogeneous or for a maximum of 10 minutes. Non-modified thermoplastic resins (C9 H2) Regalite™ R1125 and Plastolyn™ R1140 (Eastman Chemical Company, Kingsport, Tenn., US) were used to similarly prepare comparative adhesives PC2 and PC4, respectively.

TABLE 12

Packaging Adhesive Compositions Containing Modified Resins

| | PC2 | PC4 | PE4 |
|---|---|---|---|
| Resin RBSP (° C.) | 125 | 139 | 140 |
| AFFINITY™ GA 1950 (wt %) | 42 | 42 | 42 |
| Regalite™ R1125 (wt %) | 38 | 0 | 0 |
| Plastolyn™ R1140 (wt %) | 0 | 38 | 0 |
| Modified Regalite™ R1100 (wt %) | 0 | 0 | 38 |
| Wax (Sasol H1) (wt %) | 20 | 20 | 20 |
| Antioxidant (Irganox ® 1010) (wt %) | 0.38 | 0.38 | 0.38 |

The Brookfield viscosity was determined according to ASTM D3236, "Standard Test Method for Apparent Viscosity of Hot Melt Adhesives and Coating Materials" using a Brookfield Engineering Laboratories Model DV-II equipped with a Brookfield Thermosel™ at the specified temperature (AMETEK Brookfield, Middleborough, Mass., US).

Visual appearance was determined manually with a rating of 1 (clear) to 5 (opaque).

Bonded samples were prepared using either Substrate 1: corrugated cardboard, flute type B, 220 g/m² Kraft liner, 220 g/m² Kraft liner, sourced from Rengo Co., Ltd., Japan, or Substrate 2: corrugated cardboard, flute type B, 115 g/m² Kraft liner, 150 g/m² Test liner, sourced from Moorman (Royal Moorman Karton Weesp BV, Weesp, Netherlands).

Bonded samples for adhesion (fiber tear) testing and for open and set time measurement were prepared using an Adhesive Testing Unit manufactured by ITW Dynatec GmbH, Mettmann, Germany, according to Japanese Adhesive Industry (JAI) Association Method JAI-7-B, with cardboard flutes perpendicular. The fiber tear test consists of manually tearing glued cardboard substrates under the conditions of room temperature or 0° C. (low temperature fiber tear, LTFT). The glued cardboard substrates were conditioned at temperature for at least 10 hours before testing. Samples for SAFT and PAFT testing were prepared following JAI Method JAI-7-A, and samples for hold power testing (peel mode) were prepared following JAI Method JAI-7-C. All samples were prepared with a two second open time and a 20 second compression time with 250 N contact pressure. A minimum of 8 specimens are tested for each test. PAFT and SAFT testing was conducted with 100 g and 500 g weights, respectively and an oven ramp rate of 0.5° C./min. Hold power samples were tested at the specified temperature using a 250 g weight. Set time determination used a 2 second open time and a contact pressure of 8 N. The set time was determined using the maximum pull force in combination with a minimum of 70% fiber tear.

The properties and performance of the prepared adhesives are presented in Table 13. Surprisingly, the modified thermoplastic resin-containing adhesive PE4, prepared using modified 140° C. RBSP thermoplastic resin, is transparent at 160° C., while the adhesive prepared with standard 140° C. resin PC4 has an unacceptable, almost opaque appearance. This indicates much greater compatibility of the modified 140° C. RBSP thermoplastic resin with the m-PE polymer, as shown in Example 4 and with the overall adhesive formulation compared to the standard 140° C. RBSP resin. When the adhesive performance is compared to the transparent PC2 adhesive comprising the lower softening point, standard 125° C. RBSP resin, PE4 unexpectedly has comparable viscosity, and provides both improved heat resistance (PAFT) and improved −15° C. low temperature fiber tear performance.

TABLE 13

Properties And Performance Of Metallocene-Polyethylene Packaging Adhesive Compositions Formulated With Modified And Non-Modified Thermoplastic Resins

|  | PC2 | PC4 | PE4 |
|---|---|---|---|
| RBSP of resin (° C.) | 125 | 139 | 140 |
| Adhesive RBSP (° C.) | 109 | 111 | 109 |
| Brookfield Viscosity at 160° C. (cP) | 2130 | 2295 | 2285 |
| Visual appearance at 160° C. (5 = opaque, 1 = clear) | 1 | 5 - opaque | 1 |
| Visual appearance at 180° C. (5 = opaque, 1 = clear) | 1 - clear | 4-hazy | 1 |
| PAFT - Substrate 2 (° C.) | 81 | 87 | 87 |
| Hold power, peel mode at 50° C. - Substrate 1 (hr) | >24 | >24 | >24 |
| SAFT - Substrate 2 (° C.) | 84 | 85 | 84 |

TABLE 13-continued

Properties And Performance Of Metallocene-Polyethylene Packaging Adhesive Compositions Formulated With Modified And Non-Modified Thermoplastic Resins

|  | PC2 | PC4 | PE4 |
|---|---|---|---|
| LEFT -15° C. Substrate 2 (%) | 25 | 38 | 40 |
| Set time - Substrate 1 (sec) | 5 | 4 | 10 |

Example 7: Ethylene Vinyl Acetate Adhesive Compositions Containing Modified Resins Modified thermoplastic resins were prepared and combined in the ratios shown in Table 14 to prepare hot melt adhesives VVE5 (PMR) and VVE2 (C9 H2). Non-modified thermoplastic resins (PMR) Kristalex™ F-85 and Kristalex™ F-115 were used to prepare comparative adhesives VVC5 and VVC6, and Regalite™ S5090 and Regalite™ S5100 (C9 H2) were used to prepare comparative adhesives VVC1 and VVC2 (Eastman Chemical Company, Kingsport, Tenn., US). The adhesives are useful for packaging, woodworking and other similar applications. The adhesives were prepared and tested following standard methods as described in Example 7.

TABLE 14

EVA Adhesive Formulations Comprising Modified Thermoplastic Resin

|  | VVC1 | VVE2 | VVC2 | VVC5 | VVE5 | VVC6 |
|---|---|---|---|---|---|---|
| Evatane ™ 28-150 (wt %) | 40 | 40 | 40 | 0 | 0 | 0 |
| Evatane ™ 40-55 (wt %) | 0 | 0 | 0 | 40 | 40 | 40 |
| Regalite ™ S5090 (TK757) (wt %) | 35 | 0 | 0 | 0 | 0 | 0 |
| Modified Regalite ™ S5100 (wt %) | 0 | 35 | 0 | 0 | 0 | 0 |
| Regalite ™ S5100 (wt %) | 0 | 0 | 35 | 0 | 0 | 0 |
| Kristalex ™ F-85 (wt %) | 0 | 0 | 0 | 15 | 0 | 0 |
| Modified Kristalex ™ F-85 (wt %) | 0 | 0 | 0 | 0 | 15 | 0 |
| Kristalex ™ F-115 (wt %) | 0 | 0 | 0 | 0 | 0 | 15 |
| Regalite ™ R1100 (wt %) | 0 | 0 | 0 | 20 | 20 | 20 |
| Wax (Sasol H1) (wt %) | 15 | 15 | 15 | 15 | 15 | 15 |
| Paraffin wax 66-69 (wt %) | 10 | 10 | 10 | 10 | 10 | 10 |
| Antioxidant (Irganox ® 1010) (wt %) | 0.4 | 0.4 | 0.4 | 0.4 | 0.4 | 0.4 |

Surprisingly, inventive adhesive VVE2 was transparent using the higher RBSP modified thermoplastic resin, resulting in advantageously and significantly higher PAFT than VVC1 and 400% and 189% longer 50° C. holding power (peel) than VVC1 and VVC2, respectively, while maintaining adhesion at −15° C., Table 15. The high vinyl acetate content EVA adhesive VVE5 surprisingly was transparent with 100% improved 50° C. holding power (peel) compared to both VVC5 and VVC6, while maintaining adhesion at −15° C.

TABLE 15

Properties And Performance Of EVA Adhesive Formulations Comprising Modified Thermoplastic Resins

|  | VVC1 | VVE2 | VVC2 | VVC5 | VVE5 | VVC6 |
|---|---|---|---|---|---|---|
| Resin RBSP (° C.) | 91 | 116 | 99 | 86 | 117 | 116 |
| Adhesive RBSP (° C.) | 107 | 109 | 108 | 108 | 107 | 107 |
| Brookfield Viscosity at 160° C. (cP) | 2230 | 2790 | 2450 | 6500 | 7600 | 7200 |
| Visual appearance at 160° C. (5 = opaque, 1 = clear) | 1 | 1 | 1 | 1 | 1 | 1 |
| PAFT - Substrate 1 (° C.) | 58 ± 1 | 68 ± 1 | 65 ± 1 | 85 ± 1.7 | 81 ± 1.1 | 82 ± 1.5 |
| HP at 50° C. - Substrate 1 (hr) | 13 ± 4 | 66 ± 25 | 23 ± 3 | 86 ± 42 | 171 ± 46 | 128 ± 44 |
| LTFT −15° C. Substrate 1 (%) | 43 ± 26 | 61 ± 34 | 75 ± 26 | 88 ± 27 | 88 ± 21 | 98 ± 8 |
| LIFT 0° C. Substrate 1 (%) | 88 ± 28 | 95 ± 10 | 95 ± 15 | 90 ± 17 | 93 ± 12 | 85 ± 21 |

Example 8: Ethylene Vinyl Acetate Adhesive Compositions Containing Modified Resins Modified thermoplastic resin (PMR) was prepared and combined in the ratios shown in Table 16 to prepare two different hot melt adhesives, VE3 and VE7. An unmodified thermoplastic resin (PMR), Kristalex™ 3085, was used to prepare comparative adhesives VC1 and VC5 (Eastman Chemical Company, Kingsport, Tenn., US). Adhesive formulations were prepared by thoroughly mixing the specified polymers, resin, and antioxidant using a mechanical stirrer equipped with a coil impeller, followed by addition of the specified waxes. The formulations were mixed for 15 minutes after all additions were complete. Formulations VC1 and VE3 were mixed at about 150° C. and applied at 130° C. to a cardboard substrate for testing. Formulations VC5 and VE7 were mixed at about 180° C. and applied at 180° C. to a cardboard substrate for testing.

TABLE 16

EVA Adhesive Formulations Comprising Modified Thermoplastic Resin

|  | VC1 | VE3 | VC5 | VE7 |
|---|---|---|---|---|
| Evatane ™ 28-800 (wt %) | 35 | 35 | 0 | 0 |
| Evatane ™ 28-40 (wt %) | 0 | 0 | 38 | 38 |
| Evatane ™ 28-420 (wt %) | 0 | 0 | 42 | 42 |
| Permalyn ™ 6110 (wt %) | 5 | 5 | 0 | 0 |
| Kristalex ™ 3085 (wt %) | 30 | 0 | 80 | 0 |
| VE7 Modified Kristalex ™ 3085 resin (wt %) | 0 | 30 | 0 | 80 |
| Paraffin wax mp 66-69° C. (wt %) | 29.6 | 29.6 | 0 | 0 |
| Sasolwax ™ 3279 microcrystalline wax (wt %) | 0 | 0 | 40 | 40 |
| Irganox ® 1010 antioxidant (wt %) | 0.4 | 0.4 | 0.6 | 0.6 |

The Brookfield viscosity was analyzed according to ASTM D3236, "Standard Test Method for Apparent Viscosity of Hot Melt Adhesives and Coating Materials" using a Brookfield DV-I+ with Thermosel™ and spindle 27 at the specified temperature (AMETEK Brookfield, Middleborough, Mass., US).

Bonded samples for fiber testing and for open and set time measurement were prepared using hot melt tester model ASM-15N manufactured by Mitsubishi Electric Corporation (MEC) in Japan according to Method JAI-7-B, with cardboard flutes perpendicular. The fiber tear test consists of manually tearing glued cardboard substrates by hand under the conditions of room temperature or 0° C. The glued cardboard substrates were conditioned at temperature for at least 10 hours before testing. Samples for SAFT and PAFT testing were prepared following Method JAI-7-A, and samples for hold power testing (peel mode) were prepared following Method JAI-7-C. PAFT and SAFT testing was conducted with 100 g and 500 g weights, respectively at an oven ramp rate of 0.5° C./min. A minimum of 5 specimens are tested for each test. Hold power samples were tested with a 250 g weight. All tests were conducted on Substrate 1.

The properties and performance of the prepared adhesives are given in Table 17. The modified thermoplastic resins incorporated into adhesives VE3 and VE7 exhibited a RBSP about 20° C. higher than the adhesives formulated with unmodified resins. Surprisingly, despite the significantly higher resin RBSP, adhesives VE3 and VE7 incorporating the modified thermoplastic resins exhibit RBSP values and viscosity values comparable to those of control samples VC1 and VC5, respectively.

Although the higher RBSP modified thermoplastic resin analyzed by this example did not increase the adhesive viscosity, there was a surprising and advantageous 400% increase in the 50° C. hold power of adhesive VE3 comprising modified thermoplastic resin as compared to VC1 comprising unmodified resin. VE3 and VE7 both exhibited improvement in set time, open time, and thermal resistance (PAFT). Additionally, adhesive VE7 comprising modified thermoplastic resin surprisingly had significantly improved adhesion to cardboard at -7° C. as compared to adhesives comprising standard unmodified resin. The modified thermoplastic resins therefore allowed the use of higher RBSP resins without significantly increasing the RBSP and viscosity of the final adhesive, thereby maintaining the ease of processing and ability to use lower adhesive application temperatures. Additionally, excellent performance was observed in terms of temperature resistance and setting properties when incorporating the modified thermoplastic resins described herein into these adhesive formulations.

TABLE 17

Properties Of EVA Adhesives Comprising Modified Thermoplastic Resins

|  | VC1 | VE3 | VC5 | VE7 |
|---|---|---|---|---|
| Adhesive RBSP (° C.) | 76 | 75 | 85 | 87 |
| Viscosity 120° C. (cP) | 1530 | 1709 | 7825 | 9525 |
| Viscosity 140° C. (cP) | 810 | 892 | 4215 | 4892 |
| Viscosity 160° C. (cP) | 467 | 510 | 2400 | 2796 |
| open time (sec) | 8 | 4 | 30 | 27 |
| set time (sec) | 6 | 4 | 10 | 8 |
| PAFT (JAI) (° C.) | 55 ± 3 | 61 ± 2 | 47 ± 2 | 51 ± 2 |
| SAFT (JAI) (° C.) | 69 ± 3 | 69 ± 2 | 62 ± 3 | 69 ± 3 |
| hold power 50° C. (JAI peel) (min) | 12 ± 1.4 | 52 ± 17 | 8 ± 0.7 | 11 ± 2 |
| Fiber tear (%) |  |  |  |  |
| RT | 100 | 100 | 100 | 100 |
| -7° C. | 100 | 100 | 20 | 90 |
| -15° C. | 80 | 30 | 10 | 10 |

Example 9: SBS Nonwoven Construction Adhesive Compositions Containing Modified Resins Modified thermoplastic resins (C9 H2) were prepared and combined in the ratios shown in Table 18 to construct hot melt adhesives HE3, HE4, and HE5. An unmodified thermoplastic resin (C9 H2), Regalite™ S7125, was used to prepare comparative adhesive HC3 (Eastman Chemical Company, Kingsport, Tenn., US). The procedures employed here were the same as in Example 5.

TABLE 18

Styrene-Butadiene-Styrene Block Copolymer (SBS) Nonwoven Construction Adhesives Comprising Modified Thermoplastic Resins

|  | HE3 | HE4 | HE5 | HC3 |
|---|---|---|---|---|
| Resin RBSP (° C.) | 141 | 135 | 121 | 121 |
| SBS Europrene SolT 6414 (wt %) | 20 | 20 | 20 | 20 |
| Modified Regalite ™ S7125 (wt %) | 60 | 0 | 0 | 0 |
| Modified Regalite ™ S7125 (wt %) | 0 | 60 | 0 | 0 |
| Modified Regalite ™ S7125 (wt %) | 0 | 0 | 60 | 0 |
| Regalite ™ S7125 (wt %) | 0 | 0 | 0 | 60 |

TABLE 18-continued

Styrene-Butadiene-Styrene Block Copolymer
(SBS) Nonwoven Construction Adhesives Comprising
Modified Thermoplastic Resins

|  | HE3 | HE4 | HE5 | HC3 |
|---|---|---|---|---|
| Primol 352 Mineral oil (wt %) | 20 | 20 | 20 | 20 |
| Irganox ® 1010 Antioxidant (wt %) | 0.2 | 0.2 | 0.2 | 0.2 |

The properties of the adhesives prepared in this experiment are provided in Table 19. Modified thermoplastic resin-containing adhesive HE5 has a lower RBSP and lower viscosity than comparative adhesive HC3 prepared with standard unmodified resin, providing for easier processing and application of adhesive HE5. Additionally, adhesives HE3, HE4, and HE5 show surprisingly excellent compatibility of the modified thermoplastic resins in the adhesives by the value of the Tan-δ peak being equal to, or greater than, the value of the Tan-δ peak of comparative adhesive HC3, even when adhesive HE3 comprising modified thermoplastic resin is based on a resin with an RBSP value that is significantly higher than the comparative resin.

TABLE 19

Properties of SBS Nonwoven Construction Adhesives
Comprising Modified Thermoplastic Resins

|  | HE3 | HE4 | HE5 | HC3 |
|---|---|---|---|---|
| Resin RBSP (° C.) | 141 | 135 | 121 | 121 |
| Properties of the HMA |  |  |  |  |
| HMA RBSP (° C.) | 104 | 100 | 95 | 100 |
| Haziness (5 = opaque, 1 = clear) | 1 | 1 | 1 | 1 |
| Brookfield melt viscosity at 140° C. (Pa · s) | 11750 | 10350 | 5760 | 7763 |
| Brookfield melt viscosity at 160° C. (Pa · s) | 3725 | 3413 | 2150 | 2638 |
| Brookfield melt viscosity at 180° C. (Pa · s) | 1610 | 1450 | 1010 | 1225 |
| DMA Tan-δ peak temperature (° C.) | 37 | 35 | 25 | 29 |
| DMA Tan-δ peak value | 4.2 | 3.2 | 4.9 | 3.5 |
| DMA 3rd cross over temp (° C.) | 99 | 95 | 89 | 94 |
| DMA G' at 37° C. ($10^5$ Pa) | 1.6 | 2.0 | 4.6 | 6.0 |

Inventive adhesives HE4 and HE5 and comparative adhesive HC3 were coated on 50 μm (2 mil) Mylar film using an in-house laboratory hot melt knife coater at 150° C. The coat weights of 26±2 g/m², and coated tape samples were conditioned in a controlled temperature and humidity climate (25° C. and 50% RH) overnight before testing as pressure sensitive adhesive tapes. The results presented in Table 20 were unexpected. HE5 had 170% greater loop tack and more than 950% greater 180° peel adhesion on stainless steel than the comparative adhesive, HC3. Typically, an increase in adhesion is accompanied by a decrease in cohesion, but surprisingly HE5 and HE4 also had almost 950% and 200% longer hold (shear) power at 70° C., respectively. The increase in cohesion was additionally surprising since the SAFT temperatures were only slightly increased above the comparative adhesive HC3.

Test methods employed in this Example were as described previously for SAFT and PSA hold power, above. Loop tack followed PSTC-16 methodology using an MTS Criterion Universal Tensile Tester model C43-104E (MTS Systems Corporation, Eden Prairie, Minn., US). 180° peel adhesion followed the equivalent method PSTC 101: "Peel Adhesion of Pressure Sensitive Tape Test Method A—Single-Coated Tapes, Peel Adhesion at 180° Angle" using an MTS Criterion Universal Tensile Tester model C43-104E (MTS Systems Corporation, Eden Prairie, Minn., US). Rectangular strips of 25 mm×250 mm (1"×10") dimensions were tested at 5 mm/s (12 inch/minute) crosshead displacement rate.

TABLE 20

Performance Of SBS Pressure Sensitive Adhesives Comprising
Modified Thermoplastic Resins And Comparative Examples

|  | HC3 | HE5 | HE4 |
|---|---|---|---|
| Resin RBSP (° C.) | 121 | 121 | 135 |
| HMA RBSP (° C.) | 100 | 95 | 100 |
| Performance of HMPSA |  |  |  |
| SAFT (1" × 1", 1000 g) (σ = 3) (° C.) | 85 | 87 | 89 |
| Loop tack on SS, avg. load, (σ = 1) (lbf) | 2 | 6 | 0.1 |
| 180° peel on SS, (σ = 0.3) (lbf/in) | 0.7 | 7.5 | 0.1 |
| 70° C. Hold (1" × 1", 1000 g) (σ = 21) (min) | 59 | 115 | 109 |

Example 10: Non-Vulcanized Thermoplastic
Elastomer Binary SEBS Blends Containing
Modified Thermoplastic Resins Non-vulcanized thermoplastic elastomer test formulations were prepared by thoroughly mixing prepared modified thermoplastic resins (PMR, C9 H2) (20 wt %) and Kraton™ G-1650 styrene-ethylene/butylene-styrene block copolymer, Kraton Performance Polymers, (80 wt %) (Kraton Corporation, Houston, Tex., US). Formulation GE1 was prepared using modified Kristalex® 3085 resin. Formulations GE2, GE3, and GE4 were prepared using modified Regalite® S7125 resins. GE5 was prepared using modified Regalrez® 1094 resin. GE6 and GE8 were prepared using modified Regalrez® 1126 resins. For comparison, unmodified thermoplastic resins (PMR, C9 H2, PMR H2) Kristalex™ F-115, Regalite™ S7125, Regalrez™ 1094, Regalrez™ 1126, and Plastolyn™ R1140 (Eastman Chemical Company, Kingsport, Tenn., US) were used to similarly prepare comparative formulations GC1, GC2, GC3, GC4, and GC5, respectively. A reference without resin was also prepared by processing neat polymer under the same time and temperature conditions, GC0. Tables 21 and 22 provide the formulation test results, showing the surprising increase in tear strength, % modulus, and tensile, combined with the desirable decrease in compression set for binary blends comprising modified thermoplastic resins.

The following test methods were utilized in this and the following experiments. Binary formulations were prepared by mixing in a Brabender PL-2000 equipped with a Prep-Mixer™ mixing bowl and roller blades (C.W. Brabender® Instruments, Inc., S. Hackensack, N.J., US) at 220° C. for 15 minutes at 75 rpm. All of the blends were formed into plaques (5"×5"×⅛") and (4"×4"×¼") by compression molding in a heated Carver press at 180° C. and approximately eight tons of pressure for five minutes. The plaques were tested for percent transmittance with a Gardner Haze-Gard Plus No. 4725 instrument (BYK Additives and Instruments, Wesel, Germany). The films were then die cut into test articles for various physical tests including tear strength, tensile, and compression set. Remaining material was cut up into pellet sized pieces for melt flow rate measurements.

Tensile samples were die-cut and tested in accordance to ASTM D638 (Type V) and tested on a MTS Criterion Universal Tensile Tester model C43-104E (MTS Systems Corporation, Eden Prairie, Minn., US). Tear samples were die cut to compliance with ASTM D624 (die C).

Tensile strength, modulus and elongation at break were measured as per ASTM D412 using a MTS Criterion Universal Tensile Tester model C43-104E at a crosshead speed of 500 mm/min (MTS Systems Corporation, Eden Prairie, Minn., US). Tear strength was measured at the same conditions following ASTM D624. The results of six tests were averaged.

Melt flow rate was measured in a Ceast melt flow modular instrument at 230° C. with a 2 kg weight (Instron, Norwood, Mass., US). Standard deviation was typically 0.1.

For compression set testing, ASTM D395-14 was used. Test specimens were conditioned to ambient lab temperature and humidity for 24 hours and then cut from 6 mm thick plaques using a punch style cutter with an inner diameter of 13 mm. Three samples of each plaque were loaded into a plate compression device with 4.5 mm spacer bars for constant deflection in accordance to test method B. Samples were then allowed to remain under constant ambient lab conditions or in a 70° C. oven for 22 hours. Thickness measurements were taken before compression and 30 minutes after a lab conditioning phase after being removed from the device. The calculated results are reported in accordance to ASTM 395-14; standard deviation was typically 1%.

Hardness testing was conducted according to ASTM D2240-05. Samples were measured from the same 6 mm plaques used for compression testing, but only before compression samples were cut. A "type B" Shore A durometer was used along with a very dense lab bench as a base for testing. Measurements were collected and recorded in compliance with ASTM D2240-05.

Binary blend GE1 exhibited a desirable lower Shore A hardness than control sample GC1, but surprisingly GE1 also exhibited a highly desirable 9% decrease in compression set combined with a 26% increase in tensile strength and 9% increase in elongation percent. Binary TPE blends GE2, GE3, and GE4 each exhibited as much as a 10% decrease in compression set compared to control sample GC2, while maintaining tear and tensile properties.

TABLE 21

Properties Of Non-Vulcanized Thermoplastic Elastomer Binary SEBS Formulation Containing Modified Thermoplastic Resins

|  | GC1 | GC2 | GE1 | GE2 | GE3 | GE4 | GC0 |
|---|---|---|---|---|---|---|---|
| Test resin RBSP (°) | 115 | 121 | 107 | 121 | 135 | 141 | n/a |
| Hardness-Shore A | 83 | 81 | 80 | 79 | 81 | 80 | 68 |
| Hardness-Shore D | 24 | 22 | 24 | 21 | 22 | 21 | 15 |
| MFR 230° C./2.16 kg (g/10 min) | 2.3 | 1.4 | 2.0 | 1.3 | 0.9 | 1.2 | <1 |
| Compression set at RT (%) | 32 | 56 | 29 | 50 | 55 | 50 | 42 |
| Compression set at 70° C. (%) | 92 | 87 | 93 | 87 | 890 | 84 | 84 |
| % T | 91 | 87 | 92 | 87 | 88 | 86 | 88 |
| Tear Strength (lbf/in, ±20) | 400 | 211 | 305 | 207 | 220 | 205 | 142 |
| 50% Modulus (psi, ±20) | 821 | 385 | 750 | 374 | 405 | 374 | 259 |
| 100% Modulus (psi, ±20) | 814 | 367 | 773 | 360 | 397 | 348 | 311 |
| 200% Modulus (psi, ±20) | 872 | 362 | 840 | 374 | 402 | 357 | 338 |
| 300% Modulus (psi, ±20) | 975 | 376 | 938 | 404 | 416 | 382 | 364 |
| Tensile Strength (psi ±300) | 2002 | 2400 | 2524 | 2142 | 2574 | 2248 | 615 |
| Elongation (% ±260) | 2921 | 4020 | 3196 | 4041 | 3705 | 3967 | 2195 |

Formulations GE5, GE6, and GE8 comprising modified thermoplastic resins all exhibited desirable decreased compression set as compared with comparative examples comprising unmodified thermoplastic resins. Surprisingly, modified thermoplastic resins with RBSP as high as 140° C. lower the blend Shore A hardness, improve melt flow, percent transmission, compression set, tear strength, tensile strength, and percent elongation compared to controls comprising analogous standard unmodified resins, as shown in Table 22.

TABLE 22

Properties Of Non-Vulcanized Thermoplastic Elastomer Binary SEBS Formulations Comprising (Hydrogenated/Partially Hydrogenated/Aliphatic) Modified Thermoplastic Resins

|  | GC0 | GC3 | GC4 | GC5 | GE5 | GE6 | G E8 |
|---|---|---|---|---|---|---|---|
| Resin RBSP (° C.) | no resin | 94 | 122 | 140 | 112 | 132 | 138 |
| Hardness-Shore A | 68 | 65 | 64 | 69 | 63 | 65 | 64 |
| Hardness-Shore D | 15 | 16 | 15 | 17 | 16 | 16 | 15 |
| MFR 230° C./2.16 kg (g/10 min) | <1 | 2.1 | 1.8 | 1.0 | 1.7 | 1.5 | 1.1 |
| Compression set at RT (%) | 41.7 | 22.7 | 23.4 | 31.6 | 21.2 | 22.2 | 26.1 |
| Compression set at 70° C. (%) | 83.9 ± 1.5 | 85.2 ± 3.0 | 82.6 ± 1.5 | 79.7 ± 1.4 | 80.9 ± 1.3 | 81.4 ± 0.7 | 78.0 ± 0.3 |
| % T | 88.3 | 89.5 | 91.3 | 90.3 | 90.9 | 91.2 | 89.8 |
| Tear Strength (lbf/in, ±20) | 142 | 202 | 199 | 257 | 206 | 223 | 218 |
| 50% Modulus (psi, ±20%) | 259 | 178 | 198 | 227 | 110 | 201 | 156 |
| 100% Modulus (psi, ±20) | 311 | 242 | 279 | 294 | 191 | 277 | 249 |
| 200% Modulus (psi, ±20) | 338 | 283 | 331 | 326 | 245 | 320 | 285 |
| 300% Modulus (psi, ±20) | 364 | 316 | 371 | 358 | 278 | 354 | 312 |

TABLE 22-continued

Properties Of Non-Vulcanized Thermoplastic Elastomer Binary SEBS Formulations Comprising (Hydrogenated/Partially Hydrogenated/Aliphatic) Modified Thermoplastic Resins

|  | GC0 | GC3 | GC4 | GC5 | GE5 | GE6 | G E8 |
|---|---|---|---|---|---|---|---|
| Tensile Strength (psi ±300) | 615 | 1734 | 1912 | 2756 | 2187 | 2243 | 2187 |
| Elongation (% ±260) | 2195 | 4053 | 4006 | 4015 | 4236 | 4224 | 3787 |

Example 11: Non-Vulcanized TPE Binary SEBS Blend with Reduced Migration

Rectangular (4"×0.5") pieces of GE6 and GC4 (samples from Example 10) were placed on a stainless-steel coupon, and a 6-inch diameter 4 kg brass weight was placed on top of the samples. The assembly was placed in a 135° C. oven for 30 minutes. The brass weight was removed while hot, and the surface was visually examined by two operators for evidence of component migration from the TPE binary blend to the brass surface. Comparative sample GC4 left a residue image on the brass weight covering 75 percent of an area twice the actual sample size, or about 150 percent of the sample area (Surprisingly, sample GE6 had a residue image covering only about 20 percent of the sample size, which is about 86% less area with residue than the comparative TPE binary blend. Table 23 shows that the percent of original sample area that has visible residue on the brass surface is correlated with the VDA 278 VOC and FOG values, particularly the FOG values. This indicates that VDA 278 is a good predictor for not only the reduced VOC and FOG performance of adhesive compositions comprising the modified thermoplastic resins with reduced oligomer content, but also for the ability of these modified resins to yield compositions with similar remarkable properties as are observed in the resins themselves.

TABLE 23

Area With Visible Residue: Migration From Thermally Aged Non-Vulcanized Thermoplastic Elastomer Binary SEBS Blend Containing Hydrogenated/Aliphatic Modified Thermoplastic Resin

|  | GC4 Regalrez ™ 1126 | GE6 modified Regalrez ™ 1126 |
|---|---|---|
| resin RBSP (° C.) | 122 | 132 |
| Residue after 135° C. aging, percent of original sample area (%) | 150 | 20 |
| Resin VOC, VDA 278 (μg/g as toluene equivalents) | 194* | 68* |
| Resin FOG, VDA 278 (μg/g as nC16 equivalents) | 794* | 155* |

*defined as above

Example 12: Non-Vulcanized Thermoplastic Elastomer Binary SEEPS Formulation Containing Modified Thermoplastic Resins Modified thermoplastic resin (C9 hydrogenated) was prepared and combined at 177° C. with Kuraray Septon™ 4033 in the ratio 20 wt % resin and 80 wt % polymer to prepare TPE binary blends SE9 and SE10. Analogous unmodified thermoplastic resin Plastolyn™ R1140 was used to similarly prepare comparative blend SC6. These blends were prepared and tested as described in the previous example.

Compound SE9 comprising modified thermoplastic resin favorably decreased the compound Shore A, Shore D, and percent modulus. Unexpectedly, SE9 both decreased compression set below SC0 and SC6 and increased tear strength above the values of SC0 and SC6, as shown in Table 24.

TABLE 24

Properties of Non-Vulcanized Thermoplastic Elastomer Binary SEEPS Formulation Containing Modified Thermoplastic Resins

|  | SC0 | SC6 Plastolyn ™ R1140 | SE9 Modified Regalite ™ R1100 |
|---|---|---|---|
| Resin RBSP (° C.) | n/a | 140 | 140 |
| Tear Strength (lbf/in, ±20) | 182 | 215 | 250 |
| 50% Modulus, (psi, ±20) | 387 | 356 | 225 |
| 100% Modulus, (psi, ±20) | 377 | 347 | 282 |
| 200% Modulus, (psi, ±20) | 373 | 355 | 300 |
| 300% Modulus, (psi, ±20) | 397 | 384 | 321 |
| Tensile Strength (psi ± 300) | 3438 | 3546 | 3190 |
| Elongation (% ± 260) | 4095 | 3971 | 3782 |
| Young's Modulus (ksi) | 2.0 | 2.0 | 0.9 |
| Hardness-Shore A | 76 | 75 | 70 |
| Hardness-Shore D | 20 | 20 | 18 |
| % T | 91 | 90 | 91 |
| MFR-230° C./2.16 kg (g/10 min) | 0.5 | 1.5 | 1.8 |
| Compression set at −RT (%) | 34 | 31 | 24 |
| Compression set at −70° C. (%) | 86 | 82 | 81 |

Example 13: Removable SEBS Formulation with Reduced Residue Including VDA 278 VOC and FOG Modified thermoplastic resin (PMR, hydrogenated) was prepared and combined in the ratios set forth in Table 25 to prepare hot melt formulation RE1 and an analogous unmodified thermoplastic resin Regalrez™ 1094 (PMR hydrogenated) was used to prepare comparative formulation RC1 (Eastman Chemical Company, Kingsport, Tenn., US). Blends were mixed in a Brabender small bowl with roller blades at 150° C., as described above. The blends were coated on 50 μm (2 mil) Mylar films with a hot melt knife coater at 160° C. at coat weights of 22-24 g/m². These coated tapes were then applied to stainless-steel coupons at room temperature, and 180° peel adhesion was tested after 10 minutes, as described above following method PSTC 101. The compositions coated on Mylar were tested per VDA 278 for VOC and FOG performance.

Both blends exhibited equivalent 180° peel strength. However, surprisingly, the blend comprising modified thermoplastic resin left no residue on the stainless-steel (SS) coupon to which it had been applied, despite comprising mineral oil. This removable formulation is unexpectedly suitable for use in applications such as the adhesive layers for protective films employed in a broad range of surfaces as well as end uses aimed at protecting objects from mechanical (scratches) or chemical (e.g. from solvents) damage during transport, storage, and processing. Surprisingly, the improved VDA 278 performance of the modified thermoplastic resin resulted in significant and disproportionate improvement in performance of composition RE1. Although the composition is only 50 wt % thermoplastic resin, the RE1 composition comprising the modified thermoplastic resin had 82% reduction in VDA 278 VOC value and 68% reduction in FOG value, compared to the composition comprising the unmodified resin. This result was surprising since the composition contained 11.5 wt % oil and additionally the composition was not crosslinked to reduce volatiles.

TABLE 25

Hot Melt Formulations Comprising Modified Thermoplastic Hydrogenated PMR Resins

| | Example | |
|---|---|---|
| | RC1 | RE1 |
| | Test resin | |
| | Regalrez ™ 1094 | Modified Regalrez ™ 1094 |
| Kraton ™ G1652 (phr) | 50 | 50 |
| Kraton ™ G1726 (phr) | 50 | 50 |
| Resin (phr) | 130 | 0 |
| Resin (phr) | 0 | 130 |
| Kaydol oil (phr) | 30 | 30 |
| Formulation performance | | |
| 180° peel on SS (lbf/in) | 0.13 ± 0.06 | 0.10 ± 0.02 |
| SS appearance in application area | Visible residue | No residue |
| Blend on Mylar VDA 278 VOC (µg/g as toluene equivalents) | 4285* | 778* |
| Blend on Mylar VDA 278 FOG (µg/g as nC16 equivalents) | 7700* | 2453* |

*defined as above

Example 14: Polypropylene Film Compounds Containing Modified Resins

Modified thermoplastic resin (C9 H2) was prepared and compounded (10 wt %) with Moplen HP400H polypropylene homopolymer (10 wt %) (LyondellBassell Industries, N.V., Rotterdam, The Netherlands). All polypropylene-resin compounding, cast film extrusion, and heat seal testing were conducted at Fraunhofer Institute IVV in Freising, Germany, as described below.

Films were extruded using the main extruder of a Collin Teach-Line E30Px30L/D, Dr. Collin, Ebersberg, Germany, equipped with a single screw with L/D 30, 30 mm screw diameter. The die width was 300 mm, resulting in a maximum final film width of 250 mm. A cooling/heating, chill-roll/calendar item with an edge trim and a winder were attached to the extrusion components. Extruder temperature profile in ° C. was 30 (feeding zone)-170-220-240-250-260 (zone 1 to 5)-260 (adapter and die) and screw speed 50 rpm. Winding speed was 3.7-3.9 m/min, and nominal film thickness was 70 microns as determined online by means of a capacitive sensor.

Heat-sealability of the films was determined using a Heat Sealing Machine model HSG-C manufactured by Brugger Feinmechanik GmbH, Munich, Germany. The sealing conditions were 0.5 sec contact time, 5 bar pressure, both jaws heated, non-profiled, smooth sealing jaws. Sealing seam strength was measured according to DIN 55529, 10 repeats, using a Schenck-Trebel RM50 testing machine (Schenck-Trebel Corporation, Deer Park, N.Y., US).

Water vapor transmission rate (WVTR) was measured in accordance with ASTM F1249 at 38° C./90% RH using a Mocon PERMATRAN™-W 3/31 (MOCON Inc., Minneapolis, Minn., USA). Reported values were corrected to 70 µm thickness.

The coefficients of friction were measured at 23° C., 50% RH using a sled, in accordance with ASTM D1894, sled tested, on an MTS Insight™ 2 EL electromechanical testing system, using TestWorks™ 4 testing software (MTS Systems Corporation, Eden Prairie, Minn., US). Tensile properties were measured at 2 in/min following ASTM D882 on an MTS Insight™ 2 EL with gauge length 2 inches and 6"×0.5" sample size. Haze and transmission were measured on a Gardner Haze-Gard Plus instrument (BYK Additives and Instruments, Wesel, Germany) according to ASTM D1003, method A.

The formulations compounded with thermoplastic resin had significantly lower melt pressure than the neat polymer, with an additional pressure reduction observed for the modified thermoplastic resin. This agrees with the MFR of FFE1 surprisingly 6% higher than the MFR of FFC2, and the with standard resin. The lower die pressure and higher melt flow rate give improved melt processing, reduces energy needed to orient a film, and typically reduces line breaks and re-work.

As shown in Table 26, the modified thermoplastic resin also surprisingly reduced the haze of the FFE1 film by about 30% compared to FFC2 film, and about 77% compared to the unmodified FFC1 film.

The static coefficient of friction between the FFE1 film and an ASTM D1894 sled was about 4% lower than the static COF for FFC2 film. Surprisingly, the water vapor transmission rate (WVTR) of the FFE1 film was about 18% lower than the control film FFC2 with standard resin, making use of this inventive resin advantageous to prevent provide moisture barrier properties combined with improved flow properties.

The sealing strength of a film is also an important parameter. The Maximum force is the force needed to initiate the separation of the layers or the tearing of the film, and the Mean force is the force needed to separate the sealing. FFE1 unexpectedly had greater than 50% higher maximum sealing force and mean sealing force. If the content of inventive modified thermoplastic resins in the film is increased, then the sealing force of the compounded film will be increased, and likely the strength of lamination to another substrate or film. Unexpectedly, it was noted that films with 20 phr and 30 phr modified thermoplastic resin have noticeable tack when handled, allowing cold lamination of multiple layers or application of films without use of an adhesive coating. One skilled in the art would use such a higher modified resin content compound alone or with one or more additional polymer compositions to form functional barrier films, protective films and the like with improved performance.

TABLE 26

Properties of Polypropylene Film Compounds Comprising Modified Thermoplastic Resins

|  | FFC1 | FFC2 | FFE1 |
|---|---|---|---|
|  |  | Test Resin |  |
|  | none | Plastolyn™ R1140 | modified Regalite™ R1100 |
| Resin RBSP (° C.) | n/a | 138 | 140 |
| *Processing cast film* | | | |
| Thickness (mm) | 0.07 | 0.07 | 0.07 |
| Melt temperature (° C.) | 263 | 263 | 264 |
| Melt pressure (bar) | 147 | 115 | 111 |
| *Application results of cast film* | | | |
| Initial sealing temperature (° C.) | 143 | 137 | <140 |
| Max sealing temperature (shrinkage) (° C.) | 147 | 143 | 143 |
| Seal strength at 143° C. - maximum force (N/15 mm) | 4 ± 2 | 13 ± 4 | 18 ± 3 |
| Seal strength at 143° C. - mean force (N/15 mm) | 2.6 ± 0.9 | 9 ± 2 | 14 ± 4 |
| MFR 230 C./2.16 kg (g/10 min) | 1.77 ± 0.07 | 2.52 ± 0.01 | 2.68 ± 0.08 |
| Transparency (%) | 94.2 ± 0.5 | 93.9 ± 0.1 | 94.3 ± 0.1 |
| Haze (%) | 7.5 ± 0.9 | 2.4 ± 0.2 | 1.7 ± 0.4 |
| WVTR at 38° C./90% RH (g/(m²/day)) | 3.63 ± 0.04 | 4.24 ± 0.19 | 3.45 ± 0.14 |
| COF (23 C., 50% RH), sled - static | 0.32 ± 0.05 | 0.397 ± 0.009 | 0.38 ± 0.03 |
| COF (23 C., 50% RH), sled - dynamic | 0.27 ± 0.01 | 0.31 ± 0.02 | 0.316 ± 0.008 |
| Tensile strength, TD (MPa) | 17 ± 1 | 26 ± 1 | 24 ± 1 |
| Tensile strength, MD (MPa) | 22 ± 2 | 28 ± 1 | 28 ± 1 |
| Elongation, TD (%) | 4.2 ± 0.1 | 2.6 ± 0.4 | 2.3 ± 0.3 |
| Elongation, MD (%) | 7.8 ± 0.3 | 3.8 ± 0.1 | 3.6 ± 0.2 |
| Tensile at break, TD (MPa) | 40 ± 6 | 27 ± 4 | 24 ± 1 |
| Tensile at break, MD (MPa) | 61 ± 12 | 49 ± 8 | 55 ± 7 |
| Elongation at break, TD (%) | 831 ± 87 | 400 ± 364 | 2.4 ± 0.3 |
| Elongation at break, MD (%) | 796 ± 112 | 749 ± 78 | 799 ± 35 |
| Young's modulus, TD (MPa) | 833 ± 62 | 1482 ± 154 | 1365 ± 58 |
| Young's modulus, MD (MPa) | 963 ± 53 | 1284 ± 74 | 1283 ± 73 |

Example 15: Reduction of Mineral Oil Saturated Hydrocarbons (MOSH) and Mineral Oil Aromatic Hydrocarbons (MOAH) Fractions in Modified Thermoplastic Resins Modified thermoplastic resins (C9 H2) were prepared and tested for the content of low molecular hydrocarbons (≤C35) employing methodologies according to Grob et al. (Grob et al., *J. of Chromatography A*, 1255:56, 2012). Unmodified commercial thermoplastic resins Regalite™ 55090, Regalite™ 55100, and Regalite™ R1100 (Eastman Chemical Company, Kingsport, Tenn., US) were also tested for comparison.

A Brechbuehler AG LC-GC-FID system (Thermo Fisher Scientific, Waltham, Mass., US) was equipped with an Allure Silica column, Normal Phase, 5 µm, 250 m×2.1 mm (Restek Corporation, Bellefonte, Pa., US). The flow rate was 0.3 ml/min with a backflush rate of 0.5 ml/min. Internal standard solution was prepared in toluene and consisted of 300 mg/L each of: n-undecane, cyclohexylcyclohexane, pentylbenzene, 1-methylnaphthalene, 2-methyl-naphthalene, tri-tert-butyl-benzene, 150 mg/L n-tridecane, and 600 mg/L each of cholestane and perylene. Standard components were supplied by Restek. All solvents used for analysis were analytical grade supplied by Merck & Co., Kenilworth, N.J., US. The sample extract was prepared by dissolving 30 mg sample in 20 mL n-hexane, and then 40 microliters of internal standard solution were added. Approximately 10 µl to 90 µl of the sample extract was injected into the HPLC. The gradient solvent program was as follows: Eluent A (n-hexane)—100% 0.0-0.5 min, 60% 0.6-6 min, 100% 15-30 min, and Eluent B (dichloromethane)—40% 0.6-6 min, 100% 6-15 min. The normal phase LC was used for the separation of saturated (MOSH fraction) and aromatic hydrocarbons (MOAH fraction). Polar components remained on the HPLC-column and were eluted into the waste during the backflush of the column. No interference with MOSH and MOAH occurred. The fraction of interest was transferred (on-line) into GC-FID. The gas chromatograph was equipped with a Restek Rxi-1HT 15 m×0.25 mm ID column (Restek Corporation, Bellefonte, Pa., US) and a 7 m×0.53 mm ID uncoated precolumn (Supelco Brand, Sigma-Aldrich, St. Louis, Mo., US).

Mineral oil saturated hydrocarbons (MOSH) and mineral oil aromatic hydrocarbons (MOAH) are food contaminants that originate from printing inks that can enter the recycling chain through newspaper or printed boxes. MOSH/MOAH can migrate via gas phase into dry food (≤C24) or migrate via wetting contact into fatty food (≤C35). MOSH in the range of C16 to C35 can accumulate in human tissue and cause harmful health effects. The presence of MOAH is a potential concern as this is associated with carcinogenic and mutagenic properties. (European Food Safety Authority, Scientific Opinion on Mineral Oil Hydrocarbons in Food, *EFSA Journal*, 10(6):2704, 2012). Oligomers from thermoplastic resins can appear to be MOSH/MOAH contaminants and result in false positives in MOSH/MOAH testing, and reduction of the apparent MOSH/MOAH fractions is therefore desirable in certain end uses and related embodiments.

The results in Table 27 show that the modified thermoplastic resins exhibit a surprising 94 to 98% decrease in the C16-C20 MOSH fraction, an 86 to 96% decrease in the C20-C24 MOSH fraction, a 4 to 65% decrease in C24-C35 MOSH fraction, up to a 96% decrease in ≤C24 MOAH fraction, and a 9 to 75% decrease in C24-C35 MOAH fraction, as compared with analogous currently commercially available unmodified resins. This makes the described modified thermoplastic resins with reduced MOSH/MOAH fractions uniquely advantageous for compositions and articles comprising the described modified resins that are in contact with, or in close proximity to, humans or animals and food products, as well as other applications similar applications.

TABLE 27

MOSH MOAH Performance of Modified and Unmodified Thermoplastic Resins

| | Resin tested | | | | | |
|---|---|---|---|---|---|---|
| | Regalite ™ R1100 | modified Regalite ™ R1100 | modified Regalite ™ R1100 | Regalite ™ S5100 | modified Regalite ™ S5090 | modified Regalite ™ S5100 |
| Resin type | C9 H2 | C9 H2 | C9 H2 | C9 H2 | C9 H2 | C9 H2 |
| Resin RBSP (° C.) | 102 | 140 | 138 | 100 | 116 | 120 |
| MOSH Fraction: C16-C20 (g/kg) | 45.3 | 1.8 | 2.8 | 34.2 | 0.4 | 1.9 |
| MOSH Fraction: C20-C24 (g/kg) | 11.2 | 0.9 | 0.6 | 8.3 | 0.3 | 1.1 |
| MOSH Fraction: C24-C35 (g/kg) | 166.6 | 58.4 | 65.3 | 99.0 | 41 | 94.5 |
| MOAH Fraction: ≤C24 (g/kg) | ≤0.2 | ≤0.2 | ≤0.2 | 5.6 | ≤0.2 | ≤0.2 |
| MOAH Fraction: C24-C35 (g/kg) | 5.7 | 1.8 | 1.4 | 59.1 | 53.8 | 44.4 |

Example 16: Rubber Composition Containing Modified Resins

A modified thermoplastic resin (PMR) was prepared and added to a rubber mixture in amounts of 20 phr and 40 phr to prepare rubber mixtures E1 and E2, respectively, as shown in Table 28, below. Additional non-modified thermoplastic resin samples were prepared and added to a rubber mixture in amounts of 0 phr, 20 phr, and 40 phr to prepare rubber mixtures W1, W2, and W3, and W4, W5, and W6, W7 respectively, as also shown in Table 27, below, where "6PPD" means antioxidant N-phenyl-N'-(1,3-dimethylbutyl)-p-phenylene diamine, "TESPD" means the disulfide of silane coupling agent 3,3'-bis(triethoxysilylpropyl)tetrasulfide, "DPG" means the accelerant diphenyl guanidine, and "CBS" is the accelerant N-cyclohexyl-2-benzothiazolsulfenamide. F100 and F-115 were chosen as resins comparable in Tg with the modified thermoplastic resin.

TABLE 28

Reference Mixtures W1 to W7 and Inventive Compositions E1 and E2

| | W1 | W2 | W3 | W4 | W5 | W6 | W7 | E1 | E2 |
|---|---|---|---|---|---|---|---|---|---|
| SSBR | 100 | 100 | 100 | 100 | 100 | 100 | 100 | 100 | 100 |
| Silica | 60 | 60 | 60 | 60 | 60 | 60 | 60 | 60 | 60 |
| Kristalex ® F-85 | 0 | 20 | 40 | 0 | 0 | 0 | 0 | 0 | 0 |
| Kristalex ® F100 | 0 | 0 | 0 | 20 | 40 | 0 | 0 | 0 | 0 |
| Kristalex ® F-115 | 0 | 0 | 0 | 0 | 0 | 20 | 40 | 0 | 0 |
| Modified Kristalex ® F-85 thermoplastic resin | 0 | 0 | 0 | 0 | 0 | 0 | 0 | 20 | 40 |
| 6PPD | 2 | 2 | 2 | 2 | 2 | 2 | 2 | 2 | 2 |
| Ozone wax | 2 | 2 | 2 | 2 | 2 | 2 | 2 | 2 | 2 |
| ZnO | 2.5 | 2.5 | 2.5 | 2.5 | 2.5 | 2.5 | 2.5 | 2.5 | 2.5 |
| Stearic acid | 2.5 | 2.5 | 2.5 | 2.5 | 2.5 | 2.5 | 2.5 | 2.5 | 2.5 |
| TESPD | 4.3 | 4.3 | 4.3 | 4.3 | 4.3 | 4.3 | 4.3 | 4.3 | 4.3 |
| DPG | 1 | 1 | 1 | 1 | 1 | 1 | 1 | 1 | 1 |
| CBS | 2 | 2 | 2 | 2 | 2 | 2 | 2 | 2 | 2 |
| Sulfur | 2 | 2 | 2 | 2 | 2 | 2 | 2 | 2 | 2 |
| Physical Parameters | | | | | | | | | |
| Shore A hardness RT | 70.1 | 60.9 | 52.6 | 62.0 | 52.6 | 62 | 54.4 | 61.7 | 53.7 |
| Shore A hardness 70° C. | 68.2 | 59.2 | 50.4 | 60.5 | 50.5 | 60.2 | 52.2 | 60.3 | 51.2 |
| M300 (MPa) | 5.6 | 7.7 | 5.2 | 8.0 | 5.2 | 8 | 5.9 | 8.0 | 5.4 |
| Tensile strength (MPa) | 10.9 | 10.1 | 10.4 | 10.6 | 12.8 | 11.1 | 11.4 | 11.5 | 12.1 |

TABLE 28-continued

Reference Mixtures W1 to W7 and Inventive Compositions E1 and E2

|  | W1 | W2 | W3 | W4 | W5 | W6 | W7 | E1 | E2 |
|---|---|---|---|---|---|---|---|---|---|
| Elongation at break (%) | 318 | 388 | 517 | 396 | 589 | 411 | 537 | 415 | 552 |
| Tan δ at 0° C. | 0.173 | 0.265 | 0.468 | 0.288 | 0.527 | 0.301 | 0.493 | 0.285 | 0.544 |
| Tan δ (max) at 55° C. | 0.124 | 0.122 | 0.129 | 0.131 | 0.141 | 0.152 | 0.169 | 0.126 | 0.130 |
| Temp at Tan δ (max) (° C.) | −42 | −30 | −20 | −30 | −20 | −30 | −20 | −29 | −18 |
| Tg shift (° C.) | n/a | 12 | 22 | 12 | 22 | 12 | 22 | 13 | 24 |
| Abrasion (mm³) | 94 | 118 | 113 | 88 | 114 | 95 | 134 | 102 | 120 |

Mixture production was performed under standard conditions in three stages in a laboratory tangential mixer. Test pieces were produced from all of the mixtures by optimal vulcanization under pressure at 160° C., and these test pieces were used to determine the material properties typical for the rubber industry. The following test methods were used for testing of the test pieces described above:

- Shore A hardness (unit Shore A, abbreviated ShA) at room temperature (RT) according to DIN 53 505;
- Rebound elasticity (abbreviated as rebound) at room temperature (RT) and 70° C. according to DIN 53 512;
- Tension values at 50, 100 and 300% elongation (modulus 50, modulus 100 or modulus 300) at room temperature (RT) according to DIN 53 504;
- Tensile strength and elongation at break at room temperature according to DIN 53 504;
- Wear at room temperature according to DIN53 516 or DIN/ISO 4649; and
- Glass transition temperature Tg of the rubber mixture from the loss factor tan δ (tangent delta) by dynamic mechanical measurement according to DIN 53 513 (temperature sweep).

Determination of the molecular weight (weight average Mw and number average Mn) of the polymers is performed using gel permeation chromatography (GPC) with tetrahydrofuran (THF) as an eluent at 40° C., calibrated with polystyrene-standard EasiCal PS-1 (Agilent, Santa Clara, Calif., US); size exclusion chromatography (SEC).

The loss factor "tan delta" (Tan δ) was determined in a dynamic-mechanic temperature sweep measurement according DIN 53513.

Tire performance tests were conducted on tires of size 205/55 R16 with the respective tread compound mixtures indicated in Table 29. Rolling resistance measurements were performed according ISO 28580. Wet breaking was measured as ABS-braking on wet asphalt with both a high and low μ-value at an initial speed of 80 km/h. Dry braking was measured as ABS-braking on dry asphalt with high μ-value at an initial speed of 100 km/h. For snow performance, the snow traction for acceleration was measured on a snow test track. The wear performance was evaluated by the mass loss of the respective tires after 8800 km driving on road condition at an average temperature of 15° C. The rubber mixtures C1, C2, and E3 contained either non-modified or modified thermoplastic resins at 30 phr as shown in Table 29 (all values are in phr).

TABLE 29

Compound Mixtures for Tire Performance Tests

|  | C1 | C2 | E3 |
|---|---|---|---|
| Natural Rubber | 15 | 15 | 15 |
| Synthetic rubber[a] | 85 | 85 | 85 |
| Filler[b] | 128 | 128 | 128 |
| Kristalex ® F-85 | 30 | 0 | 0 |
| Kristalex ® F-115 | 0 | 30 | 0 |
| Modified Kristalex ® F-85 thermoplastic resin | 0 | 0 | 30 |
| Softeners | 25 | 25 | 25 |
| Additives | 14 | 14 | 14 |
| Silane[c] | 12 | 12 | 12 |
| Vulcanization chemicals | 5 | 5 | 5 |

[a]SSBR and BR
[b]CB and Silica
[c]NXT (Momentive Performance Materials, Waterford, NY, US)

All values were measured in comparison to the reference mixture. The reference values were normalized to 100%. The values that appear to be smaller than 100% represent a worsening of performance, whereas the values that appear to be greater than 100% characterize an improvement of performance.

Tire performance data is provided in Table 30, below.

TABLE 30

Tire Performance Results

|  | C1 | C2 | E3 |
|---|---|---|---|
| RR | 100 | 94 | 101 |
| Wet | 100 | 103 | 102 |
| Dry | 100 | 101 | 100 |
| Snow | 100 | 96 | 100 |
| Wear | 100 | 92 | 100 |

These data can also be visualized by reference to FIG. 7, showing a spider diagram of the tire performance results of Kristalex® F-85 (C1), Kristalex® F-115 (C2), and the modified Kristalex® F-85 thermoplastic resin (E3).

As can be seen by the above data, selective removal the low molecular weight, low Tg oligomer content of the modified Kristalex® F-85 thermoplastic resin creates a Tg that is higher; however, since the high molecular weight fraction has not increased, thermoplastic resin compatibility with the elastomer is not compromised. This gives a better balance of wet grip and rolling resistance in tire tread applications based on traditional viscoelastic predictors of these properties, as shown in the tire test results of Sample 3, i.e. comparison of unmodified Kristalex® F-85 (sample C1) to modified Kristalex® F-85 (sample E3), RR and wet. Additionally, the use of low oligomer content thermoplastic resins in these applications results in similar compound viscosity, vulcanization behavior, and physical properties compared to typical thermoplastic resins. Therefore, there is no apparent negative impact of the modified thermoplastic resin on these properties.

Further, comparison of the modified Kristalex® F-85 thermoplastic resin that possesses an elevated Tg (Sample E3) as compared to the unmodified Kristalex® F-85 thermoplastic resin, with a thermoplastic resin that has a similar Tg, such as in unmodified Kristalex® F-115 (sample C2), shows that increasing the Tg of thermoplastic resins by incorporating the modified thermoplastic resin into the tire tread yields superior snow performance and wear properties and an apparent improvement in RR-wet braking conflict, as shown by the results in Table 30.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

What is claimed is:

1. A modified thermoplastic resin prepared by polymerization of one or more monomers,
   wherein the modified thermoplastic resin has a glass transition temperature (Tg) of between −50° C. and 160° C.,
   wherein the modified thermoplastic resin has a number average molecular weight of less than 3,000 g/mol,
   wherein the modified thermoplastic resin has a z-average molecular weight (Mz) of less than 9,500 g/mol,
   wherein the modified thermoplastic resin comprises less than or equal to 55 wt % oligomers by gel permeation chromatography (GPC), or less than or equal to 38 wt % by high resolution thermogravimetric analysis (TGA),
   wherein oligomers consist of dimers, trimers, tetramers, pentamers, or a mixture thereof, of the one or more monomers, and
   wherein the modified thermoplastic resin is obtained by modification of hydrogenated or partially hydrogenated C9 thermoplastic resin, and
   wherein the value of Tg/Mz is greater than or equal to 0.19 K/(g/mol), and:
   (a) the weight percent of oligomers as determined by high resolution TGA is less than or equal to 13 wt %, or
   (b) the value of $T_{10}/T_{max}$ is greater than 0.90, wherein $T_{10}$ is the temperature at which the modified thermoplastic resin loses about 10% of its weight as measured by high resolution TGA, and wherein $T_{max}$ is the temperature of the maximum first derivative value of the modified thermoplastic resin as measured by high resolution TGA; or
   (c) both (a) and (b).

2. The modified thermoplastic resin of claim 1, wherein the oligomer content is determined by GPC, and wherein:
   (i) the fraction of oligomer having a molecular weight of less than 300 g/mol is less than or equal to 0.08, and the fraction of oligomer having a molecular weight of less than 600 g/mol is less than 0.3;
   (ii) the fraction of oligomer having a molecular weight of less than 300 g/mol is less than or equal to 0.05, and the fraction of oligomer having a molecular weight of less than 600 g/mol is less than 0.3;
   (iii) the fraction of oligomer having a molecular weight of less than 300 g/mol is less than or equal to 0.02, and the fraction of oligomer having a molecular weight of less than 600 g/mol is less than 0.3; or
   (iv) the fraction of oligomer having a molecular weight of less than 300 g/mol is less than or equal to 0.10, and the fraction of oligomer having a molecular weight of less than 600 g/mol is less than 0.34.

3. The modified thermoplastic resin of claim 1, wherein:
   the number average molecular weight (Mn) is less than 1,000 g/mol; and/or
   the z-average molecular weight is less than 9,000 g/mol.

4. The modified thermoplastic resin of claim 1, wherein:
   the Tg is between 0° C. and 140° C.;
   the number average molecular weight is less than 850 g/mol; and/or
   the z-average molecular weight (Mz) is less than 8,000 g/mol.

5. The modified thermoplastic resin of claim 1, wherein the Tg is between 20° C. and 120° C.

6. The modified thermoplastic resin of claim 1, wherein:
   (v) the high resolution TGA analysis is conducted with a thermal gravimetric analyzer calibrated by curie point of magnetic transition standards according to ASTM method E1582, procedure C;
   (vi) the high resolution TGA analysis is conducted with a TA Instruments Q500 thermal gravimetric analyzer with Hi-Res sensitivity set to 2.0 and resolution factor set to 3.0 by heating the modified thermoplastic resin in nitrogen with a scanning rate of 20 degrees per minute from ambient temperature to 625° C.; and/or
   (vii) the GPC analysis is conducted at 30° C. in tetrahydrofuran solvent at a flow rate of 1 ml/min with a GPC instrument comprising a refractive index detector (RID), a column comprising polymer particles with a nominal particle size of 6 μm.

7. A modified thermoplastic resin, wherein the modified thermoplastic resin possesses the properties of formula I:

$$S = \left(\frac{T_g}{M_z}\right) \Big/ \left[\text{Oligomer} \times \left(1 - \frac{T_{10}}{T_{max}}\right)\right] \quad \text{I}$$

wherein Tg is the glass transition temperature in degrees Celsius of the modified thermoplastic resin;
wherein Mz is the z-average molecular weight of the modified thermoplastic resin;
wherein Oligomer is the fraction of oligomer present in the modified thermoplastic resin as measured by high resolution thermal gravimetric analysis (TGA) or gel permeation chromatography (GPC);
wherein $T_{10}$ is the temperature at which the modified thermoplastic resin loses about 10% of its weight as measured by high resolution TGA;
wherein $T_{max}$ is the temperature of the maximum first derivative value of the modified thermoplastic resin as measured by high resolution TGA;
wherein the value of S is greater than or equal to 2 and less than 50,000 when Oligomer is determined by GPC, or greater than or equal to 5 and less than 16 when Oligomer is determined by high resolution TGA;
wherein the value of Mz is less than or equal to 9,000 g/mol,
wherein the modified thermoplastic resin is obtained by modification of hydrogenated or partially hydrogenated C9 thermoplastic resin, and wherein the value of Tg/Mz is greater than or equal to 0.19 K/(g/mol).

8. The modified thermoplastic resin of claim 7, wherein Oligomer is determined by high resolution TGA, and wherein for Oligomer having a molecular weight of less than 300 g/mol, S is greater than 90.

9. The modified thermoplastic resin of claim 7, wherein Oligomer is determined by GPC, and wherein:
   (a) Oligomer having a molecular weight of less than 300 g/mol is less than or equal to 0.08, and
   Oligomer having a molecular weight of less than 600 g/mol is less than 0.3;
   (b) Oligomer having a molecular weight of less than 300 g/mol is less than or equal to 0.05, and
   Oligomer having a molecular weight of less than 600 g/mol is less than 0.3;
   (c) Oligomer having a molecular weight of less than 300 g/mol is less than or equal to 0.02, and
   Oligomer having a molecular weight of less than 600 g/mol is less than 0.3; or
   (d) Oligomer having a molecular weight of less than 300 g/mol is less than or equal to 0.10, and
   Oligomer having a molecular weight of less than 600 g/mol is less than 0.34.

10. The modified thermoplastic resin of claim 7, wherein:
    the number average molecular weight (Mn) is less than 1,000 g/mol; and/or
    the z-average molecular weight is less than 9,000 g/mol.

11. The modified thermoplastic resin of claim 7, wherein:
    the Tg is between 0° C. and 140° C.;
    the number average molecular weight is less than 850 g/mol; and/or
    the z-average molecular weight (Mz) is less than 8,000 g/mol.

12. The modified thermoplastic resin of claim 8, wherein the Tg is between 20° C. and 120° C.

13. The modified thermoplastic resin of claim 7, wherein:
    (e) the high resolution TGA analysis is conducted with a thermal gravimetric analyzer calibrated by curie point of magnetic transition standards according to ASTM method E1582, procedure C;
    (f) the high resolution TGA analysis is conducted with a TA Instruments Q500 thermal gravimetric analyzer with Hi-Res sensitivity set to 2.0 and resolution factor set to 3.0 by heating the modified thermoplastic resin in nitrogen with a scanning rate of 20 degrees per minute from ambient temperature to 625° C.; and/or
    (g) the GPC analysis is conducted at 30° C. in tetrahydrofuran solvent at a flow rate of 1 ml/min with a GPC instrument comprising a refractive index detector (RID),
    a column comprising polymer particles with a nominal particle size of 6 μm.

14. A method of manufacturing a modified thermoplastic resin, which comprises:
    polymerizing or co-polymerizing one or more of an unsaturated aliphatic monomer, terpenes, rosin acid, unsaturated cycloaromatic monomers, unsaturated cycloaliphatic monomers, unsaturated fatty acids, methacrylates, unsaturated aromatic monomers, vinyl aromatic monomers, and an unsaturated aliphatic/aromatic monomer mixture; and
    selectively reducing the amount of oligomer in the modified thermoplastic resin,
    wherein the modified thermoplastic resin:
    has a glass transition temperature (Tg) of between −50° C. and 160° C.,
    has a number average molecular (Mn) weight of less than 3,000 g/mol,
    has a z-average molecular weight (Mz) of less than 9,000 g/mol,
    comprises less than or equal to 55 wt % oligomers by gel permeation chromatography (GPC), or less than or equal to 38 wt % by high resolution thermogravimetric analysis (TGA), and
    wherein oligomers consist of dimers, trimers, tetramer, pentamers, or a mixture thereof, of the one or more monomers,
    wherein the modified thermoplastic resin is hydrogenated or partially hydrogenated C9 thermoplastic resin, and
    wherein when the oligomer content is determined by GPC, then the value of Tg/Mz of the modified thermoplastic resin is greater than or equal to 0.19 K/(g/mol),
    the percent modified thermoplastic resin having a molecular weight of less than 300 g/mol is less than or equal to 10, and the percent modified thermoplastic resin having a molecular weight of less than 600 g/mol is less than 34.

15. The modified thermoplastic resin of claim 14, wherein the oligomer content is determined by GPC, and wherein:
    (i) the fraction of oligomer having a molecular weight of less than 300 g/mol is less than or equal to 0.08, and
    the fraction of oligomer having a molecular weight of less than 600 g/mol is less than 0.3;
    (ii) the fraction of oligomer having a molecular weight of less than 300 g/mol is less than or equal to 0.05, and
    the fraction of oligomer having a molecular weight of less than 600 g/mol is less than 0.3;
    (iii) the fraction of oligomer having a molecular weight of less than 300 g/mol is less than or equal to 0.02, and
    the fraction of oligomer having a molecular weight of less than 600 g/mol is less than 0.3; or
    (iv) the fraction of oligomer having a molecular weight of less than 300 g/mol is less than or equal to 0.10, and
    the fraction of oligomer having a molecular weight of less than 600 g/mol is less than 0.34.

16. The modified thermoplastic resin of claim 14, wherein:
    the number average molecular weight (Mn) is less than 1,000 g/mol; and/or
    the z-average molecular weight is less than 9,000 g/mol.

17. The modified thermoplastic resin of claim 14, wherein:
    the Tg is between 0° C. and 140° C.;
    the number average molecular weight is less than 850 g/mol; and/or
    the z-average molecular weight (Mz) is less than 8,000 g/mol.

18. The modified thermoplastic resin of claim 14, wherein the Tg is between 20° C. and 120° C.

19. The modified thermoplastic resin of claim 14, wherein:
    (v) the high resolution TGA analysis is conducted with a thermal gravimetric analyzer calibrated by curie point of magnetic transition standards according to ASTM method E1582, procedure C;
    (vi) the high resolution TGA analysis is conducted with a TA Instruments Q500 thermal gravimetric analyzer with Hi-Res sensitivity set to 2.0 and resolution factor set to 3.0 by heating the modified thermoplastic resin in nitrogen with a scanning rate of 20 degrees per minute from ambient temperature to 625° C.; and/or (vii) the GPC analysis is conducted at 30° C. in tetrahydrofuran solvent at a flow rate of 1 ml/min with a GPC instrument comprising a refractive index detector (RID), a column comprising polymer particles with a nominal particle size of 6 μm.

* * * * *